United States Patent [19]

Kura et al.

[11] Patent Number: 5,515,276
[45] Date of Patent: May 7, 1996

[54] STARTING APPARATUS FOR PASSENGER PROTECTING APPARATUS

[75] Inventors: Nobuyoshi Kura; Mitsunori Maruyama, both of Aichi; Yukihiro Okimoto; Takashi Furui, both of Hyogo, all of Japan

[73] Assignees: Mitsubishi Denki Kabushiki Kaisha; Mitsubishi Jidosha Kogyo Kabushiki Kaisha, Tokyo, Japan

[21] Appl. No.: 345,830

[22] Filed: Nov. 21, 1994

[30] Foreign Application Priority Data

Apr. 14, 1994 [JP] Japan .................................. 6-076008

[51] Int. Cl.$^6$ .................................................. B60R 21/32
[52] U.S. Cl. .................. 364/424.05; 340/669; 307/10.1; 280/735; 180/282
[58] Field of Search ..................... 364/424.05; 340/436, 340/669; 307/10.1; 280/734, 735; 180/274, 282

[56] References Cited

U.S. PATENT DOCUMENTS

| | | | |
|---|---|---|---|
| 4,410,875 | 10/1983 | Spies et al. | 180/274 |
| 4,873,452 | 10/1989 | Morota et al. | 307/10.1 |
| 5,037,129 | 8/1991 | Fritz et al. | 280/734 |
| 5,083,276 | 1/1992 | Okano et al. | 364/424.05 |
| 5,109,341 | 4/1992 | Blackburn et al. | 364/424.05 |
| 5,157,268 | 10/1992 | Spies et al. | 307/10.1 |
| 5,208,484 | 5/1993 | Okano et al. | 307/10.1 |
| 5,285,188 | 2/1994 | Yoshida | 340/436 |
| 5,363,302 | 11/1994 | Allen et al. | 364/424.05 |
| 5,365,114 | 11/1994 | Tsurushima et al. | 307/10.1 |
| 5,369,305 | 11/1994 | Duhan et al. | 307/10.1 |

FOREIGN PATENT DOCUMENTS 4287748  10/1992  Japan .
4317837  11/1992  Japan .

*Primary Examiner*—Kevin J. Teska
*Assistant Examiner*—Tyrone V. Walker

[57] ABSTRACT

A starting apparatus for a passenger protecting apparatus includes a collision deciding unit, a control unit, and a trigger. The collision deciding unit makes a collision decision depending upon output of an acceleration sensor which detects acceleration at a time of collision. The control unit controls generation of a starting signal based upon a difference between output of a decelerating direction integrating unit, which integrates the acceleration signal of the acceleration sensor in the decelerating direction, and output of accelerating direction integrating unit, which integrates the acceleration signal of the acceleration sensor in an acceleration direction. The trigger outputs the starting signal based on output of the collision deciding unit and output of the control unit.

21 Claims, 54 Drawing Sheets

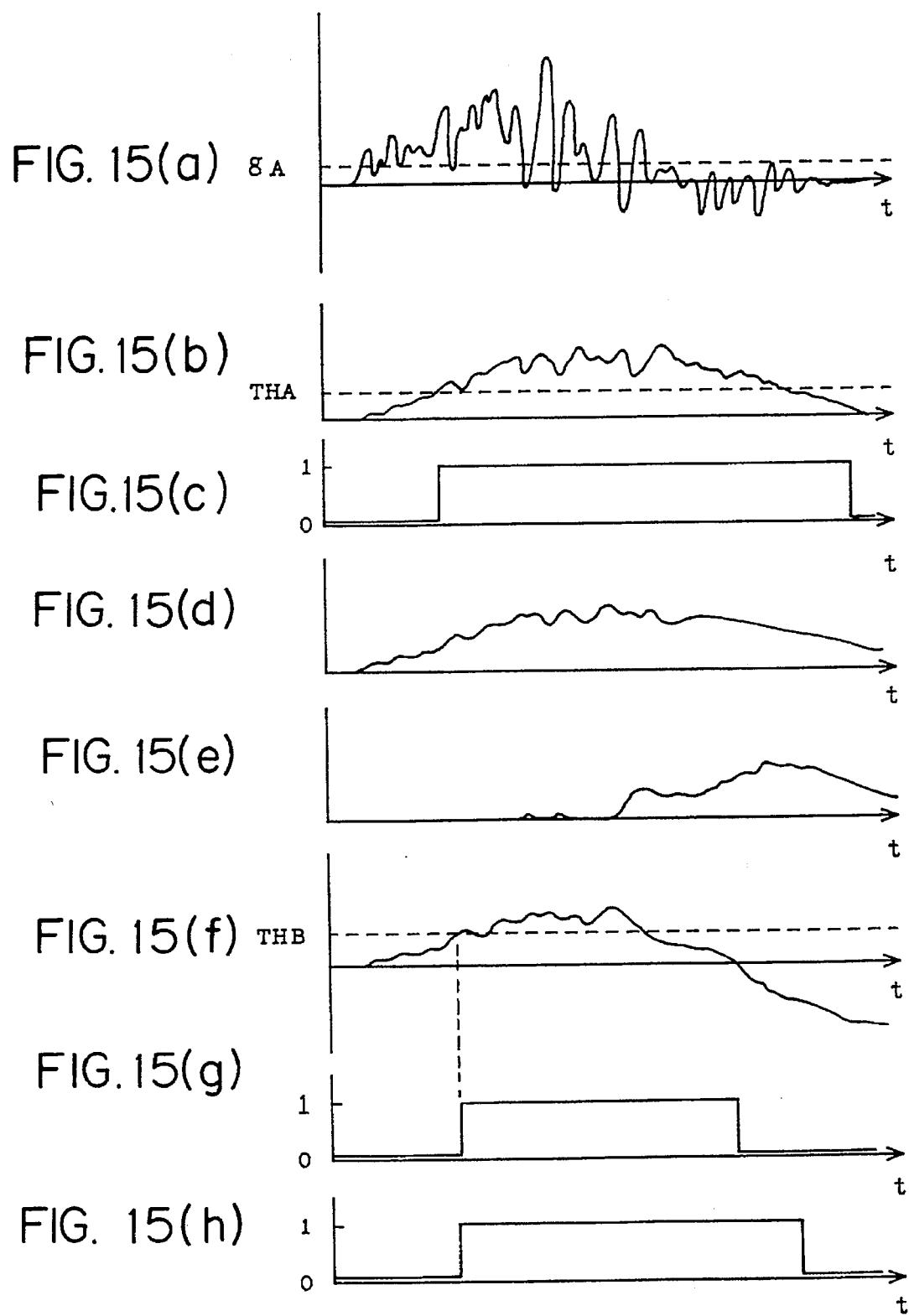

FIG. 17(a)
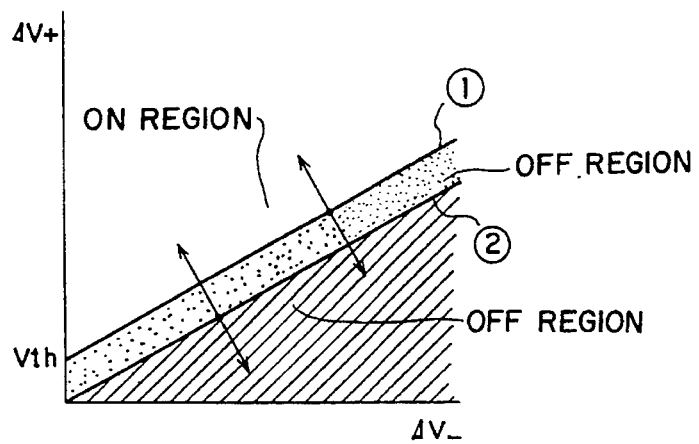
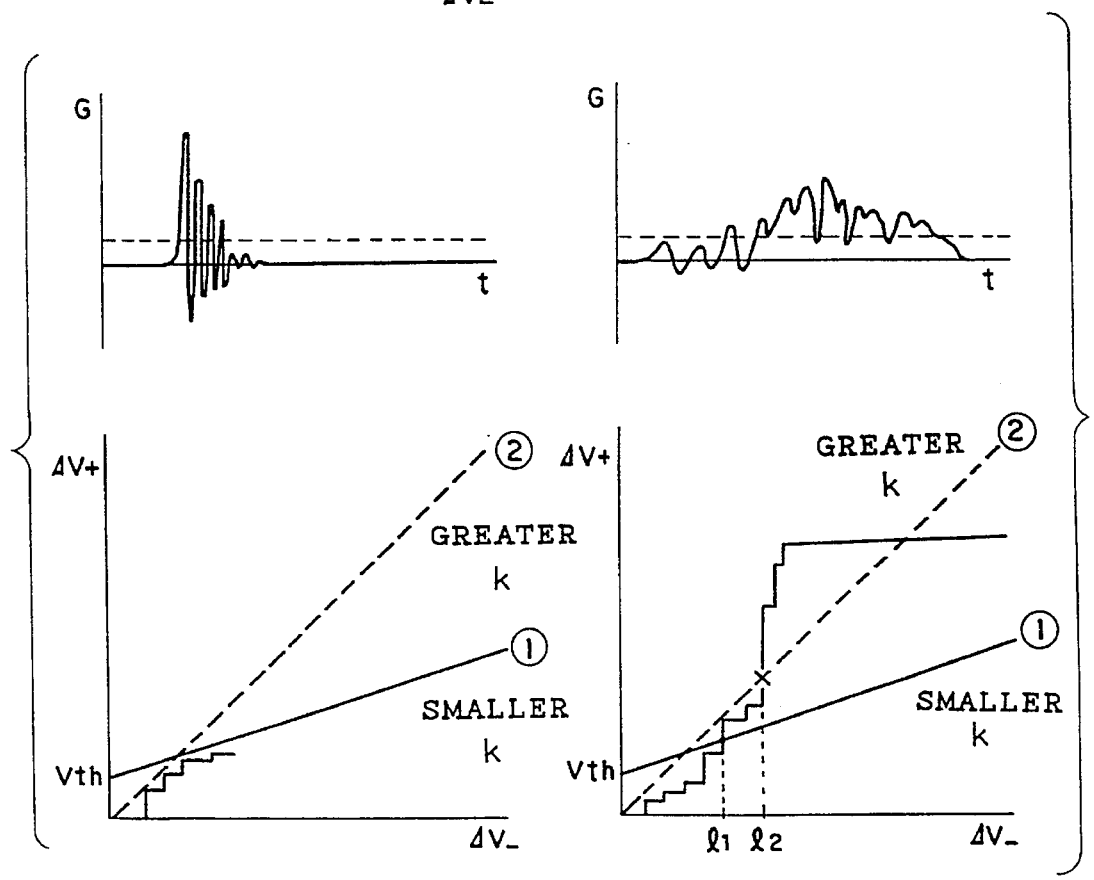
FIG. 17(b)        FIG. 17(c)

FIG. 23(a) gA 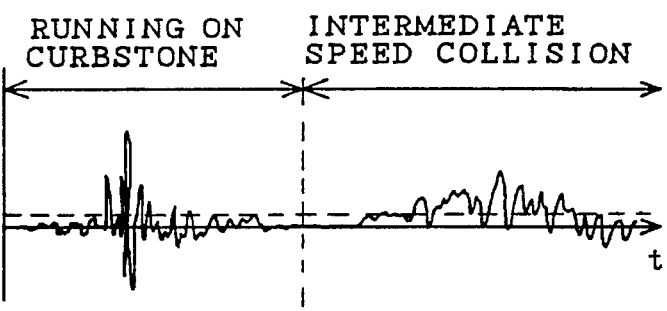
FIG. 23(b) THA 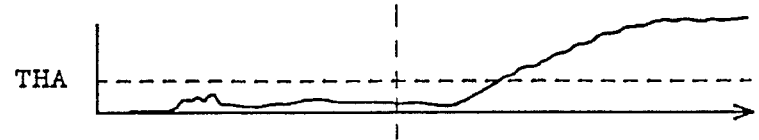

FIG. 23(f) THB 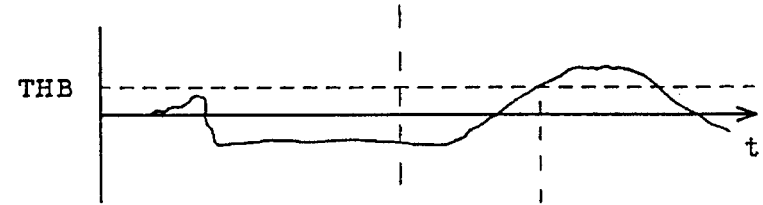

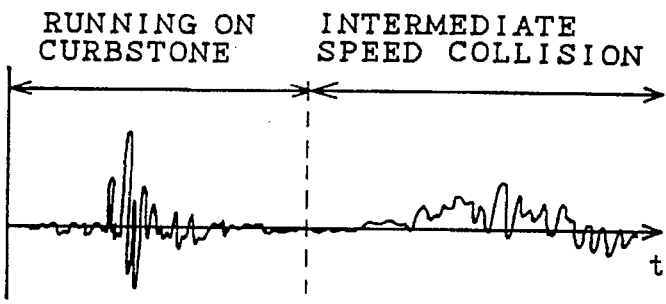
FIG. 24(a)
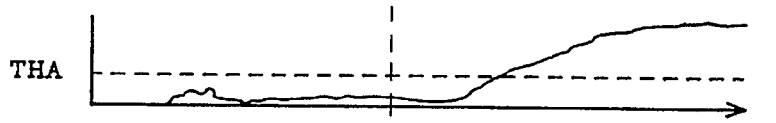
FIG. 24(b)
FIG. 24(c)
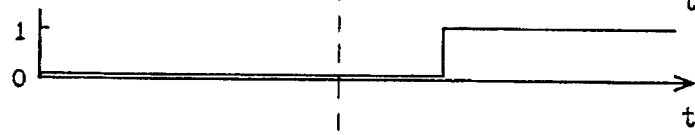
FIG. 24(d)
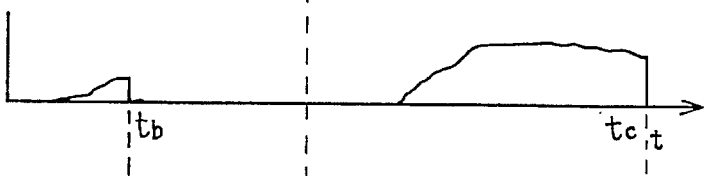
FIG. 24(e)
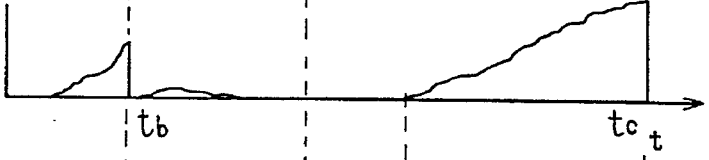
FIG. 24(f)
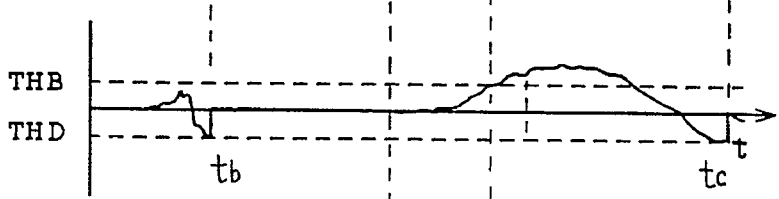
FIG. 24(g)
FIG. 24(h)

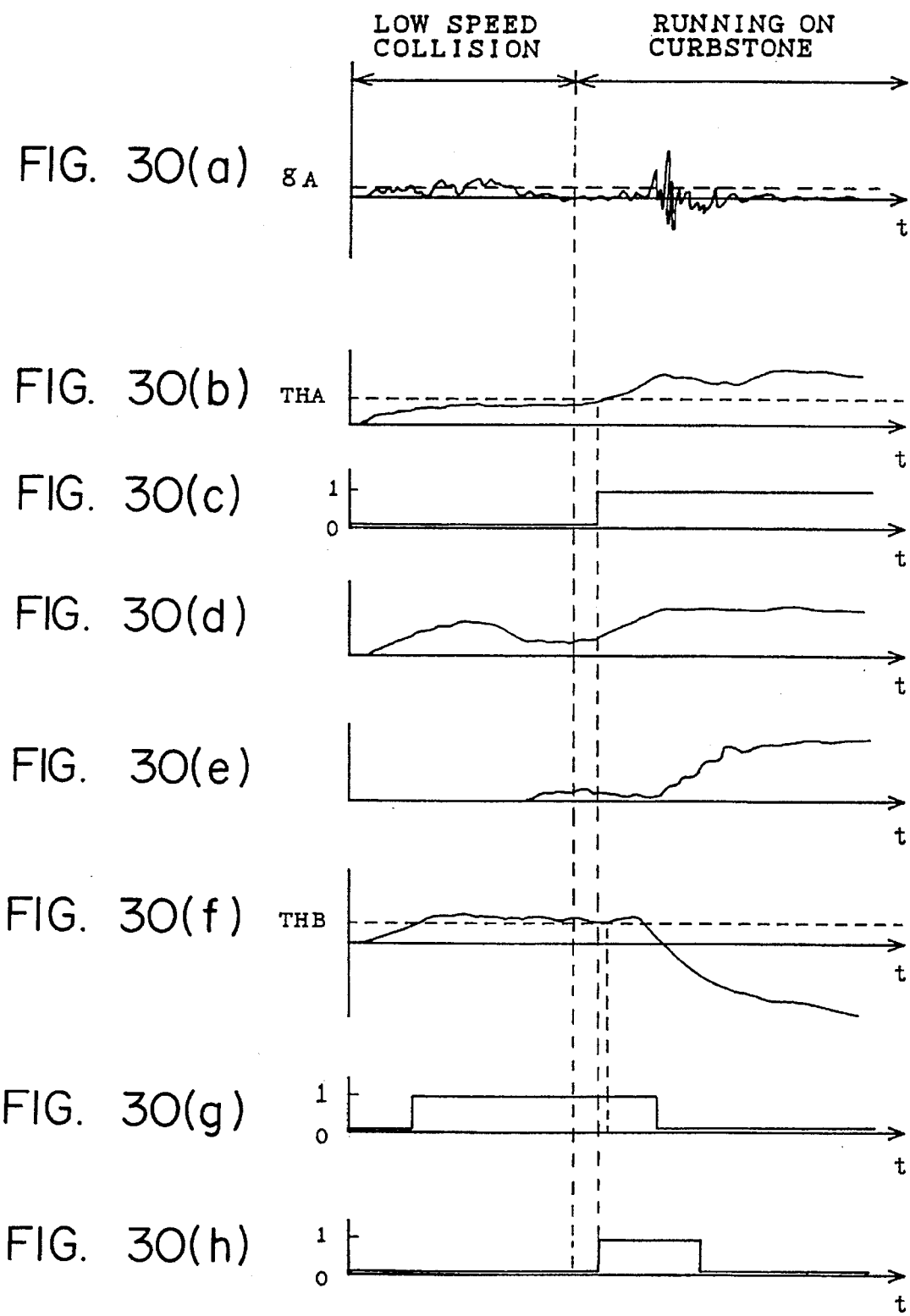

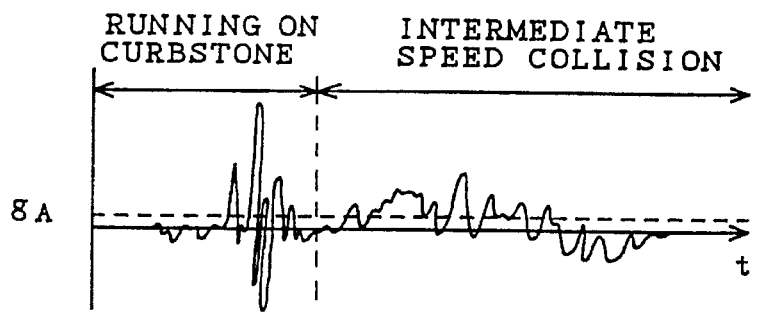
FIG. 36(a)
FIG. 36(b)
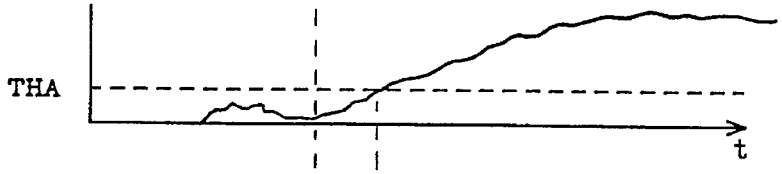
FIG. 36(c)
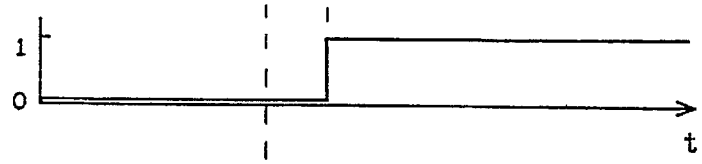
FIG. 36(j)
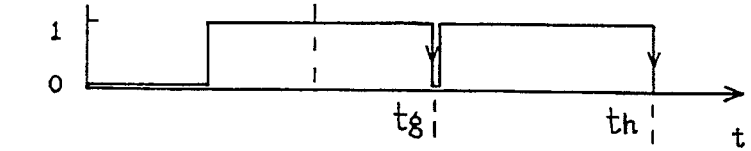
FIG. 36(f)
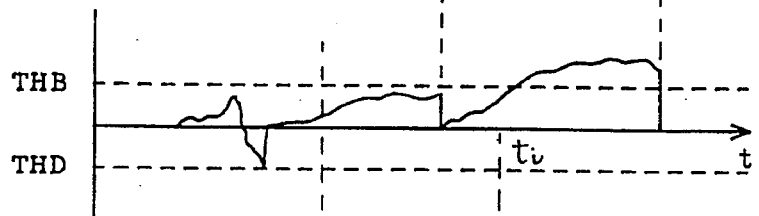
FIG. 36(g)
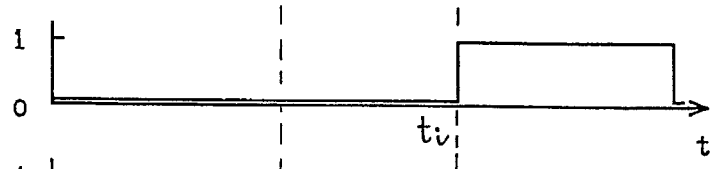
FIG. 36(h)

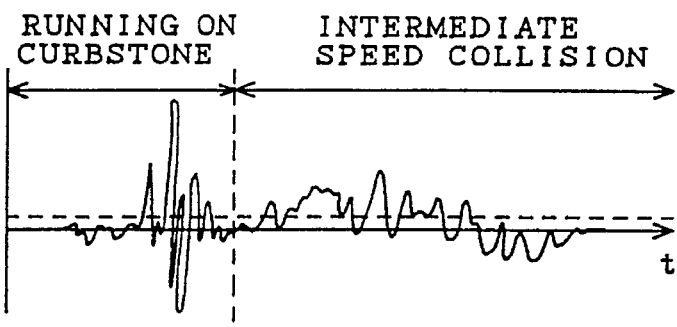
FIG. 37(a)  $g_A$
FIG. 37(b)  THA
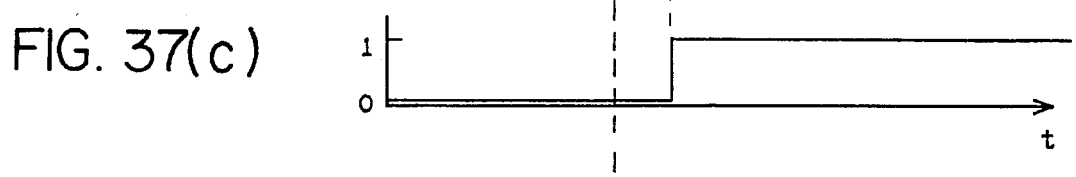
FIG. 37(c)
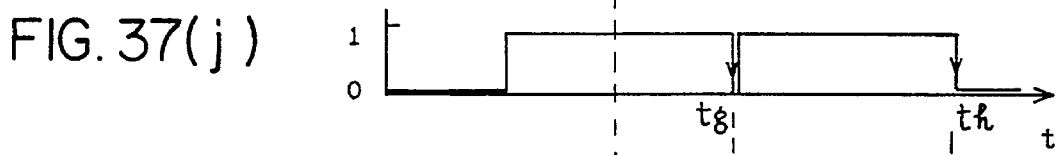
FIG. 37(j)
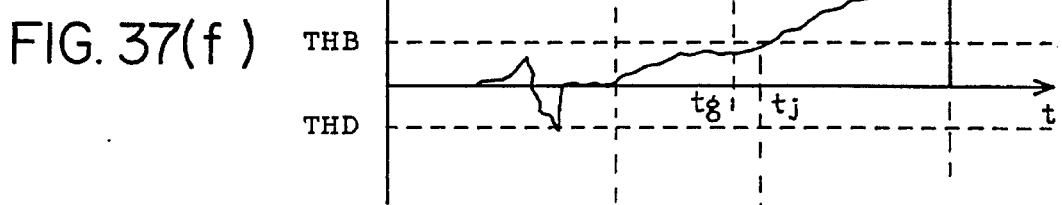
FIG. 37(f)  THB  THD
FIG. 37(g)
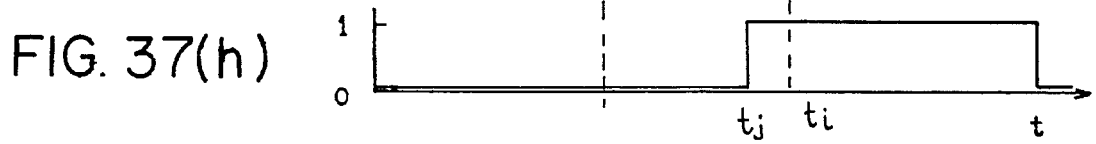
FIG. 37(h)

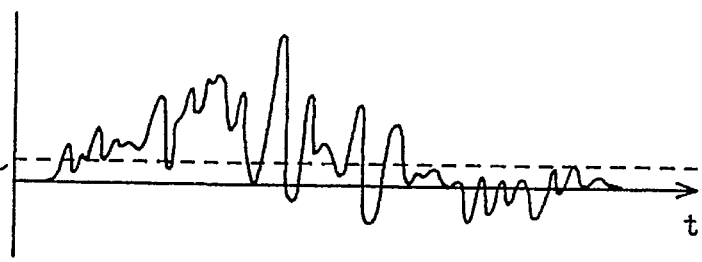
FIG. 54(a) $g_A$
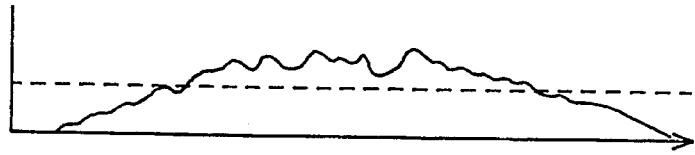
FIG. 54(b) THA
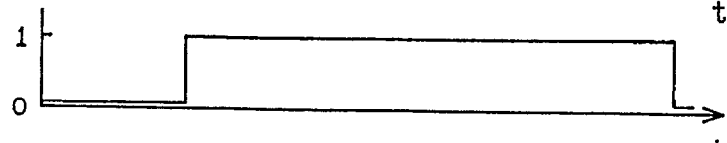
FIG. 54(c)
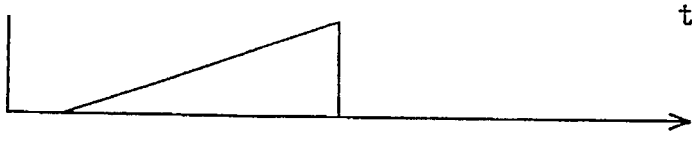
FIG. 54(p)
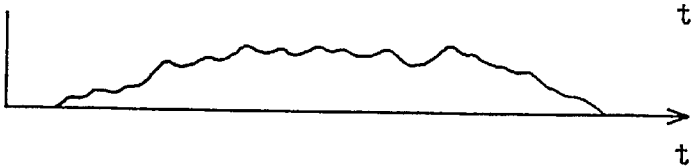
FIG. 54(d)
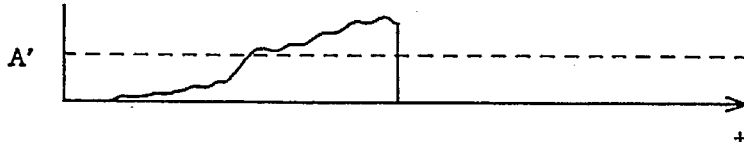
FIG. 54(q) A'
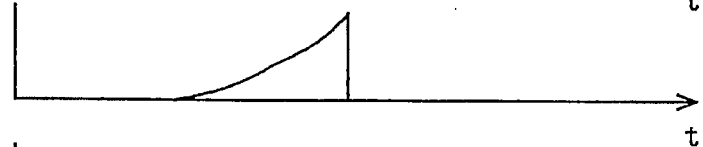
FIG. 54(s)
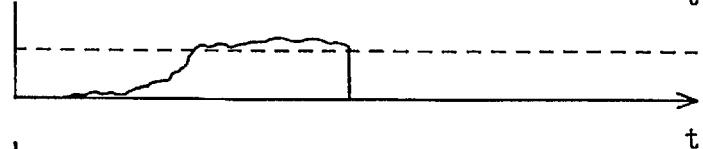
FIG. 54(r) THA'
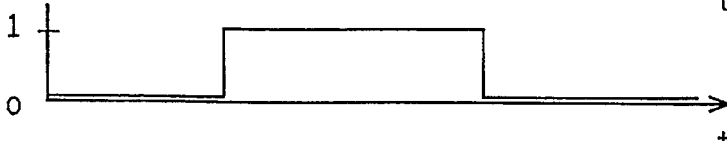
FIG. 54(g)
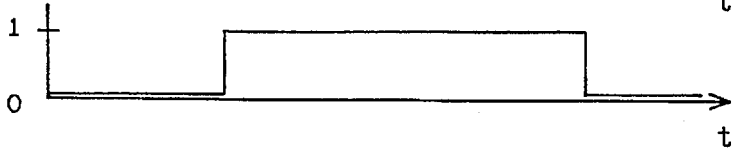
FIG. 54(h)

5,515,276

STARTING APPARATUS FOR PASSENGER PROTECTING APPARATUS

BACKGROUND OF THE INVENTION

1. Field of the Invention

The present invention relates to a starting apparatus for a passenger protecting apparatus such as an air bag or seat belt pretensioner, which is actuated by detecting collision of a vehicle.

2. Description of the Related Art

FIG. 56 shows a conventional air bag starting apparatus disclosed in, for example, Japanese Patent Publication (Kokai) No. 4-287748. In FIG. 56, reference numeral 1 means an acceleration sensor to output acceleration signals in an accelerating direction and in a decelerating direction of a vehicle, 1A is integration operating means for providing a total acceleration integral value indicating a variation in vehicle speed depending upon output from the acceleration sensor 1, and 2A is first comparing means for comparing the total acceleration integral value with a threshold level (hereinafter abbreviated as threshold value). Further, reference numeral 7 means accelerating direction integrating means for integrating the acceleration signal in the accelerating direction outputted from the acceleration sensor 1, and 4 is decelerating direction integrating means for integrating the acceleration signal in the decelerating direction outputted from the acceleration sensor 1. Reference numeral 3A means integral value ratio determining means for operating a ratio of an integral value of the decelerating direction integrating means 4 to another integral value of the accelerating direction integrating means 7, and 4A is second comparing means for comparing the integral value ratio with the threshold value. In addition, reference numeral 5A means trigger signal output means for outputting a trigger signal when it is decided in the first comparing means 2A that the total acceleration integral value is increased in the decelerating direction to exceed the threshold value, and it is decided in the second comparing means 4A that the integral value ratio exceeds the threshold value. Reference numeral 6A means a vehicle safety device which is actuated by receiving the trigger signal.

A description will now be given of the operation of the conventional apparatus. The acceleration sensor 1 outputs acceleration at a time of collision of the vehicle. The integration operating means 1A integrates the output from the acceleration sensor 1 to output a speed signal indicating the variation in vehicle speed. The first comparing means 2A generates output when the output from the integration operating means 1A is greater than a preset threshold value.

The accelerating direction integrating means 7 integrates only the accelerating direction acceleration signal outputted from the acceleration sensor 1. The decelerating direction integrating means 4 integrates only the decelerating direction acceleration signal outputted form the acceleration sensor 1. The integral value ratio operating means 3A finds the ratio of the integral value of the accelerating direction integrating means 7 to the integral value of the decelerating direction integrating means 4. Subsequently, the second comparing means 4A compares the ratio with a preset value to generate output. The trigger signal output means 5A outputs a trigger signal depending upon output from the first comparing means 2A and output from the second comparing means 4A, and the trigger signal actuates the vehicle safety device.

Impact, such as hammerblow, alternately causes excessively large acceleration in the accelerating direction and in the decelerating direction. When the impact is applied to the vehicle, the integral value ratio becomes substantially constant, and the second comparing means 4A causes no output. Hence, the trigger signal output means 5A outputs no trigger signal.

Even if the output from the integral value ratio operating means 3A exceeds the threshold value at the time of hammerblow and the second comparing means 4A generates an output, the threshold value of the first comparing means is set to a high value such that the output of the integration operating means 1A can not exceed the threshold value. As a result, the trigger signal output means 5A outputs no trigger signal.

On the other hand, when the vehicle collides in reality, the integral value in the decelerating direction exceeds the threshold value of the first comparing means 2A in a relatively short time. Therefore, the trigger signal output means 5A outputs the trigger signal depending upon output from the first comparing means 2A and the second comparing means 4A to rapidly actuate the vehicle safety device 6A.

The starting apparatus for the passenger protecting apparatus in the prior art is provided as set forth above. That is, the prior art has been proposed to detect the impact such as hammerblow requiring no actuation of the starting apparatus by discriminating the hammerblow impact from another impact caused by an actual collision depending upon the ratio of the integral values of the acceleration signals in the accelerating direction and in the decelerating direction. Consequently, the integral value in the decelerating direction may be greater than the integral value in the accelerating direction irrespective of the magnitude of impact. Any excess of the integral value ratio with respect to a predetermined value will prevent discrimination between hammerblow or the like and an actual collision. Thus, the threshold value to be compared with the integral value should be higher in order to make the actual collision decision with high-accuracy. As a result, there is a problem in that the actual collision decision is delayed.

SUMMARY OF THE INVENTION

In order to overcome the above problem, it is an object of the present invention to provide a starting apparatus for a passenger protecting apparatus which is not actuated in response to impact such as hammerblow requiring no actuation of the starting apparatus without delay of collision decision.

It is another object of the present invention to provide a starting apparatus for a passenger protecting apparatus which is not actuated in response to impact requiring no actuation, and is rapidly actuated in response to collision requiring actuation and occurring subsequently to the impact requiring no actuation.

It is still another object of the present invention to provide a starting apparatus for a passenger protecting apparatus which can surely avoid output of a starting signal in case of successive occurrence of impact requiring no actuation.

It is a further object of the present invention to provide a starting apparatus for a passenger protecting apparatus which is not actuated in response to impact requiring no actuation, can rapidly be actuated in response to collision requiring actuation and occurring subsequently to the impact requiring no actuation, and can avoid output of a starting signal in case of successive occurrence of impact requiring no actuation.

According to the present invention, for achieving the above-mentioned objects, there is provided a starting apparatus for a passenger protecting apparatus including control means for controlling generation of a starting signal depending upon a subtracted difference between output of decelerating direction integrating means for integrating a decelerating direction acceleration signal and output of accelerating direction integrating means for integrating an accelerating direction acceleration signal at a time of collision. Thus, the generation of the starting signal is controlled by the subtracted difference between a decelerating direction integral value and an accelerating direction integral value in the acceleration signal. It is thereby possible to surely avoid output of the starting signal with respect to impact such as hammerblow requiring no actuation, and rapidly output the starting signal in response to typical collision.

According to the present invention, there is provided a starting apparatus for a passenger protecting apparatus including integral value reset means for initializing, depending upon a subtracted difference between output of decelerating direction integrating means and output of accelerating direction integrating means, the decelerating integrating means and the accelerating direction integrating means to a certain value. Thus, the integral value reset means initializes a decelerating integrating integral value and an accelerating direction integral value to the certain value depending upon a subtraction difference between the decelerating direction integral value and the accelerating direction integral value in an acceleration signal. It is thereby possible to rapidly output a starting signal in response to typical collision occurring subsequently to generation of impact, such as running on a curbstone, requiring no starting signal.

According to the present invention, there is provided a starting apparatus for a passenger protecting apparatus including timer reset means started by receiving output from an acceleration sensor, for initializing decelerating direction integrating means and accelerating direction integrating means to a certain value after the elapse of a predetermined time. Thus, the timer reset means initializes a decelerating direction integral value and an accelerating direction integral value to the certain value after the elapse of the predetermined time from a rise time of an acceleration signal. It is thereby possible to surely avoid output of a starting signal in response to impact such as running on a curbstone, requiring no starting signal, which occurs subsequently to a low speed collision requiring no starting signal.

According to the present invention, there is provided a starting apparatus for a passenger protecting apparatus including comparing means for outputting after comparing a threshold value with a subtracted difference between output of decelerating direction integrating means and output of accelerating direction integrating means, timer reset means started by receiving output from an acceleration sensor, for outputting after the elapse of a predetermined time, and reset signal generating means for initializing the decelerating direction integrating means and the accelerating direction integrating means to a certain value depending upon output of the comparing means and output of the timer reset means.

According to the present invention, there is provided a starting apparatus for a passenger protecting apparatus including switching means started by receiving output from an acceleration sensor, for closing an output path of control means depending upon output supplied from delay means after the elapse of a predetermined time. Thus, the delay means closes the switching means mounted to the output path of the control means for controlling generation of a starting signal after the elapse of the predetermined time from a rise time of output of an acceleration sensor. It is thereby possible to surely avoid output of the starting signal in a range in which sharp and large acceleration occurs at the beginning of impact as in a waveform of hammerblow.

According to the present invention, there is provided a starting apparatus for a passenger protecting apparatus including time function generating means started by receiving output from an acceleration sensor, for generating a time function, and multiplying means for multiplying output from the timer function generating means by a subtracted difference between output of decelerating direction integrating means and output of accelerating direction integrating means. Thus, the multiplying means multiplies the time function by the subtracted difference between a decelerating direction integral value and an accelerating direction integral value in an acceleration signal. It is thereby possible to easily and surely discriminate one case where sharp and large acceleration occurs at the beginning of impact as in a waveform of hammerblow, from the other case where acceleration is present for a relatively long period, for example, at the time of collision.

According to the present invention, there is provided a starting apparatus for a passenger protecting apparatus including multiplying means for multiplying output of first time function generating means by a subtracted difference between output of decelerating direction integrating means and output of accelerating direction integrating means, and subtracting means for subtracting output of second time function generating means from output of the multiplying means. Thus, the multiplying means multiplies the first time function by the subtracted difference between a decelerating direction integral value and an accelerating direction integral value in an acceleration signal. Further, the subtracting means subtracts a second time function from the multiplied value. It is thereby possible to easily and surely discriminate one case where sharp and large acceleration successively occurs at the beginning of impact as a waveform of hammerblow, or impact occurs to extend a time width, from the other case where low acceleration is present for a relatively long period, for example, at a time of collision.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIGS. 15(a)–(h) show signal waveform diagrams at each section, thus illustrating the operation, in the embodiment of FIG. 1;

FIGS. 17(a)–(c) show characteristic diagrams illustrating a principle in the embodiment of FIG. 1;

FIGS. 23(a)–(h) show signal waveform diagrams at each section, thus illustrating the operation, in the embodiment of FIG. 20;

FIGS. 24(a)–(h) show signal waveform diagrams at each section, thus illustrating the operation, in the embodiment of FIG. 20;

FIGS. 30(a)–(h) show signal waveform diagrams at each section, thus illustrating the operation, in the embodiment of FIG. 25;

FIGS. 36(a)–(c), (f)–(h) and (j) show signal waveform diagrams at each section, thus illustrating the operation, in the embodiment of FIG. 29;

FIGS. 37(a)–(c), (f)–(h) and (j) show signal waveform diagrams at each section, thus illustrating the operation, in the embodiment of FIG. 29;

FIGS. 54(a)–(d), (g)–(h) and (p)–(s) show signal waveform diagrams at each section, thus illustrating the operation, in the embodiment of FIG. 49;

DETAILED DESCRIPTION OF THE PREFERRED EMBODIMENTS

Preferred embodiments of the invention will now be described in detail referring to the accompanying drawings.

Embodiment 1

Figure 1:
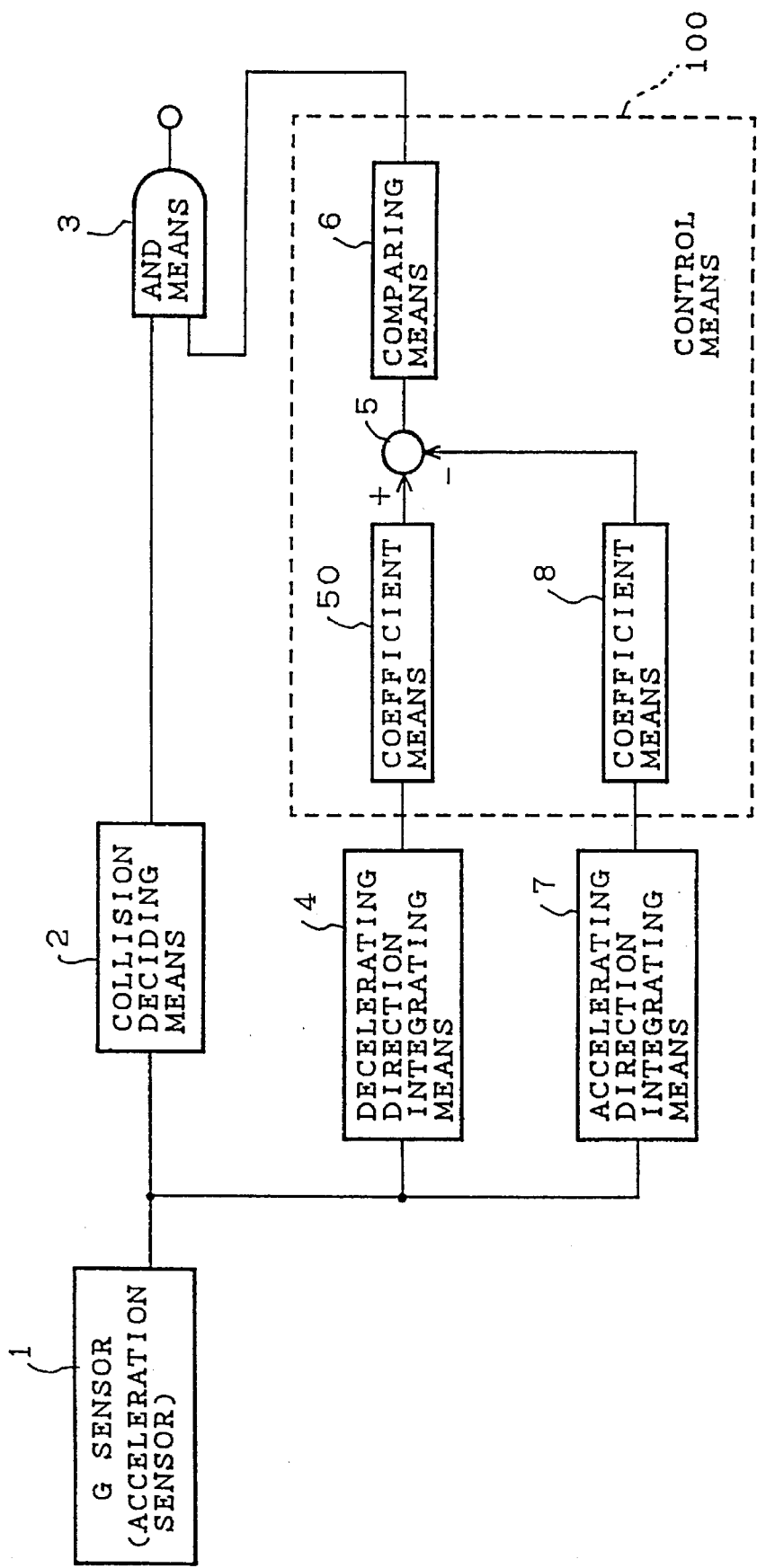
FIG. 1 is a block diagram showing a basic structure according to an embodiment 1 of the present invention.

FIG. 1 is a block diagram showing a basic structure according to the embodiment 1 of the present invention. Reference numeral 1 means an acceleration sensor (hereinafter abbreviated as G sensor) to detect acceleration at a time of collision, and 2 is a collision deciding means for making a collision decision depending upon output from the G sensor 1. Reference numeral 4 means decelerating direction integrating means for integrating an acceleration signal in a decelerating direction by using the output from the G sensor 1, and 7 is an accelerating direction integrating means for integrating an acceleration signal in an accelerating direction by using the output from the G sensor 1. Reference numeral 50 means a coefficient means for weighting output from the decelerating direction integrating means 4 by multiplying the output by a coefficient $k_1$, and 8 is a coefficient means for weighting output from the accelerating direction integrating means 7 by multiplying the output by a coefficient $k_2$. Further, reference numeral 5 means a subtraction processing section to subtract the output of the accelerating direction integrating means 7, which is weighted by the coefficient means 8, from the output of the decelerating direction integrating means 4, which is weighted by the coefficient means 50. In addition, reference numeral 6 means comparing means for comparing a subtracted difference output from the subtraction processing section 5 with a threshold value. The two coefficient means 8, 50, the subtraction processing section 5, and the comparing means 6 form control means 100 for controlling generation of a starting signal. Reference numeral 3 denotes AND means for outputting the starting signal depending upon a logical product of output from the collision deciding means 2 and output from the control means 100.

Figure 2:
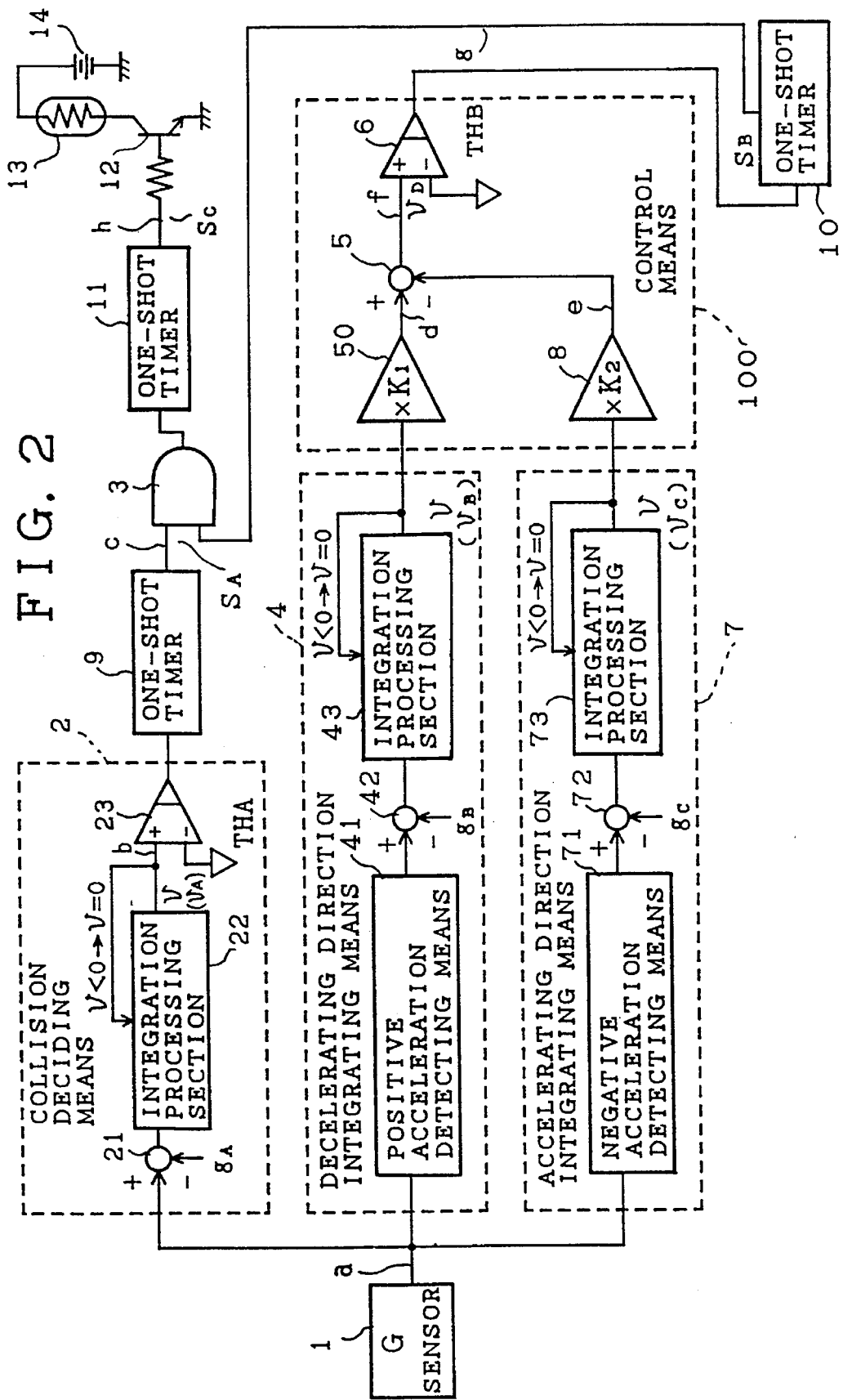
FIG. 2 is a block diagram showing a specific structure according to the embodiment of FIG. 1.

FIG. 2 is a block diagram showing a detailed structure according to the embodiment 1. In FIG. 2, the collision deciding means 2 includes a subtraction processing section 21 to subtract a constant value $g_A$ from the acceleration signal g detected in the G sensor 1, an integration processing section 22 having a function to initialize to zero (hereinafter abbreviated as reset function) when an integral value v of output from the subtraction processing section 21 is less than zero, and comparing means 23 for comparing the integral value v with a threshold value THA. Further, the collision deciding means 2 can start the integration processing at the same time of a rise of the output of the G sensor.

Figure 3:
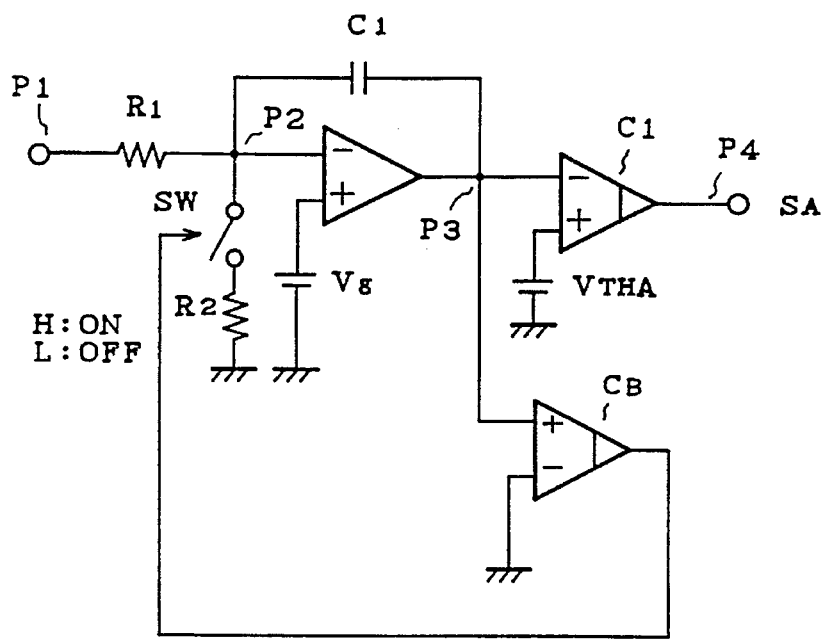
FIG. 3 is a specific circuit diagram of collision deciding means.

FIG. 3 shows a specific circuit embodiment of the collision deciding means 2. For example, when the output of the G sensor 1 is inputted into a point $P_1$, differential voltage exceeding offset voltage $V_g$ is integrated in an integrating circuit including a resistor $R_1$ and a capacitor $C_1$ to be present at a point $P_3$ (in this case, voltage at the point $P_3$ being gradually reduced less than zero volts since the point $P_2$ serves as inverting input). At a time of hammering, the voltage at the point $P_3$ is never below a threshold value $V_{THA}$ of a comparator $C_A$, and thus a collision deciding signal $S_A$ is not outputted to a point $P_4$. When the G sensor 1 generates no output, integration is carried out by offset $V_g$ at a time so that voltage at a point $P_3$ approaches zero volts. However, a comparator $C_B$ outputs a signal to close a switch SW so as to discharge charge stored in the capacitor $C_1$ through a resistor $R_2$. Hence, the voltage at the point $P_3$ never exceeds zero volts. When output at a time of intermediate-high speed collision is inputted from the G sensor 1, the integrated voltage is below the threshold value $V_{THA}$ of the comparator $C_A$. As a result, the comparator $C_A$ outputs the collision deciding signal $S_A$.

Figure 4:
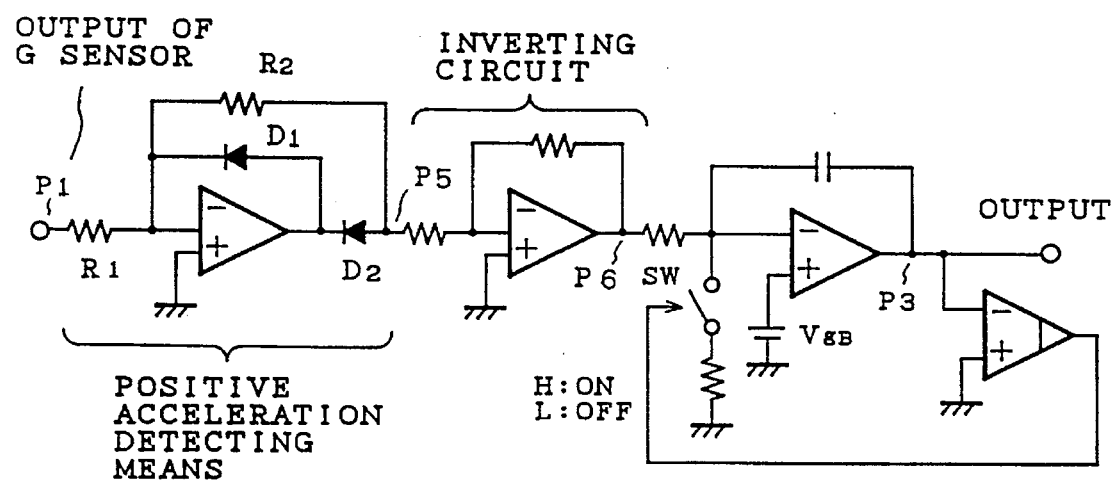
FIG. 4 is a specific circuit diagram of decelerating direction integrating means.

The decelerating direction integrating means 4 includes positive acceleration detecting means 41 for detecting only a positive acceleration in the acceleration signal g detected by the G sensor (the G sensor 1 being set to generate the positive acceleration at a time of deceleration of a vehicle), a subtraction processing section 42 to subtract a constant value $g_B$ from output of the positive acceleration detecting means 41, and an integration processing section 43 having a reset function to integrate output from the substraction processing section 42. FIG. 4 shows an illustratively specific circuit of the decelerating direction integrating means 4. For example, when the output of the G sensor 1 is inputted into the point $P_1$, a half-wave rectifier circuit including diodes $D_1$ and $D_2$ causes a signal at a point $P_5$ after the negative side of the signal is removed. In this case, the half-wave rectifier circuit serves as inverting input so that polarity is inverted in an inverting circuit at a subsequent stage, and only the positive acceleration is present at a point $P_6$. Subsequent stage circuits are identical with those of the collision deciding means shown in FIG. 3, and descriptions thereof are omitted. Since little negative acceleration is outputted in case of an intermediate-high speed collision waveform, the positive acceleration can be detected in the subsequent circuits.

Figure 5:
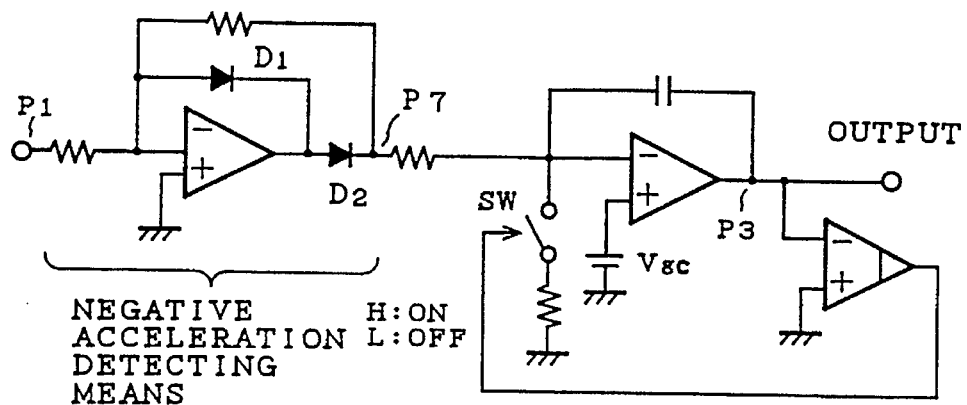
FIG. 5 is a specific circuit diagram of accelerating direction integrating means.

The accelerating direction integrating means 7 includes negative acceleration detecting means 71 for detecting only the negative acceleration in the acceleration signal g detected by the G sensor 1, a subtraction processing section 72 to subtract a constant value $g_C$ from output of the negative acceleration detecting means 71, and an integration processing section 73 having a reset function to integrate output of the subtraction processing section 72. FIG. 5 illustrates a specific circuit of the accelerating direction integrating means 7. For example, a half-wave rectifier circuit including diodes $D_1$ and $D_2$ cuts the positive acceleration to output the negative acceleration to a point $P_7$ in an inverted state (i.e., in a positive state). The negative acceleration is outputted to some extent at a time of hammering, and little negative acceleration is outputted at the time of intermediate-high speed collision. Subsequent stage circuits are identical with those of the collision deciding means, and descriptions thereof are omitted.

In FIG. 2, reference numeral 9 means a one-shot timer which provides an ON state for a constant period from a fall time of output of the collision deciding means 2, 10 is a one-shot timer which provides an ON state for a constant period from a fall time of output of the comparing means 6, and 11 is a one-shot timer which provides an ON state for a constant period from a fall time of output of the AND means 3. A transistor 12 for switching is controlled by output from the one-shot timer 11, and the transistor 12 is connected in series to starting means 13 (referred to as squib) for a passenger protecting apparatus, and to a dc power source 14.

Figure 6:
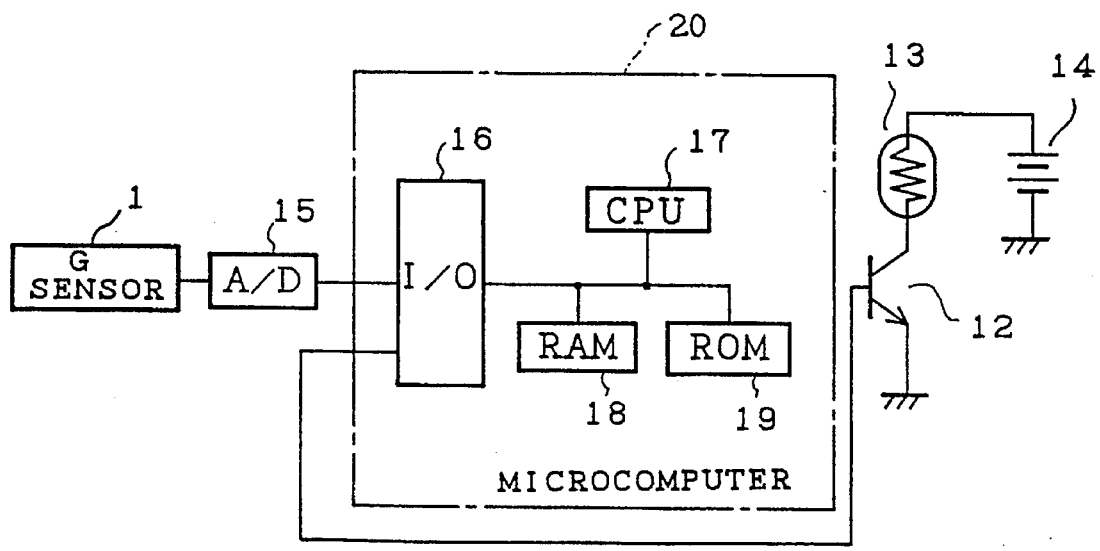
FIG. 6 is a block diagram in which a collision deciding algorithm according to the embodiment 1 of the present invention includes a microcomputer.

FIG. 6 is a block diagram showing the apparatus shown in FIG. 2 implemented in software using a microcomputer. The structure of the implementation in FIG. 6 includes an A/D converter 15 to digitize an analog output from the G sensor 1, and a microcomputer 20 having an I/O device 16, a central processing unit (CPU) 17, a random access memory (RAM) 18, and a read-only memory (ROM) 19. The same reference numerals are used for other component parts identical with those of FIG. 2, and descriptions thereof are omitted.

A description will now be given of the operation in the embodiment 1, i.e., the operation in software processing of the microcomputer 20 shown in FIG. 6 with reference to flowcharts.

Figure 7:
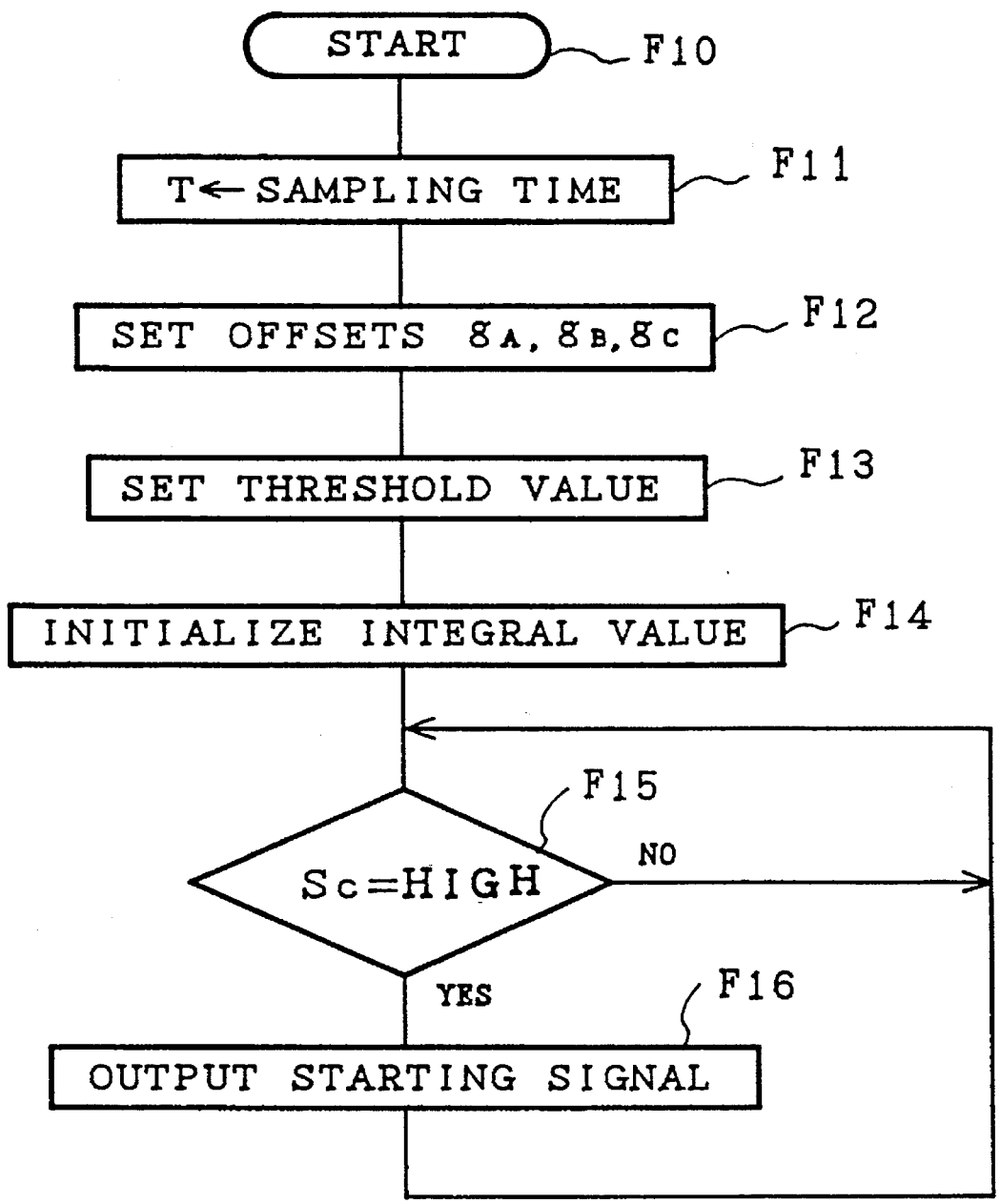
FIG. 7 is a flowchart illustrating an operation in the embodiment of FIG. 1.

FIG. 7 is a flowchart showing main control. The operation is started in Step F10, and a sampling time T is inputted in Step F11. Offset values $g_A$, $g_B$, and $g_C$ are set in Step F12, and threshold values THA, THB, and THC for collision decision are inputted in Step F13. In Step F14, the integral value used for the integrating means is initialized to a certain value, for example, to zero (hereinafter referred to as initialized to zero or reset to zero). When a starting signal $S_C$ is High in Step F15, the operation proceeds in a direction of YES to output the starting signal in Step F16, and returns to Step F15. When the starting signal $S_C$ is Low in Step F15, the operation proceeds in a direction of NO to return to Step F15, and the same processing will be repeated.

Figure 8:
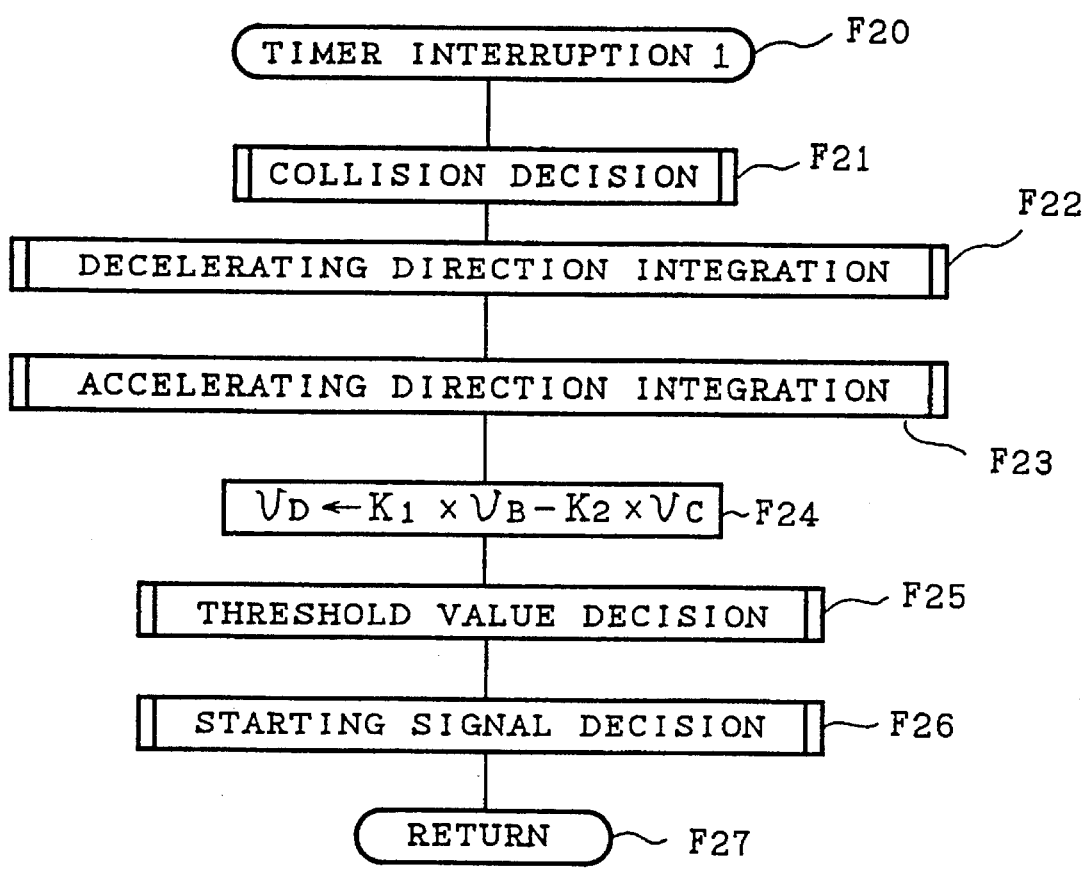
FIG. 8 is a flowchart illustrating the operation in the embodiment of FIG. 1.

FIG. 8 is a flowchart showing processing which is carried out by a timer interruption for each constant time during the main control described above. The operation is started in Step F20, and a collision decision is made in Step F21. A decelerating direction integral value is found in Step F22, and an accelerating direction integral value is found in Step F23. In Step F24, the decelerating direction integral value $v_B$ is multiplied by a preset constant $k_1$, the accelerating direction integral value $v_C$ is multiplied by a preset constant $k_2$, and the latter is subtracted from the former to define the resultant subtracted value as $v_D$. Subsequently, in Step F25, $v_D$ is compared with a preset threshold value. In Step F26, it is decided whether or not the starting signal is to be generated depending upon the result of decision in Step F21 and the result of decision in Step F25, and the timer interruption 1 is ended.

Figure 9:
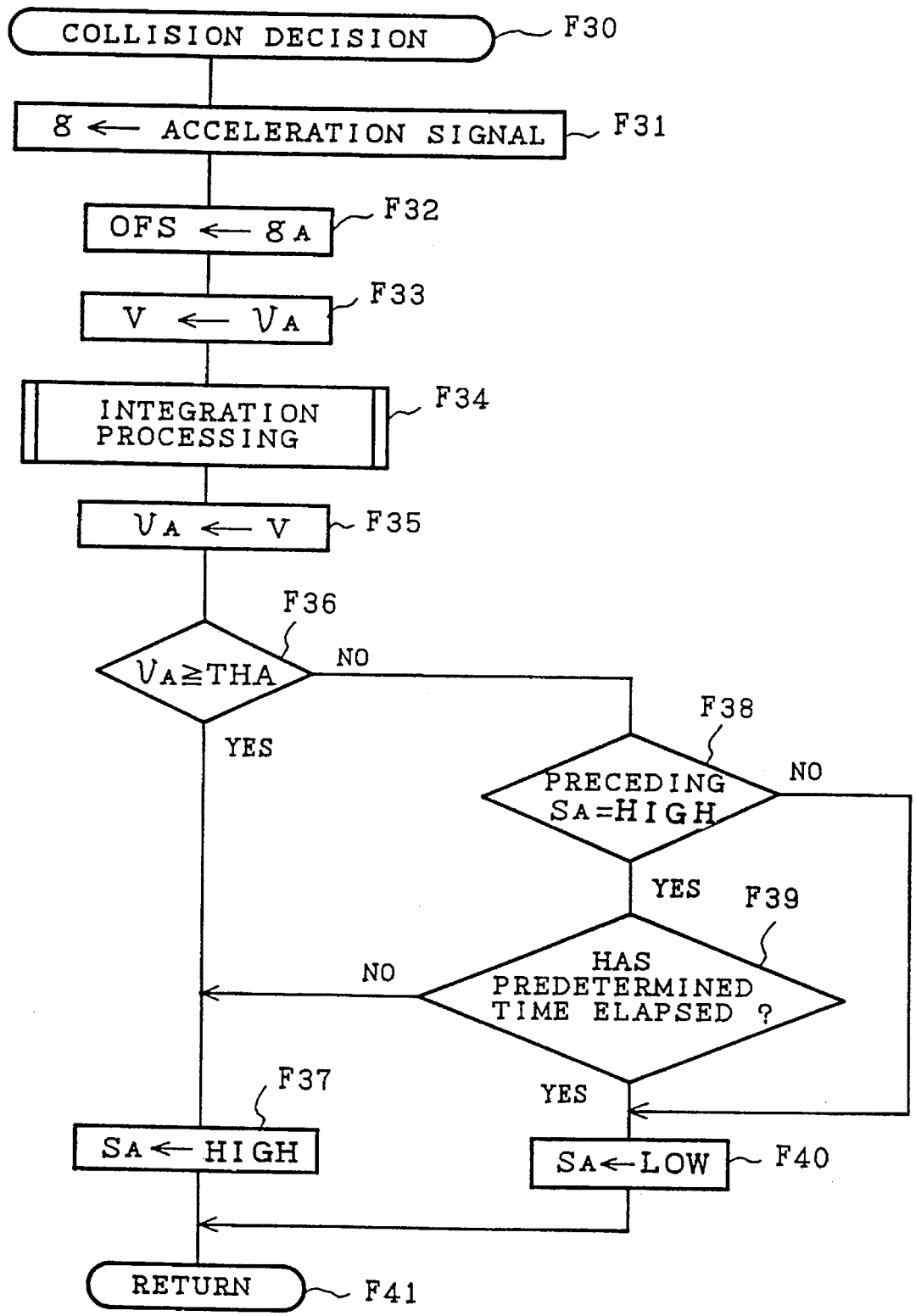
FIG. 9 is a flowchart illustrating the operation in the embodiment of FIG. 1.
Figure 10:
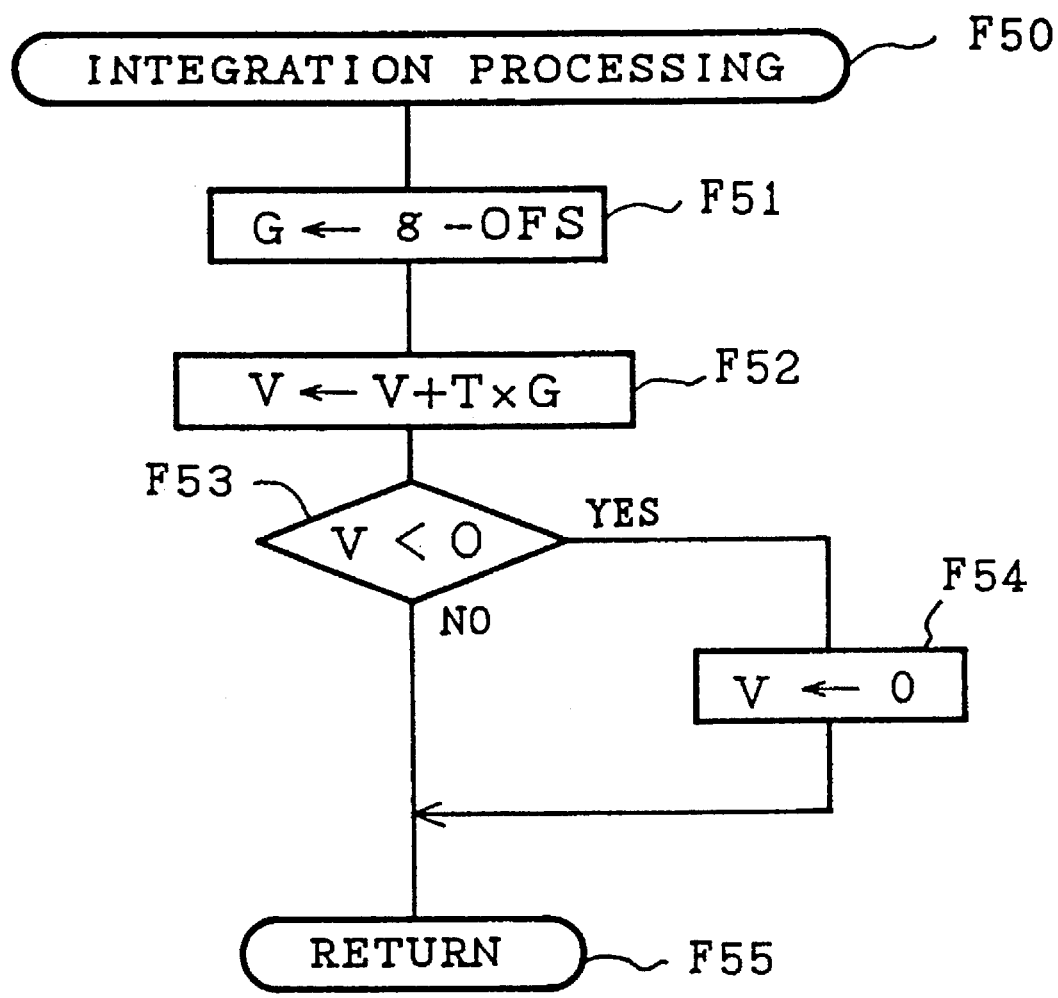
FIG. 10 is a flowchart illustrating the operation in the embodiment of FIG. 1.

In the collision decision, as shown in FIG. 9, the acceleration signal from the G sensor 1 is inputted into g in Step F31, the offset $g_A$ is set to offset OFS in Step F32, the integral value $v_A$ is set to an integral value V in Step F33, and integration processing is carried out in Step F34. The integration processing corresponds to Steps F50 to F55 shown in FIG. 10. In Step F51, the offset value OFS set in Step F32 is subtracted from the acceleration signal g inputted in Step F31, resulting in an acceleration signal G. In Step F52, the integral value V set in Step F33 is added to a value obtained by multiplying the acceleration signal G by the sampling time T set in Step F11. When the integral value V is less than zero in Step F53, the operation proceeds in a direction of YES, that is, proceeds to Step F54 where the integral value V is reset to zero. Further, the operation proceeds to Step F55 to return to Step F34. Alternatively, when the integral value V is greater than zero in Step F53, the operation proceeds in a direction of NO, that is, proceeds to Step F55 to terminate Step F34.

Next, the integral value V is changed to the original integral value $v_A$ in Step F35. When the integral value $v_A$ is less than the threshold value THA in Step F36, the operation proceeds in a direction of NO. If the preceding collision deciding signal $S_A$ is High, it is decided that a fall of the collision deciding signal is detected, and the operation proceeds in a direction of YES, that is, proceeds to Step F39. When a predetermined time has elapsed from a fall time of the collision deciding signal $S_A$ in Step F39, the operation proceeds in a direction of YES to Step F40 where the collision deciding signal $S_A$ is set to Low, and proceeds to Step F41 to return to Step F21. Alternatively, when the preceding collision deciding signal $S_A$ is Low in Step F38, the operation proceeds in a direction of NO to Step F40 where the collision deciding signal $S_A$ is set to Low, and proceeds to Step F41 to return to Step F21. Alternatively, in case the integral value $v_A$ is greater than or equal to the threshold value THA in Step F36 or in case the predetermined time has not elapsed in Step F39, the collision deciding signal $S_A$ is set to High, and the operation returns to Step F21.

Figure 11:
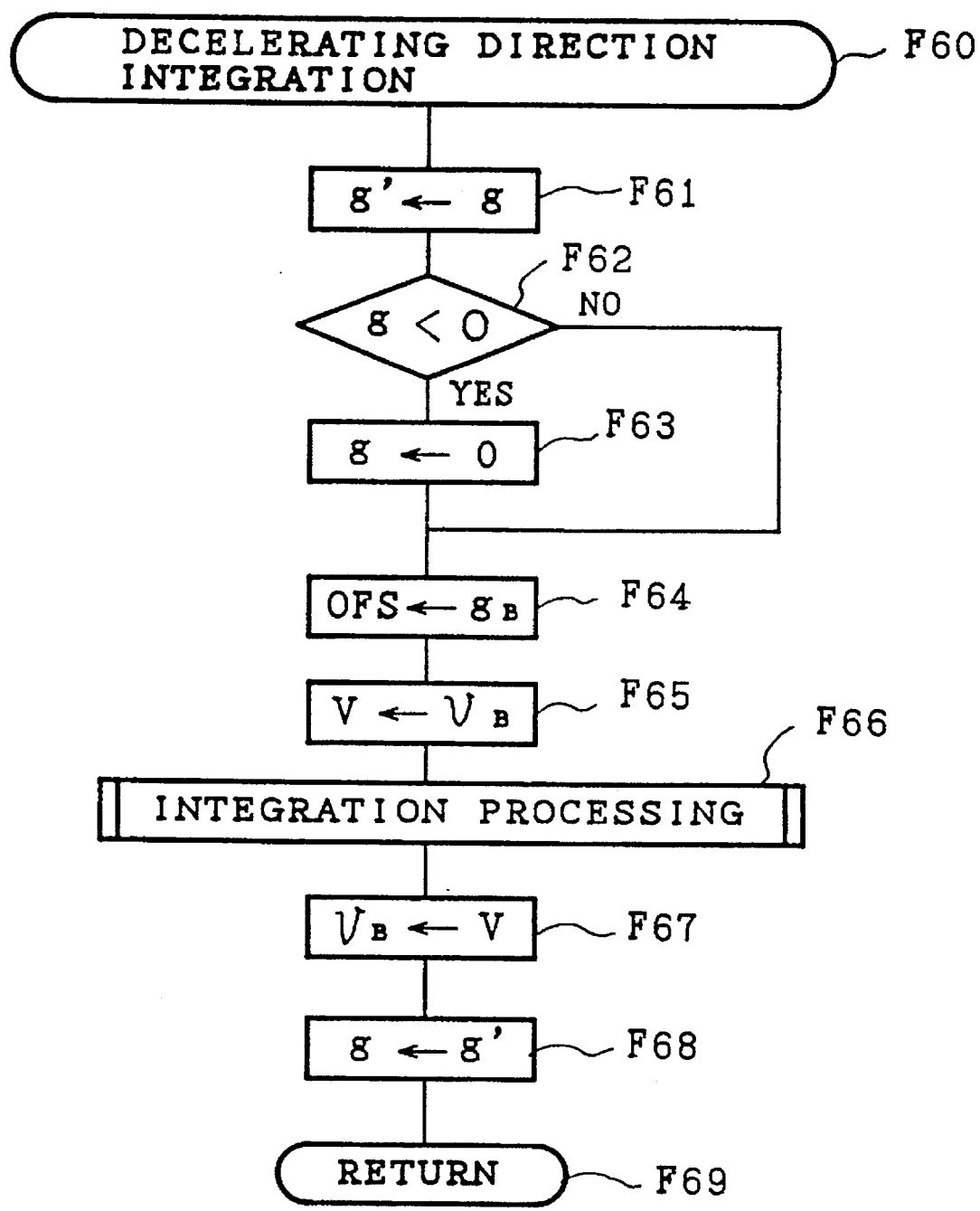
FIG. 11 is a flowchart illustrating the operation in the embodiment of FIG. 1.

In decelerating direction integration, as shown in FIG. 11, the acceleration signal g is set to an acceleration signal g' in Step F61, and it is decided whether or not the input acceleration signal g is less than zero in Step F62. If less than zero, the operation proceeds in a direction of YES to Step F63 where the acceleration signal g is set to zero, and proceeds to Step F64. Alternatively, when it is decided that the input acceleration signal g is greater than or equal to zero in Step F62, the operation proceeds to Step F64. Subsequently, the offset $g_B$ is set to the offset OFS in Step F64, the integral value $v_B$ is set to the integral value V in Step F65, and the above integration processing is carried out in Step F66.

Further, the integral value V is set to the integral value $v_B$ in Step F67, the acceleration signal g' is set to the acceleration signal g in Step F68, and the operation proceeds to Step F69 to terminate Step F22.

Figure 12:
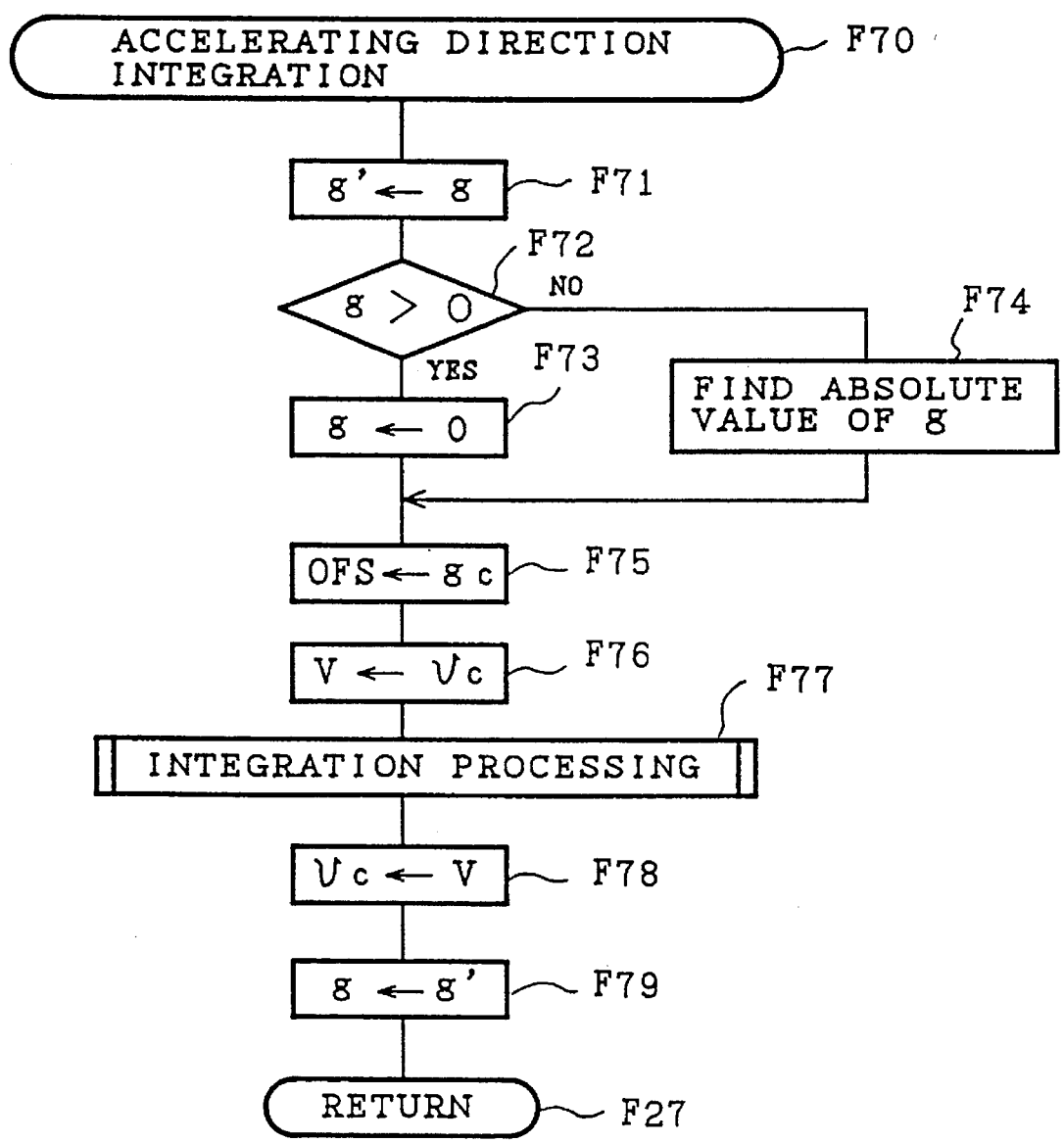
FIG. 12 is a flowchart illustrating the operation in the embodiment of FIG. 1.

In accelerating direction integration, as shown in FIG. 12, the acceleration signal g is set to the acceleration signal g' in Step F71, and it is decided whether or not the acceleration signal g is greater than zero in Step F72. If greater than zero, the operation proceeds in a direction of YES.

The acceleration signal g is set to zero in Step F73, and the operation proceeds to Step F75. Alternatively, if it is decided that the acceleration signal g is less than or equal to zero in Step F72, the operation proceeds in a direction of NO to Step F74 to find an absolute value of the acceleration signal g, and proceeds to Step F75. The offset $g_C$ is set to the offset OFS in Step F75, the integral value $v_C$ is set to the integral value V in Step F76, and the above integration processing is carried out in Step F77.

Subsequently, V is set to the integral value $v_C$ in Step F78, and the acceleration signal g' is set to the acceleration signal g in Step F79. The operation proceeds to Step F80 to terminate Step F23.

Figure 13:
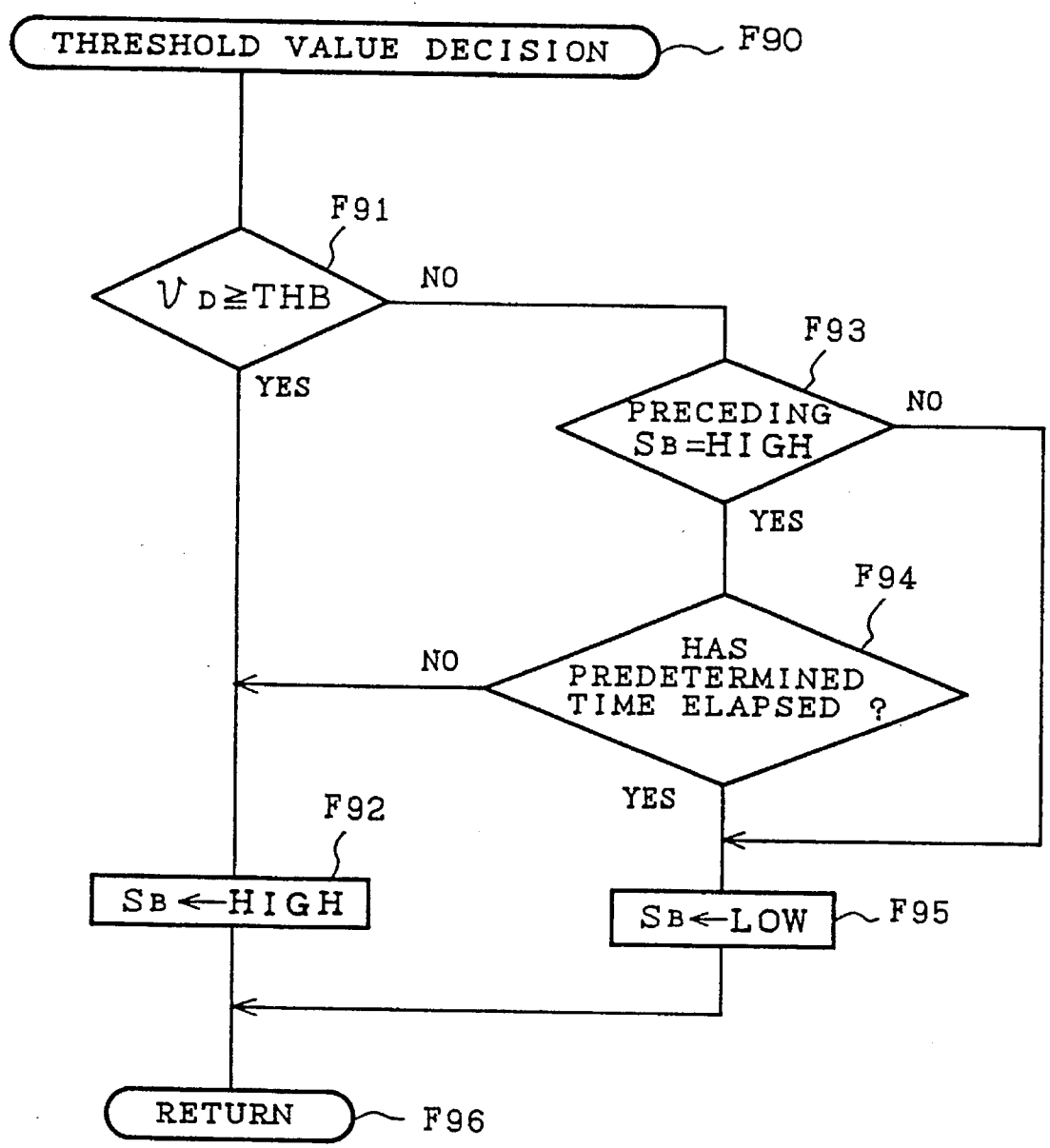
FIG. 13 is a flowchart illustrating the operation in the embodiment of FIG. 1.

In decision of the threshold value, as shown in FIG. 13, when the integral value $v_D$ is less than the threshold value THB in Step F91, the operation proceeds in a direction of NO. If a preceding control signal $S_B$ is High in Step F93, it is decided that a fall of the control signal $S_B$ is detected, and the operation proceeds in a direction of YES. When a predetermined time has elapsed from a fall time of the control signal $S_B$ in Step F94, the operation proceeds in a direction of YES, and the control signal $S_B$ is set to Low in Step F95. Further, in case the predetermined time has not elapsed from the fall time of the control signal $S_B$ in Step F94 or in case $v_D$ is greater than or equal to the threshold value THB in Step F91, the control signal $S_B$ is set to High in Step F92.

Figure 14:
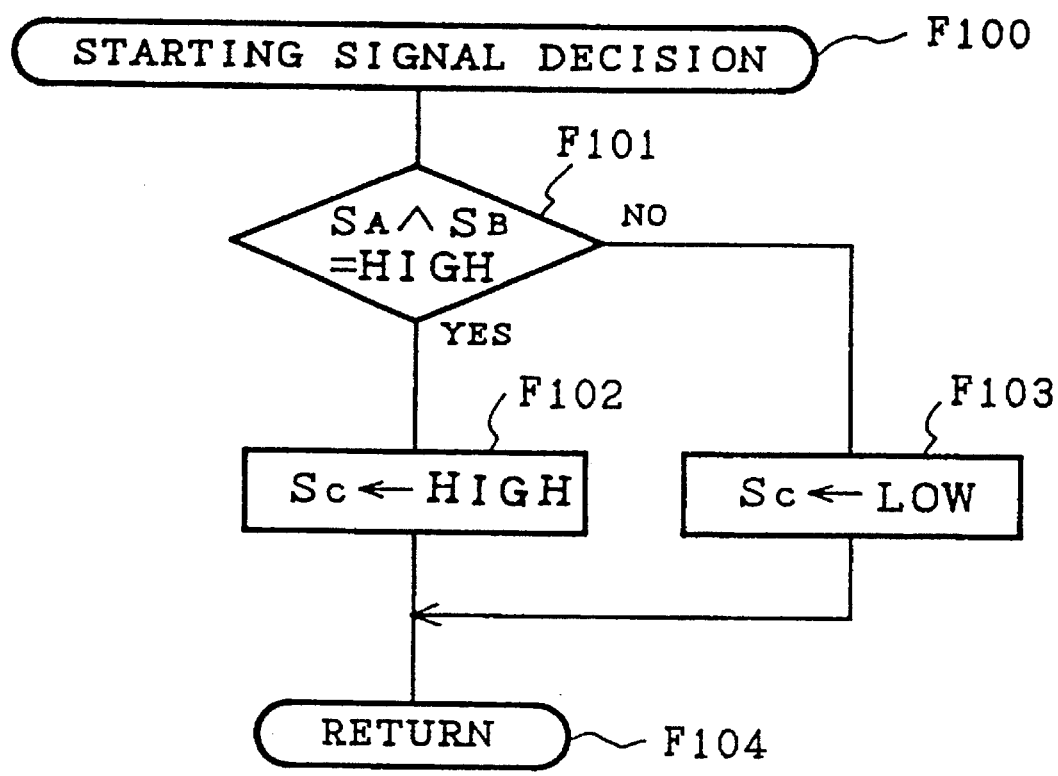
FIG. 14 is a flowchart illustrating the operation in the embodiment of FIG. 1.

In decision of the starting signal, as shown in FIG. 14, when at least one of the collision deciding signal $S_A$ and the control signal $S_B$ is Low in Step F101, the operation proceeds in a direction of NO to Step F103 where the starting signal $S_C$ is set to Low. Alternatively, if both the collision deciding signal $S_A$ and the control signal $S_B$ are High in Step F101, the starting signal $S_C$ is set to High in Step F102.

FIGS. 15(a)–(h) shows each output waveform at each section of the apparatus shown in FIG. 2 at a time of collision at an intermediate speed (of about 25 km/h) requiring the starting signal of the passenger protecting apparatus. FIG. 15(a) shows an output waveform of the G sensor 1 at the time of intermediate speed collision requiring the starting signal $S_C$, and FIG. 15(b) shows an integrated output waveform obtained by subtracting the predetermined value $g_A$ from the output waveform FIG. 15(a) and integrating in the integration processing section 22 of FIG. 2. The threshold value THA in the drawing is a value which is determined depending upon an integral value of an acceleration waveform in collision at a low speed (of about 13 km/h) requiring no starting signal $S_C$.

FIG. 15(c) shows an output waveform of the one-shot timer 9, and FIG. 15(d) shows an output waveform of the coefficient means 50 which is obtained by fetching a positive (decelerating direction) acceleration signal from the output waveform of the G sensor 1, subtracting the predetermined offset value $g_B$ from the positive acceleration signal, integrating in the integration processing section 43 of FIG. 2 to provide an integrated output waveform, and multiplying the integrated output waveform by predetermined coefficient $k_1$. FIG. 15(e) shows an output waveform of the coefficient means 8 which is obtained by fetching a negative (accelerating direction) acceleration signal from the output waveform of the G sensor 1, subtracting the predetermined offset value $g_C$ from the negative acceleration signal, and multiplying an integrated output waveform integrated in the subtraction processing section 73 of FIG. 2 by coefficient $k_2$ set to be greater than the coefficient $k_1$. FIG. 15(f) shows an output waveform of the subtraction processing section 5 which is obtained by subtracting the output waveform FIG. 15(e) of the coefficient means 8 from the output waveform FIG. 15(d) of the coefficient means 50. In the figures, the threshold value THB is a value set to be greater than a peak value in the waveform of the subtraction processing section 5 in case of a waveform of impact due to, for example, running on a curbstone or hammerblow requiring no starting. FIG. 15(g) shows an output waveform of the one-shot timer 10, and FIG. 15(h) shows an output waveform of a starting signal. In this case, the output waveform FIG. 15(c) of the one-shot timer 9 and the output waveform FIG. 15(g) of the one-shot timer 10 are ANDed by the AND means 3, and the output of the AND means 3 actuates the one-shot timer 11 to output the starting signal.

In the embodiment, as shown in FIG. 15(b), the integrated waveform outputted from the integration processing section 22 exceeds the threshold value THA at a relatively early time. Further, the output waveform 15(c) of the one-shot timer 9 is left set to High for a certain time.

In the intermediate collision waveform, the integral value of the positive acceleration signal is increased at relatively earlier times after the beginning of a collision than a time at which the integral value of the negative acceleration signal is increased. The output waveform FIG. 15(f) of the subtraction processing section 5 is obtained by subtracting the output waveform of the coefficient means 8 from the output waveform FIG. 15(d) of the coefficient means 50, and exceeds the threshold value THB at a relatively early time. Consequently, the output waveform FIG. 15(g) of the one-shot timer 10 becomes High, and a logical product of the output waveform of the one-shot timer 9 and the output waveform of the one-shot timer 10 drives the one-shot timer 11, thereby setting the output waveform FIG. 15(h) of the starting signal $S_C$ to High at a certain time. The High starting signal $S_C$ causes the transistor 12 to conduct, and actuates the starting means 13 to protect a passenger.

Figure 16A:
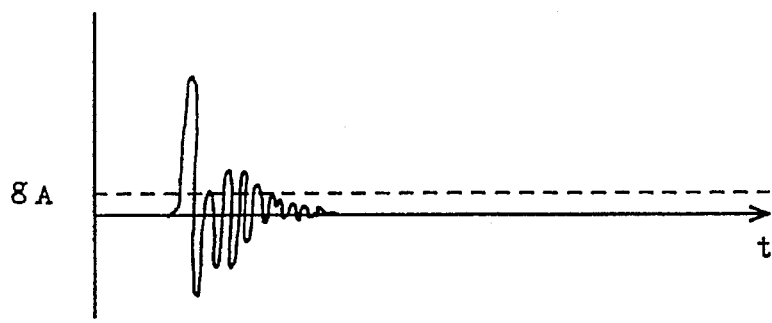
FIGS. 16(a)–(h) show signal waveform diagrams at each section, thus illustrating the operation, in the embodiment of FIG. 1.
Figure 16B:
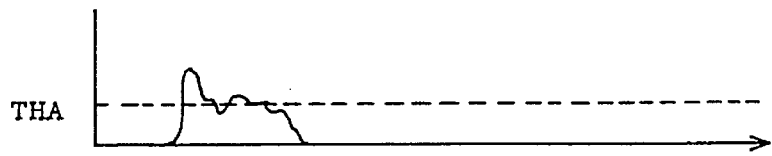
Figure 16C:
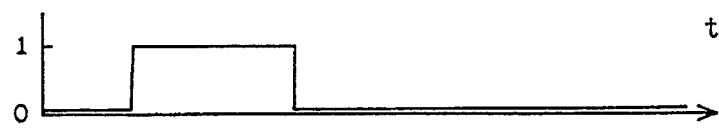
Figure 16D:
Figure 16E:
Figure 16F:
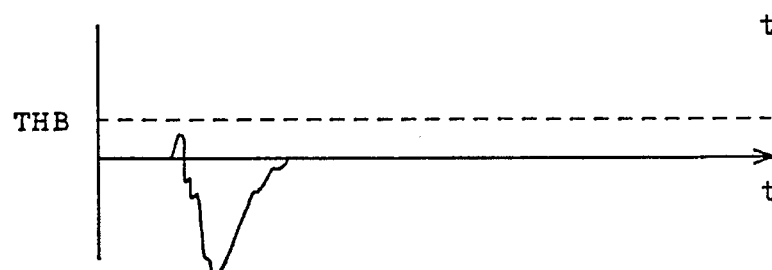
Figure 16G:
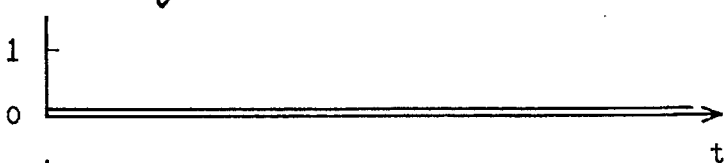
Figure 16H:
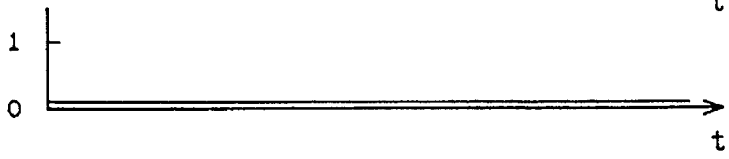

FIGS. 16(a)–(h) are signal waveform diagrams at each section of the apparatus shown in FIG. 2 at a time of impact such as hammerblow. FIG. 16(a) shows an output waveform of the G sensor 1 at the time of hammerblow requiring no starting, and FIG. 16(b) shows an integrated output waveform obtained by subtracting the predetermined offset value $g_A$ from the output waveform and integrating in the integration processing section 22 of FIG. 2. FIG. 16(c) shows an output waveform of the one-shot timer 9, and FIG. 16(d) shows an output waveform of the coefficient means 50 obtained by fetching the positive acceleration signal from the output waveform of the G sensor 1, subtracting the predetermined offset value $g_B$ from the positive acceleration signal, integrating in the integration processing section 43 of FIG. 2 to provide the integrated output waveform, and multiplying the integrated output waveform by the predetermined coefficient $k_1$. FIG. 16(e) shows an output waveform of the coefficient means 8 of FIG. 2 obtained by fetching the negative acceleration signal from the output waveform of the G sensor 1, subtracting the predetermined offset value $g_C$ from the negative acceleration signal, integrating in the subtraction processing section 73 of FIG. 2 to provide the integrated output waveform, and multiplying the integrated output waveform by the coefficient $k_2$, which is set to be greater than the coefficient $k_1$. FIG. 16(f) shows an output waveform of the subtraction processing section 5 which is obtained by subtracting the output waveform FIG. 16(e) of the coefficient means 8 from the output waveform FIG. 16(d) of the coefficient means 50. FIG. 16(g) shows an output waveform of the one-shot timer 10, and FIG. 16(h) shows an output waveform of the starting signal $S_C$. In this case, the output waveform FIG. 16(c) of the one-shot timer 9 and the output waveform FIG. 16(g) of the one-shot timer 10 are ANDed by the AND means 3, and output of the AND means 3 actuates the one-shot timer 11 to output the starting signal $S_C$.

As shown in FIG. 16(a), the acceleration waveform caused by the hammerblow impact can provide higher acceleration and a sharper waveform at the beginning of the impact than those in the collision waveform. As shown in FIG. 16(b), the output waveform of the integration processing section 22 exceeds the preset threshold value THA shown by the broken line at a relatively early time. Hence, the output waveform (c) of the one-shot timer 9 is left set to High for a certain time. At the time of hammerblow, the integral value of the positive acceleration is substantially identical with the integral value of the negative acceleration when the collision is completed. However, when the integral value of the negative acceleration is multiplied for weighting by the coefficient $k_2$, which is set to be greater than the coefficient $k_1$ to be multiplied by the integral value of the positive acceleration, the output waveform FIG. 16(f) of the subtraction processing section 5 never exceeds the threshold value THB shown by the broken line, and the output waveform of the one-shot timer 10 is Low. Therefore, the output waveform FIG. 16(h) of the starting signal is Low, and no starting signal is outputted in response to the hammerblow.

A qualitative description will now be given of the above operation. When the integral value of the positive acceleration signal is defined as $\Delta V_+$, and the integral value of the negative acceleration signal is defined as $\Delta V_-$, it is possible to express a structure of FIG. 1 as Equation (1):

$$k_1 \Delta V_+ = k_2 \Delta V_- + V_{th} \quad (1)$$

where $V_{th}$ is a threshold value of the comparing means.

Further, in case a decision is made depending upon a ratio of the integral value of the positive acceleration signal and the integral value of the negative acceleration signal as in the prior art, it is possible to express the structure as Equation (2):

$$\Delta V_+ = k \Delta V_- \quad (2)$$

where $k = k_2/k_1$ for purpose of explanation.

Characteristics of Equations (1) and (2) are shown in FIG. 17(a). According to Equation (2), an ON region and an OFF region are divided by the line 2 so that any excess of $\Delta V_+$ with respect to the line 2 provides an ON state in the range in which $\Delta V_-$ has lower values (i.e., at the beginning of collision).

However, in the structure of the embodiment 1, the ON region and the OFF region are divided by the line 1. That is, even in the range in which $\Delta V_-=0$, the ON state is not generated until $k_1 \Delta V_+$ exceeds $V_{th}$. Like the hammerblow impact, there is a waveform whose positive acceleration is rapidly increased in a state of $\Delta V_-=0$, and such a waveform easily may provide the ON state according to Equation (2). According to Equation (1), the ON state is not present until $k_1 \Delta V_+$ reaches $V_{th}$. As a result, it is possible to avoid output of the starting signal in response to the hammerblow.

As compared with a typical collision waveform, in the hammerblow impact, larger negative acceleration signal is present, and the positive acceleration signal and the negative acceleration signal are alternately produced (in this case, magnitude of the positive acceleration signal being not always identical with that of the negative acceleration signal).

Therefore, as shown in FIG. 17(b), in order to avoid ignition due to the hammerblow in $\Delta V_+ - \Delta V_-$ characteristic at the time of hammerblow, it is necessary to set a value of the coefficient means k according to Equation (2) such that the value is greater than a value set in Equation (1).

As shown in FIG. 17(c), many negative acceleration signals may be present in the first half of the acceleration waveform at the time of the intermediate-high speed collision. In this case, according to the above discussion, it is possible to earlier make an ON decision in the embodiment 1 according to Equation (1) than would make in the prior art according to Equation (2) in the range in which $\Delta V_+$ and $\Delta V_-$ have smaller values, that is, at the beginning of impact such as $l_1$ (or $l_2$ in the prior art).

Figure 18A:
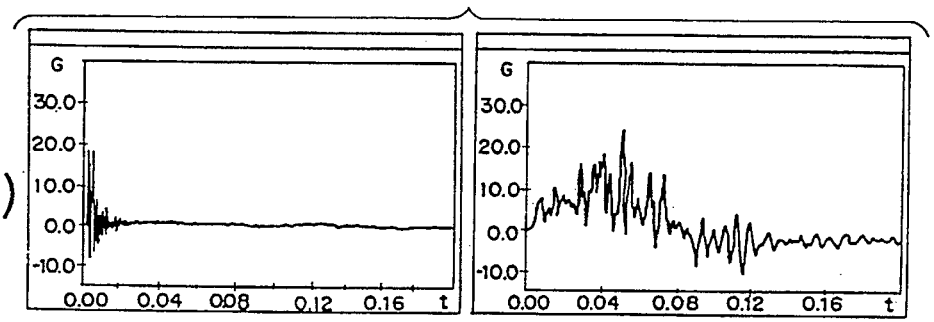
FIGS. 18(a)–(d) show signal waveform diagrams at each section, thus illustrating the operation, in the embodiment of FIG. 1.
Figure 18B:
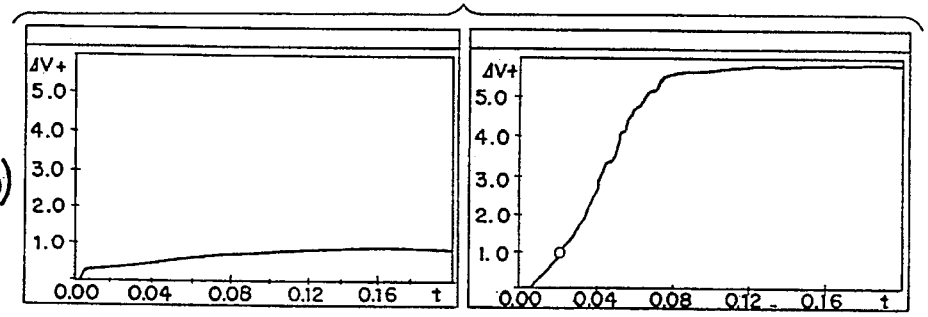
Figure 18C:
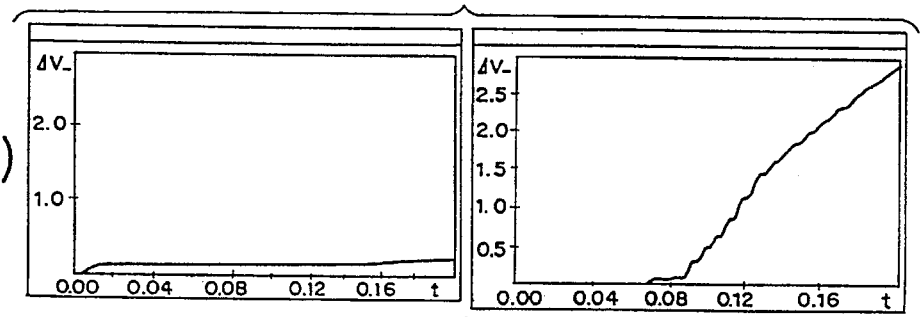
Figure 18D:
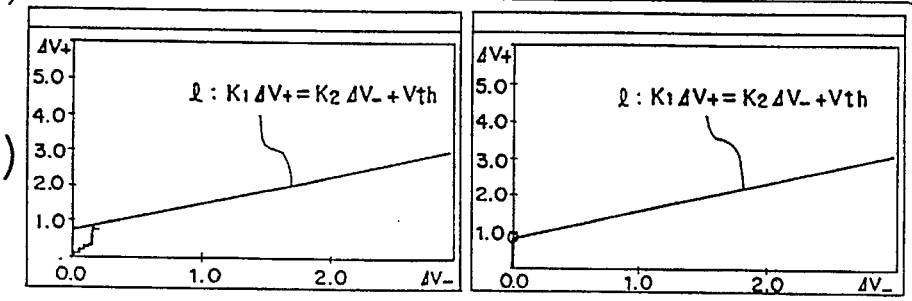

FIG. 18(a) shows an acceleration waveform, FIG. 18(b) shows a decelerating direction integrated acceleration waveform, FIG. 18(c) shows an accelerating direction integrated acceleration waveform, and FIG. 18(d) shows $\Delta V_+ - \Delta V_-$ characteristic at the time of hammering (on the left) and at the time of intermediate-high speed collision (on the right).

In the acceleration waveform at the time of hammering, extremely large acceleration is present immediately after the beginning of impact, and a duration of the impact is short. Further, a negative acceleration signal larger than would be present at the time of intermediate-high speed collision is present.

On the other hand, the acceleration waveform at the time of intermediate-high speed collision is gradually increased immediately after the beginning of collision, and a duration of impact is long. Further, no negative acceleration signal is present at the beginning of impact.

Consequently, the integrated waveforms in the respective acceleration directions are shown in FIGS. 18(b) and (c). Referring now to the $\Delta V_+ - \Delta V_-$ characteristic in FIG. 18(d), at the time of hammering, there is one characteristic in which $\Delta V_+$ is slightly outputted at a point of $\Delta V_-=0$ to extend together with $\Delta V_-$. However, at the time of intermediate-high speed collision, there is another characteristic in which $\Delta V_+$ rapidly reaches a large value at the point of $\Delta V_-=0$, and $\Delta V_-$ becomes larger in the latter half.

In view of the above characteristics, according to the line 1 of the waveform FIG. 18(d), it is possible to set a high threshold value at the point of $\Delta V_-=0$ at the time of hammering. Further, since the threshold value increases as $\Delta V_-$ increases, it is possible to ensure a larger OFF margin than that in the prior art in the range in which $\Delta V_+$ and $\Delta V_-$ have smaller values. However, any increase in $\Delta V_+$ at the point of $\Delta V=0$ exceeds the threshold value in the prior art.

At the time of intermediate-high speed collision, $\Delta V_+$ is rapidly increased at the point of $\Delta V_-$ of zero to exceed the threshold value at the moment. As a result, little delay is generated due to the OFF margin.

At the time of hammering, when the threshold value is determined depending upon the maximum value of $\Delta V_+$, the threshold value in the vicinity of $\Delta V_-$ of zero becomes larger. Hence, the line 1 is inclined to reduce the threshold value in the vicinity of $\Delta V_-$ of zero so as to turn ON in an intermediate-high speed waveform as soon as possible.

Figure 19A:
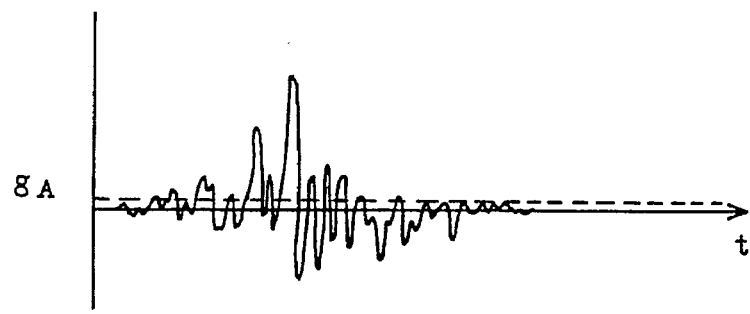
FIGS. 19(a)–(h) show signal waveform diagrams at each section, thus illustrating the operation, in the embodiment of FIG. 1.
Figure 19B:
Figure 19C:
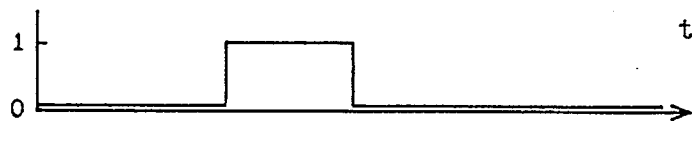
Figure 19D:
Figure 19E:
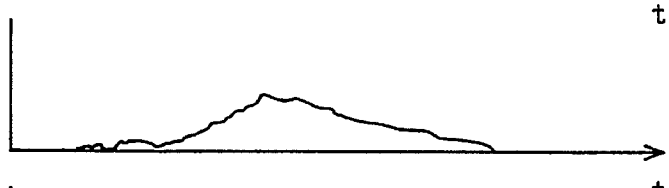
Figure 19F:
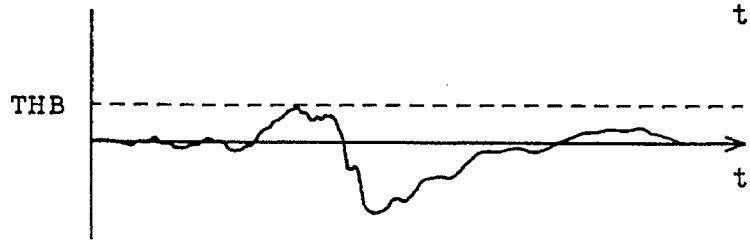
Figure 19G:
Figure 19H:
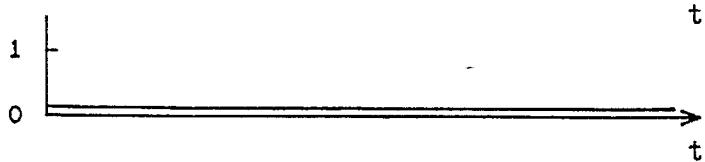

FIGS. 19(g)–(h) show signal waveform diagrams at each section of the apparatus shown in FIG. 2 during impact generated at a time of running on the curbstone. FIG. 19(b) shows that an output waveform of the integration processing section 22 is obtained by integrating after subtracting the offset value $g_A$ from an output waveform FIG. 19(a) of the G sensor 1. The output waveform FIG. 19(b) exceeds the threshold value THA in the range to provide large acceleration, resulting in an ON state of an output waveform FIG. 19(c) of the one-shot timer 9. Further, an output waveform FIG. 19(f) of the subtraction processing section 5 is obtained by subtracting an output waveform FIG. 19(e) of the coefficient means 8 from an output waveform FIG. 19(d) of the coefficient means 50. Since the output FIG. 19(e) of the coefficient means 8 reaches, to some extent, a large value a time after generation of the impact, the waveform FIG. 19(f) of the subtraction processing section 5 never exceeds the threshold value THB. As a result, no starting signal is outputted as shown in FIG. 19(h).

Therefore, in the embodiment 1, it is possible to surely prevent generation of the starting signal $S_C$ even in case an acceleration integral value in the range to require no staring signal is present, and the positive acceleration signal rapidly increases to exceed the threshold value.

Embodiment 2

Figure 20:
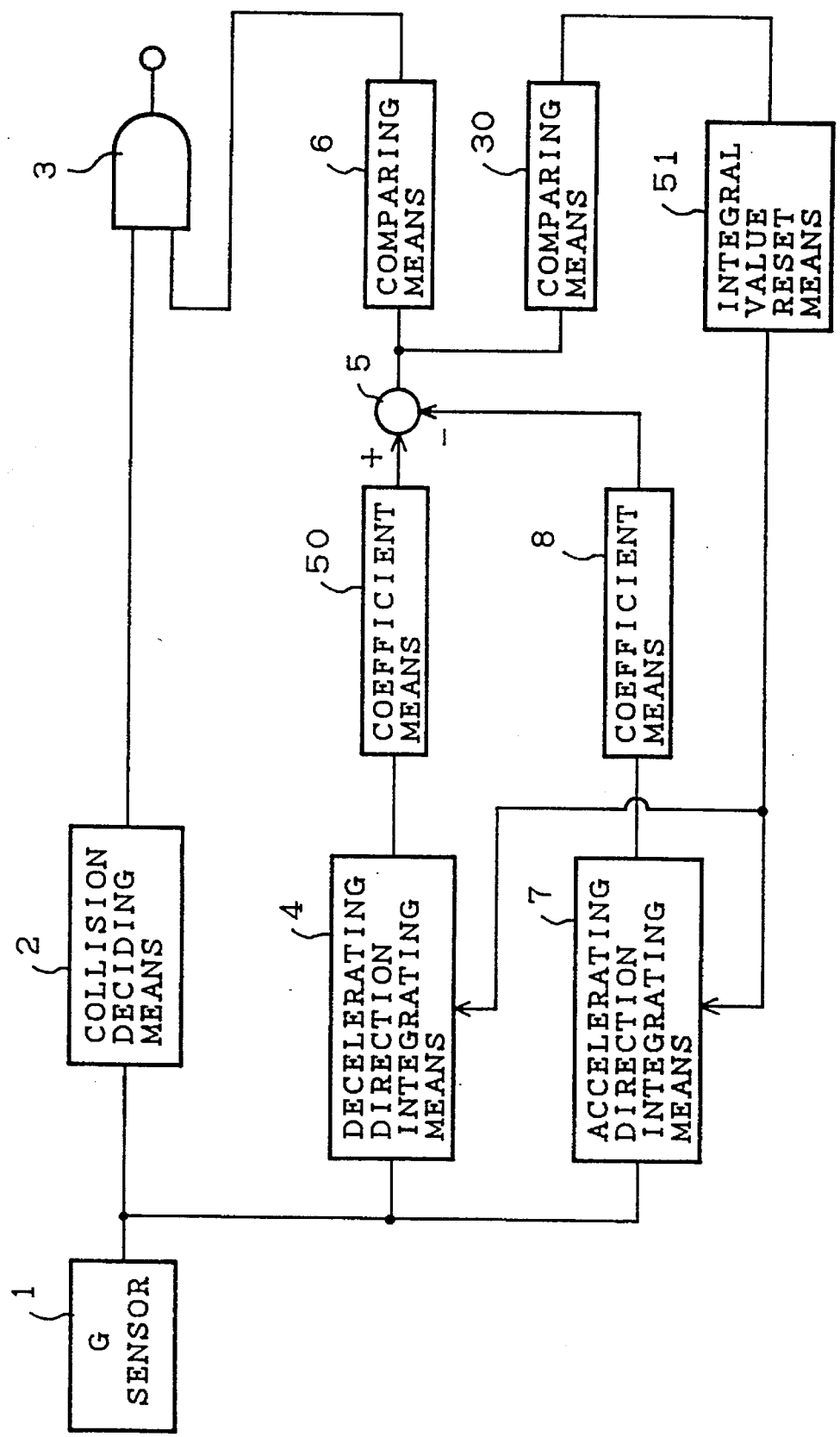
FIG. 20 is a block diagram showing a basic structure according to an embodiment 2 of the present invention.

FIG. 20 is a block diagram showing a basic structure in the embodiment 2 of the present invention. The same reference numerals are used for component parts identical with those of FIG. 1, and descriptions thereof are omitted. In FIG. 20, reference numeral 30 means a comparing means for comparing output from a subtraction processing section 5 with a threshold value, and 51 is an integral value reset means for initializing decelerating direction integrating means 4 and accelerating direction integrating means 7 to a certain value, for example, to zero depending upon output from the comparing means 30.

Figure 21:
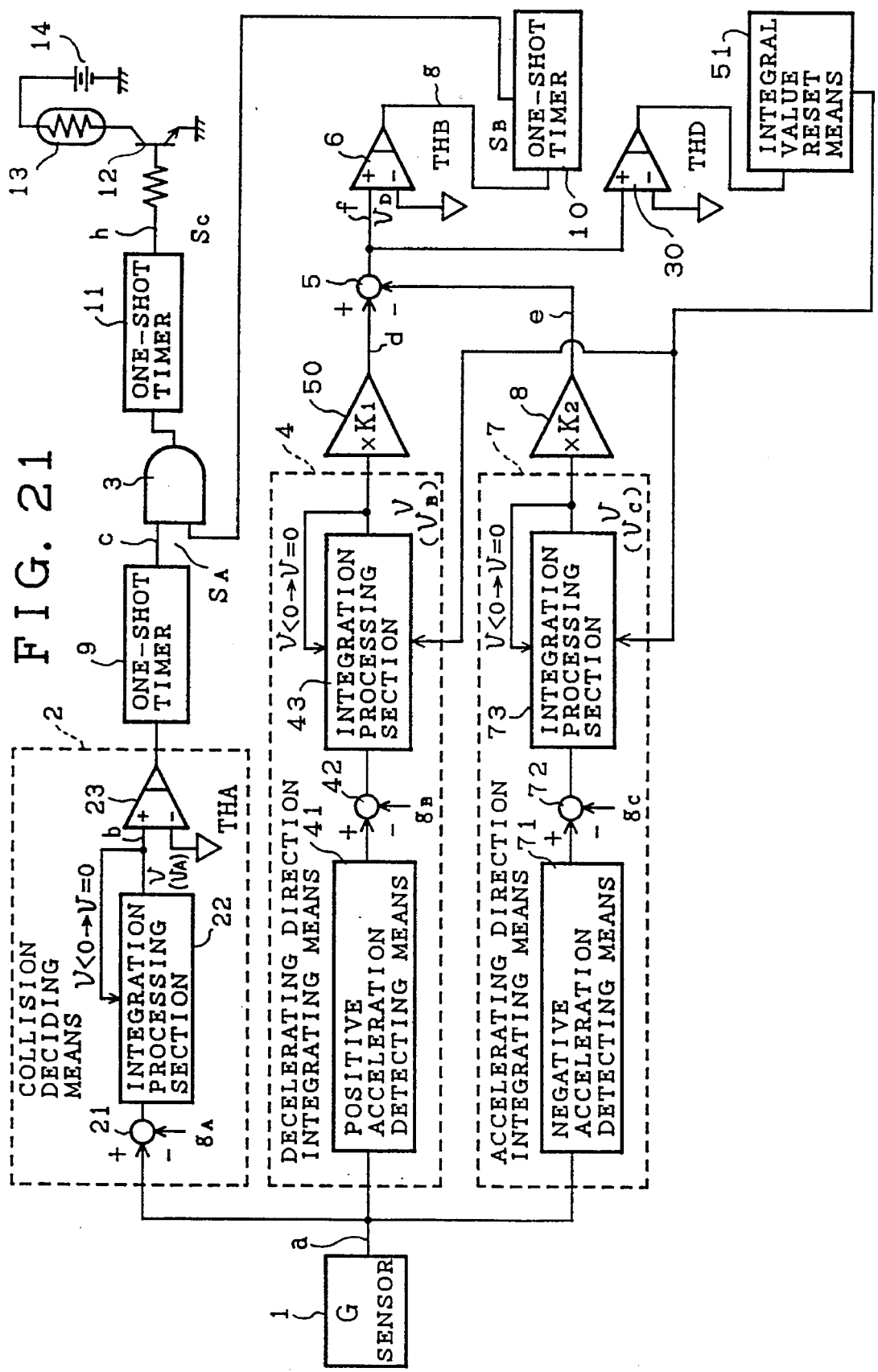
FIG. 21 is a block diagram showing a specific structure according to the embodiment of FIG. 20.

FIG. 21 is a block diagram showing a detailed structure according to the embodiment 2. In the drawing, a threshold value THD of the comparing means 30 is set so as to initialize the output from the subtraction processing section 5 to zero when an impact requiring no starting signal occurs. When the output from the subtraction processing section 5 is less than the threshold value THD, the comparing means 30 generates a reset signal. Subsequently, the integral value reset means 51 initializes output of an integration processing section 43 and output of an integration processing section 73 to zero depending upon the reset signal. Since structures other than those discussed above are identical with structure of FIG. 2, the same reference numerals are used for component parts identical with those in FIG. 2 and descriptions thereof are omitted.

A description will now be given of the operation in the embodiment 2 with reference to a flowchart of FIG. 22. The flow of main control is identical with that in the embodiment 1, and a description thereof is omitted.

Figure 22:
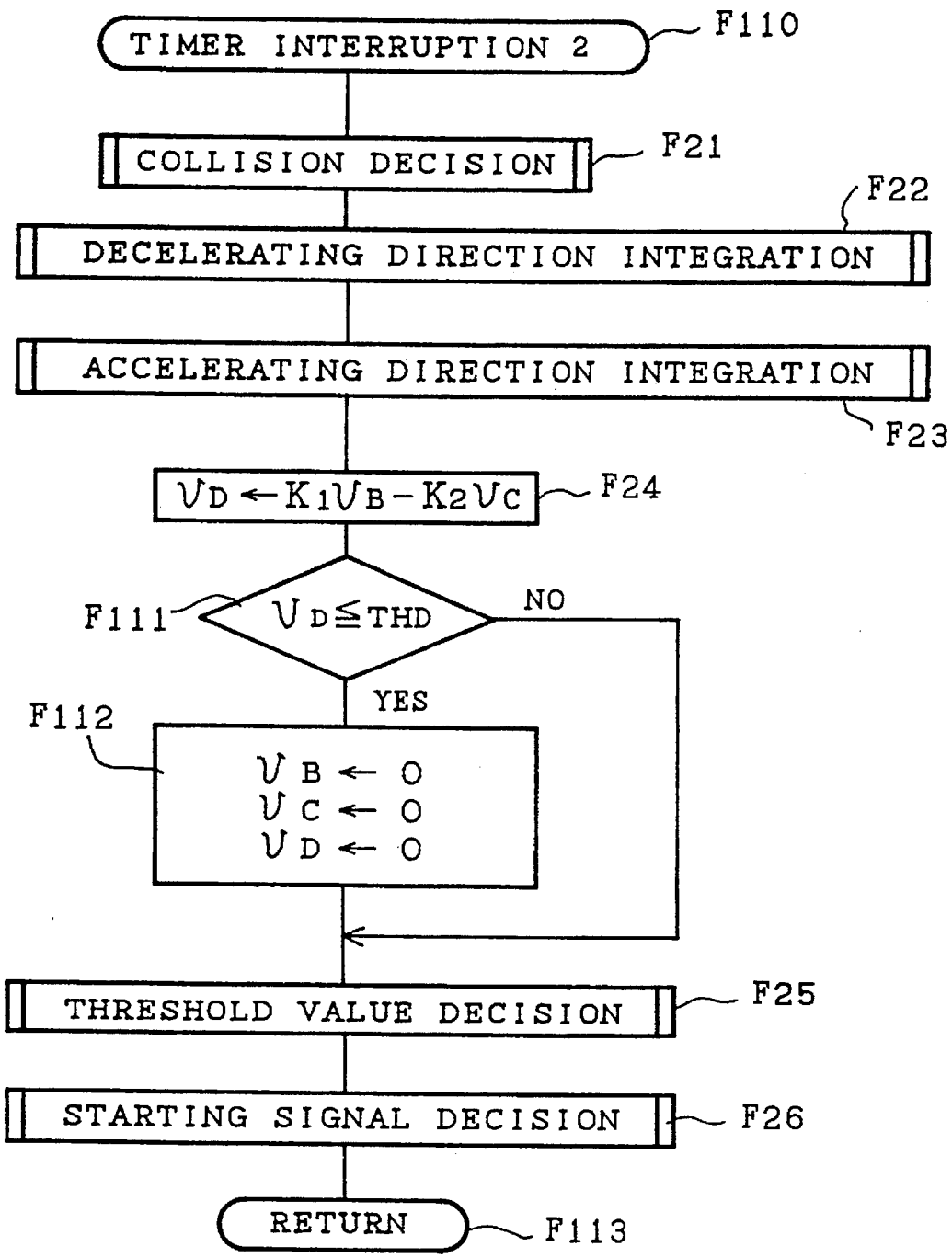
FIG. 22 is a flowchart illustrating an operation in the embodiment of FIG. 20.

Referring to FIG. 22, a timer interruption 2 is started for each constant time in Step F110, and a typical collision decision is made in Step F21. Next, a decelerating direction acceleration signal is integrated in Step F22, and an accelerating direction acceleration signal is integrated in Step F23. Subsequently, in Step F24, the output value $v_C$ of the integration processing section 73 found in Step F23 is multiplied by coefficient $k_2$ of coefficient means 8, the output value $v_B$ of the integration processing section 43 found in Step F22 is multiplied by coefficient $k_1$ of coefficient means 50, and the former is subtracted from the latter, thereby setting an integral value $v_D$.

In Step F111, when the integral value $v_D$ is less than or equal to the preset threshold value THD, the operation proceeds in a direction of YES to Step F112 where the integral values $v_B$, $v_C$, and $v_D$ are initialized to zero, and proceeds to Step F25. Alternatively, when the integral value $v_D$ is greater than the threshold value THD in Step F111, the operation proceeds in a direction of NO, that is, to Step F25. Threshold value decision is made depending upon the integral value $v_D$ in Step F25, and it is decided whether or not a starting signal $S_C$ is to be generated depending upon a collision deciding signal $S_A$ and a control signal $S_B$ in Step F26. The timer interruption 2 is ended in Step F113.

Figure 23C:
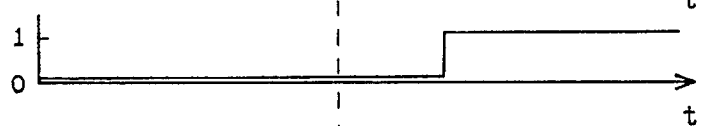

FIGS. 23(a)–(h) show processing waveforms at each section of the apparatus shown in FIG. 2 in case of successive occurrence of impact due to running on a curbstone and intermediate speed collision. FIG. 23(a) shows an output waveform of a G sensor 1 in case an initial impact is caused due to running on the curbstone, and subsequent impact is caused due to the intermediate speed collision. FIG. 23(b) shows an output waveform obtained by integrating after subtracting a preset offset value $g_A$ from the acceleration waveform FIG. 23(a). The integrated waveform does not exceed the threshold value THA at a time of running on the curbstone, and largely exceeds the threshold value THA at a time of intermediate speed collision. At the same time, output of a one-shot timer 9 shown in FIG. 23(c), that is, the collision deciding signal $S_A$ is in an ON state.

Figure 23D:
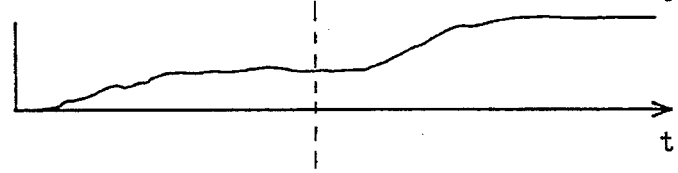
Figure 23E:
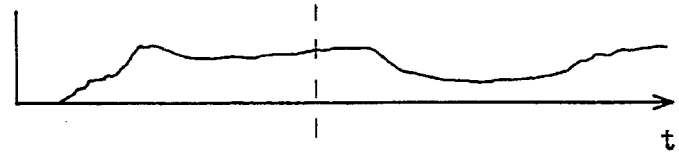
Figure 23G:
Figure 23H:
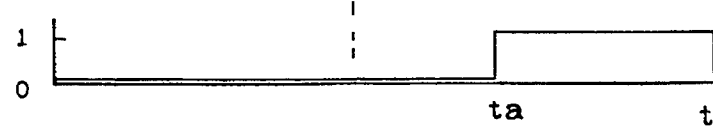

Then, an output waveform FIG. 23(d) of the coefficient means 50 is obtained by multiplying a positive acceleration integral value by coefficient, and an output waveform FIG. 23(e) of the coefficient means 8 is obtained by multiplying a negative acceleration integral value by coefficient. Further, the output waveform FIG. 23(e) is subtracted from the output waveform FIG. 23(d), resulting in an output waveform FIG. 23(f) of the subtraction processing section 5. In this case, the waveform FIG. 23(f) reaches a negative value in the latter half of running on the curbstone, and is continuously negative even in the first half of the intermediate speed collision. Further, the waveform FIG. 23(f) gradually reaches positive values to exceed a threshold value THB at a time $t_a$. At the same time, output FIG. 23(g) of a one-shot timer 10, that is, the control signal $S_B$ is in the ON state, and the control signal $S_B$ and the collision deciding signal $S_A$ are ANDed to output the starting signal $S_C$ as shown in FIG. 23(h).

FIGS. 24(a)–(h) show processing waveforms at each section of the apparatus shown in FIG. 21 in case of successive occurrence of impact due to running on the curbstone and the intermediate speed collision.

FIGS. 24(a)–(c) are identical to FIGS. 23(a)–(c), respectively, and descriptions thereof are omitted. Output of the coefficient means 8 shown in FIG. 24(e) is subtracted from output of the coefficient means 50 shown in FIG. 24(d), resulting in an output waveform of FIG. 24(f) of the subtraction processing section 5. At the time of running on the curbstone, a large acceleration signal is present on the negative side as well as the positive side. Thus, the output of the subtraction processing section 5 shown in FIG. 24(f) becomes negative. In case of successive occurrence of impact due to running on the curbstone and the intermediate speed collision, the output of the subtraction processing section 5 may reach the threshold value THD determined on the basis of the negative value. At this time, i.e., at times $t_b$ and $t_c$, the value of the subtraction processing section 5 is reset to zero, that is, initialized. At the same time, the output of the coefficient means 50 and the output of the coefficient means 8 are reset to zero.

As a result, at the time of running on the curbstone, the output from the subtraction processing section 5 is set to zero at the time $t_b$. Therefore, if the intermediate speed collision is started immediately after the time $t_b$, the waveform FIG. 23(f) rapidly rises on the positive side to exceed the threshold value THB at a time $t_d$. Further, the output waveform FIG. 23(g) of the one-shot timer 10 is in the ON state at the time $t_d$ which is earlier than the time $t_a$ shown in FIGS. 23(f)–(h). Further, the control signal $S_B$ and the collision deciding signal $S_A$ are ANDed to output the starting signal $S_C$ as shown in FIG. 24(h).

Embodiment 3

Figure 25:
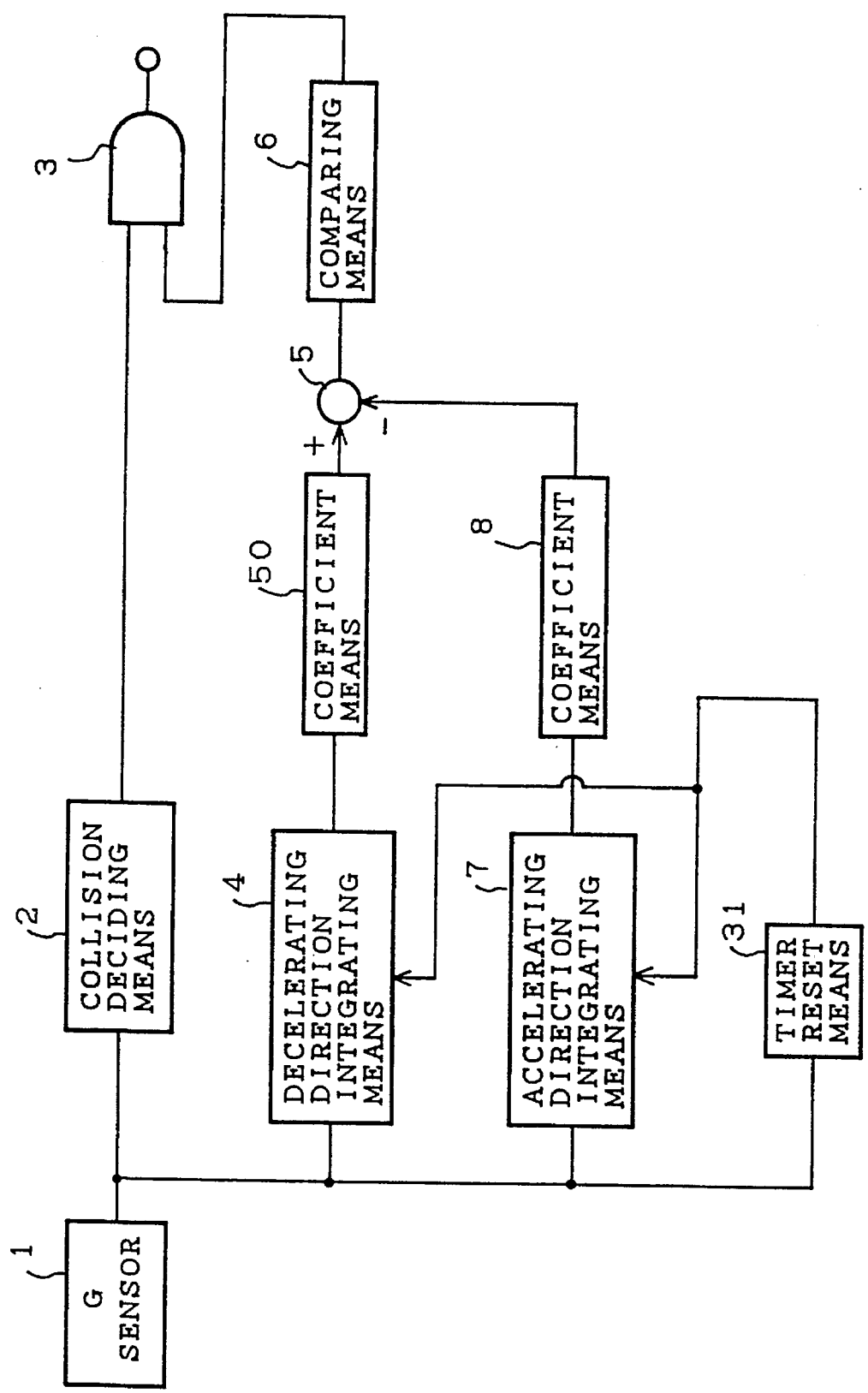
FIG. 25 is block diagram showing a basic structure according to an embodiment 3 of the present invention.

FIG. 25 is block diagram showing a basic structure according to the embodiment 3 of the present invention. The same reference numerals are used for component parts identical with those in FIG. 1, and descriptions thereof are omitted. In FIG. 25, reference numeral 31 means a timer reset means, actuated by receiving output from the G sensor 1, for initializing the decelerating direction integrating means 4 and the accelerating direction integrating means 7 to a certain value after the elapse of a predetermined period.

Figure 26:
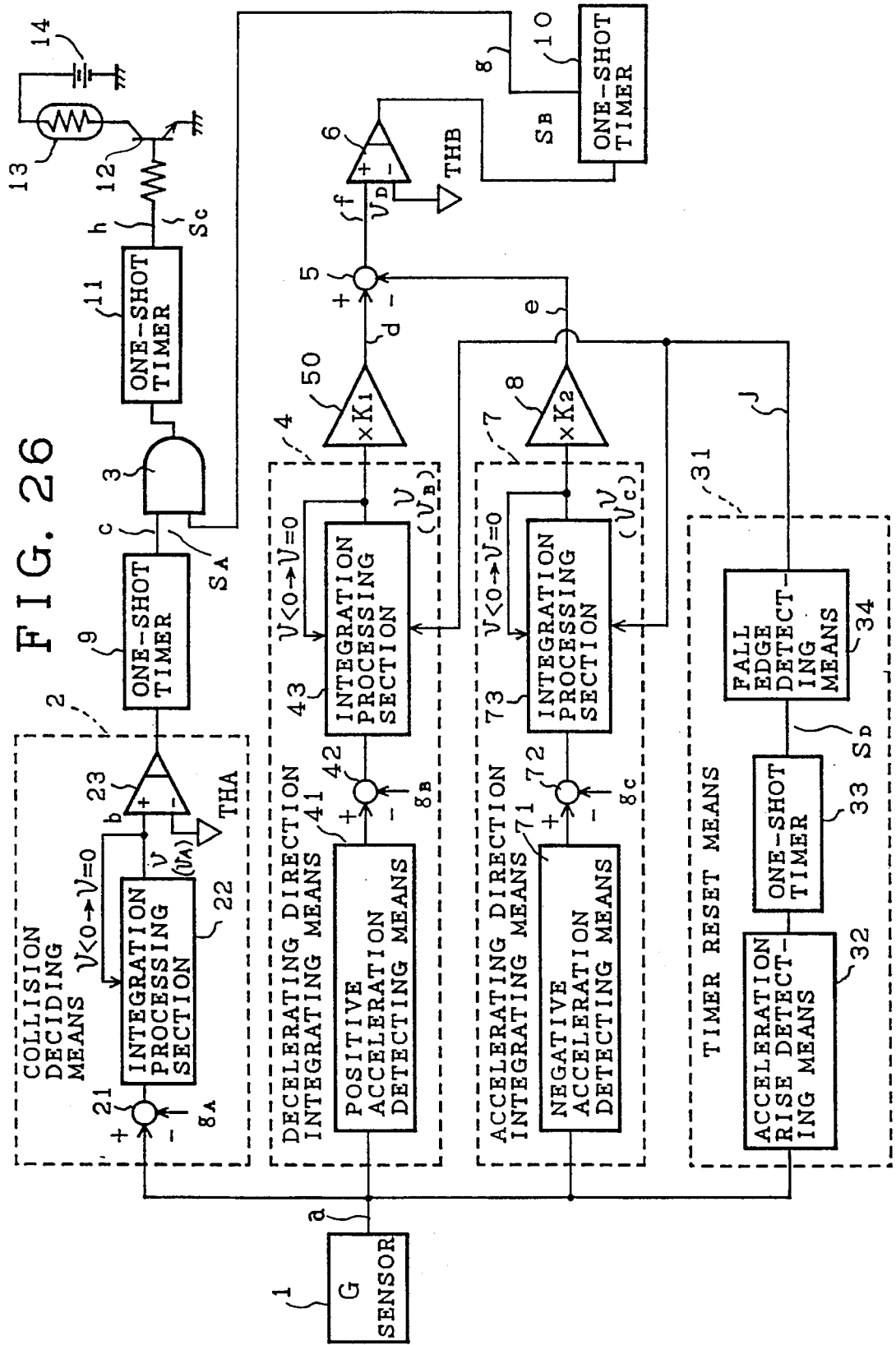
FIG. 26 is a block diagram showing a specific structure according to the embodiment of FIG. 25.
Figure 27A:
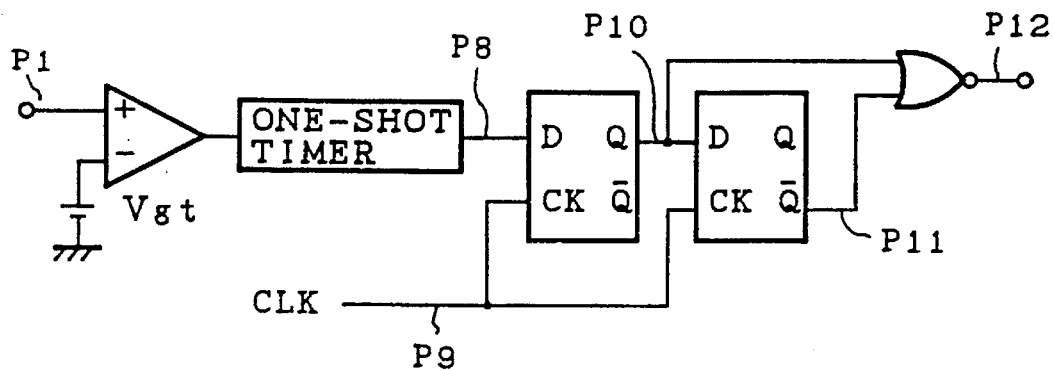
FIG. 27A is a specific circuit diagram of timer reset means.
Figure 27B:
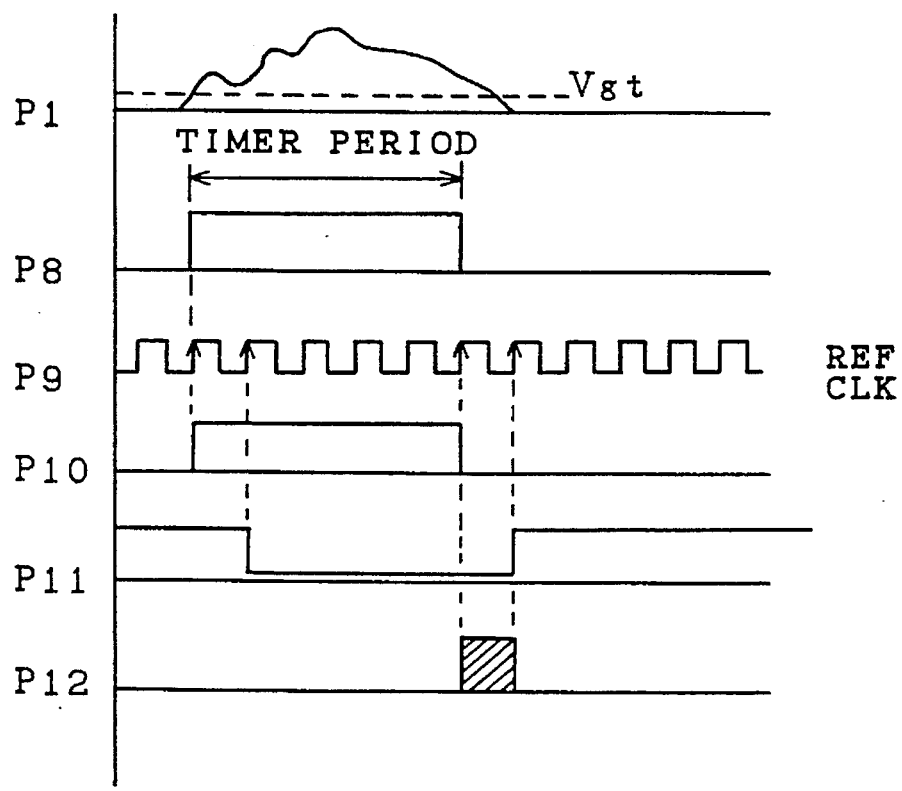
FIG. 27B is a diagram showing each signal waveform at each section of FIG. 27A.

FIG. 26 is a block diagram showing a detailed structure according to the embodiment 3. The timer reset means 31 includes acceleration rise detecting means 32, a one-shot timer 33, and fall edge detecting means 34. Since structures other than those discussed above are identical with structures in FIG. 2, the same reference numerals are used for component parts identical with those in FIG. 2 and descriptions thereof are omitted. FIG. 27A is an illustratively specific circuit of the timer reset means 31. For example, in FIG. 27A, the output of the G sensor 1 is caused due to impact to be inputted into a point P1. When the output exceeds a threshold value $V_{g1}$, a signal at a point $P_8$ becomes High, and becomes Low after the elapse of a timer period. At this time, output are present at points $P_{10}$, $P_{11}$, and $P_{12}$ as shown in FIG. 27B. A fall at the point $P_8$ causes a High waveform at the point $P_{12}$. As a result, after starting due to the impact, the signal is outputted from the point $P_{12}$ after the elapse of the timer period, and the respective integrating means 4, 7 are reset depending upon the signal.

A description will now be given of the operation in the embodiment 3 with reference to flowcharts of FIGS. 28 and 29. The flow of main control is identical with that in the embodiment 1, and a description thereof is omitted.

Figure 28:
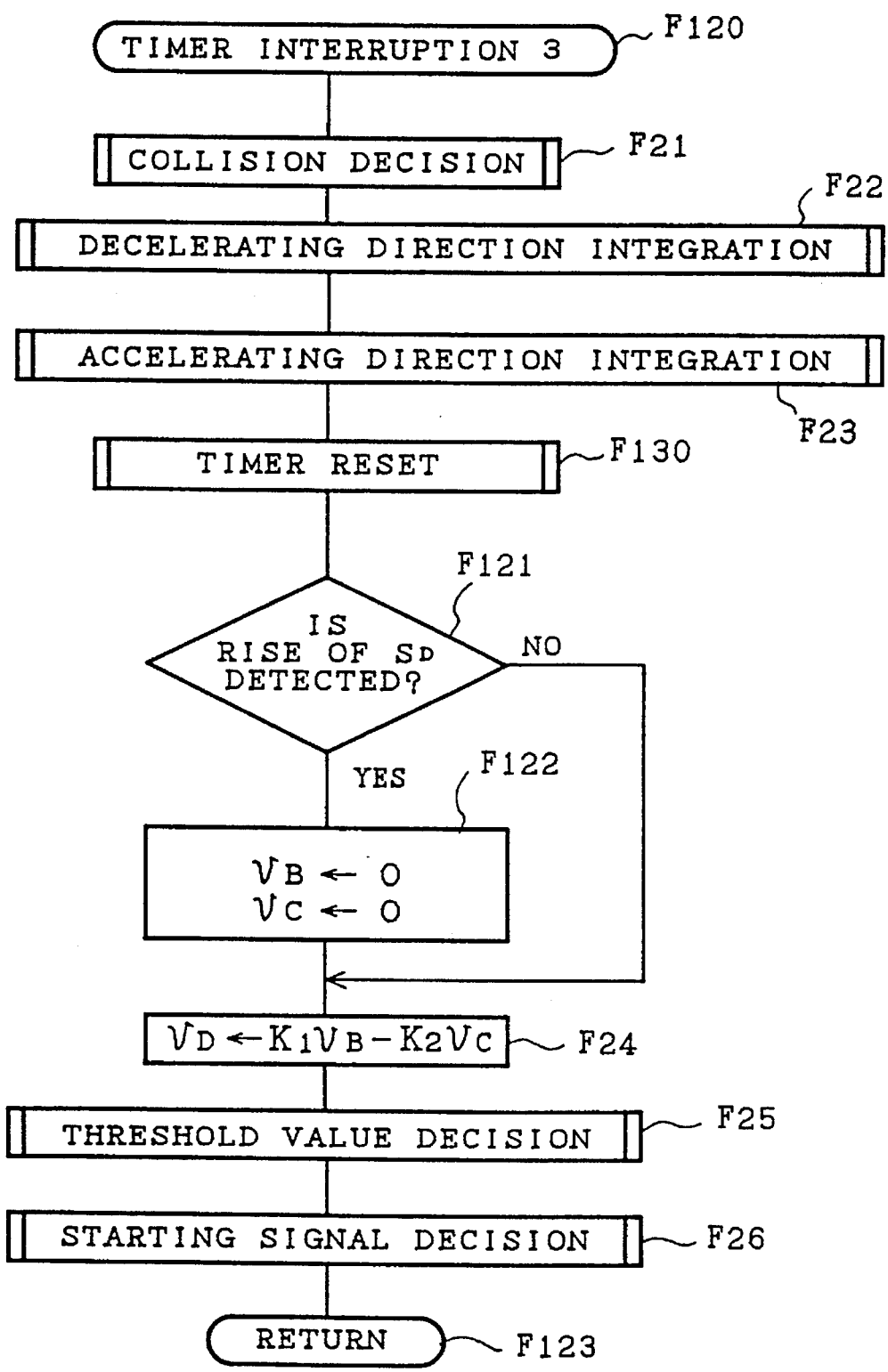
FIG. 28 is a flowchart illustrating an operation in the embodiment of FIG. 25.
Figure 29:
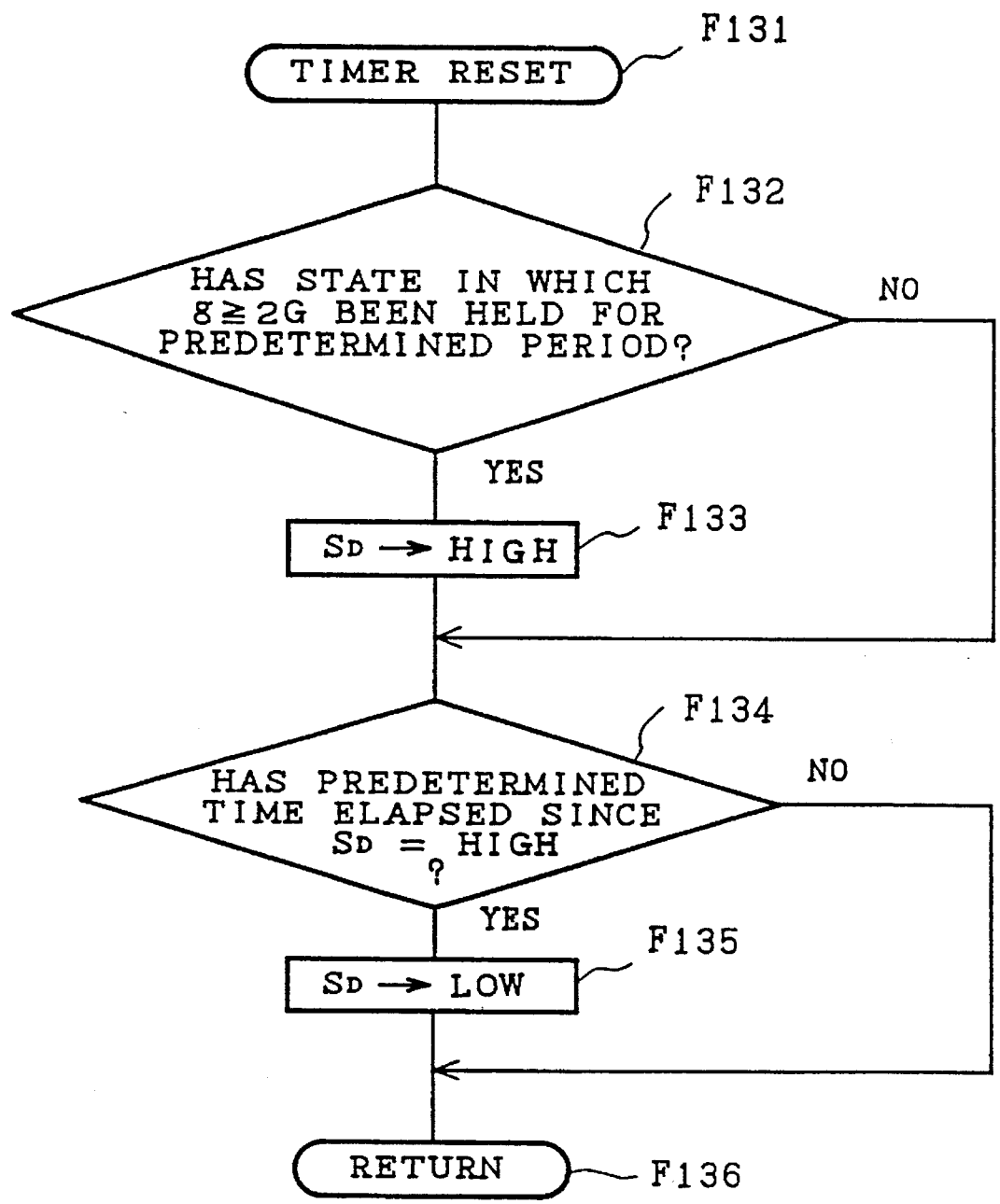
FIG. 29 is a flowchart illustrating the operation in the embodiment of FIG. 25.

Referring to FIG. 28, a timer interruption 3 is started for each constant time in Step F120, and a typical collision decision is made in Step F21. Next, a decelerating direction integration is carried out in Step F22, and an accelerating direction integration is carried out in Step F23.

Subsequently, the operation proceeds to timer reset processing in Step F130, and the timer reset processing is started in Step F131 shown in FIG. 29. When an acceleration signal g fed from the G sensor 1 is greater than or equal to 2G for a predetermined period in Step F132, the operation proceeds in a direction of YES to Step F133 where a timer reset signal $S_D$ serving as output from the one-shot timer 33 is set to High, and proceeds to Step F134. When the acceleration signal g is 2G or more for less than the predetermined period in Step F132, the operation proceeds to in a direction of NO to Step F134. If the timer reset signal $S_D$ is High for a predetermined period in Step F134, the operation proceeds in a direction of YES to Step F135 where the timer reset signal $S_D$ is forcedly set to Low, and proceeds to Step F136 to return to Step F130. Alternatively, in case a predetermined period has not elapsed after the timer reset signal $S_D$ becomes High, the operation proceeds in a direction of NO to Step F136 to return to Step F130.

In the above timer reset processing, it is possible to generate the timer reset signal $S_D$ which becomes High for the predetermined period from a rise time of acceleration.

Subsequently, when a fall of the timer reset signal $S_D$ is detected in Step F121, the operation proceeds in a direction of YES to Step F122 where a positive acceleration integral value $v_B$ found in Step F22 and a negative acceleration integral value $v_C$ found in Step F23 are reset to zero, and proceeds to Step F24. Alternatively, when the fall of the timer reset signal $S_D$ is not detected in Step F121, the operation proceeds in a direction of NO to Step F24. In Step F24, the positive acceleration integral value $v_B$ is multiplied by coefficient $k_1$, the negative acceleration integral value $v_C$ is multiplied by coefficient $k_2$, and the latter is subtracted from the former. Thus, output of a subtraction processing section 5 is set to an integral value $v_D$.

Then, threshold value decision is made depending upon the integral value $v_D$ in Step F25. In Step F26, it is decided whether or not a starting signal $S_C$ is to be generated depending upon a collision deciding signal $S_A$ and a control signal $S_B$. The timer interruption 3 is ended in Step F123.

In order to show an effect of the timer reset means 31 in the structure according to the embodiment 3, a description will now be given of a case of the successive occurrence of low speed collision and impact due to running on a curbstone requiring no starting signal $S_C$ with reference to FIGS. 30(a)–(h) and 31(a)–(h) and (j).

FIGS. 30(a)–(h) show signal waveforms at each section of the apparatus having the structure of FIG. 2. FIG. 30(a) shows an output waveform of the G sensor 1 in case impact due to running on the curbstone is generated subsequently to the low speed collision, that is, in case of the successive occurrence of impacts requiring no starting signal. An output waveform FIG. 30(b) of an integration processing section 22 can be obtained by integrating after subtracting a preset offset value $g_A$ from the output waveform of the G sensor 1. Thus, the waveform exceeds a threshold value THA immediately after the later impact due to running on the curbstone. As a result, an output waveform FIG. 30(c) of a one-shot timer 9 is in an ON state.

It is assumed that the coefficient $k_2$ of coefficient means 8 is set to be larger than the coefficient $k_1$ of coefficient means 50 (i.e., this indicating that an accelerating direction integral value is weighted to be heavier than a decelerating direction integral value). An output waveform FIG. 30(f) of the subtraction processing section 5 can be obtained by subtracting an output waveform FIG. 30(e) of the coefficient means 8 from an output waveform FIG. 30(d) of the coefficient means 50. When the low speed collision is completed, the output of the coefficient means 50 includes a remaining positive integral value. Therefore, the impact due to running on the curbstone causes an additional positive integral value. The output waveform FIG. 30(f) of the subtraction processing section 5 is held to exceed a threshold value THB even at a time of running on the curbstone.

Consequently, an output waveform FIG. 30(g) of a one-shot timer 10 is in the ON state even at the time of running on the curbstone.

As a result, a collision deciding signal $S_A$ is in an ON state depending upon output from collision deciding means 2, and a control signal $S_B$ is in an ON state depending upon output from comparing means 6; thereby outputting a starting signal $S_C$ as shown in FIG. 30(h). As a period in which the impact due to running on the curbstone is superimposed on the low speed collision is more extended, such a phenomenon more clearly occurs.

Figure 31A:
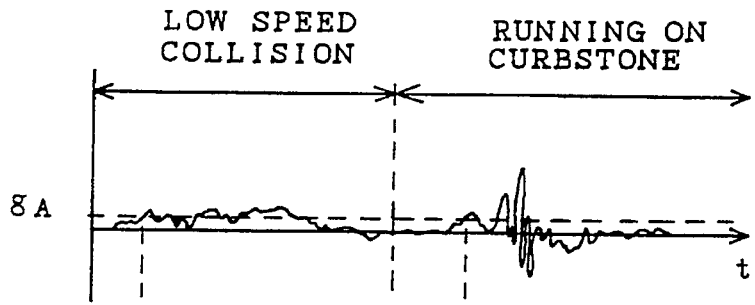
FIGS. 31(a)–(h) and (j) show signal waveform diagrams at each section, thus illustrating the operation, in the embodiment of FIG. 25.
Figure 31B:
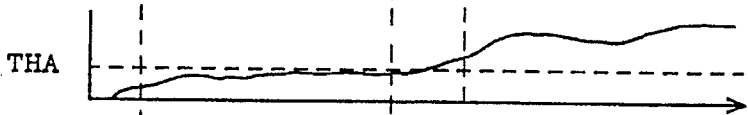
Figure 31C:
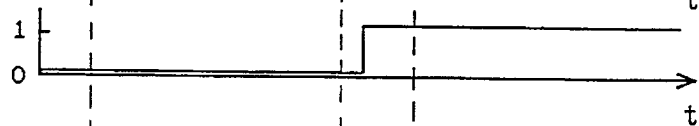

On the other hand, FIGS. 31(a)–(i) and (j) show signal waveforms at each section in the apparatus having the structure of FIG. 26. Since FIGS. 31(a), (b), and (c) are identical with those in FIGS. 30(a), (b), and (c), respectively, descriptions thereof are omitted. The low speed collision is started, and the acceleration rise detecting means 32 detects a rise of acceleration to actuate the one-shot timer 33. Consequently, the fall edge detecting means 34 serving as a component part of the timer reset means 31 outputs a High signal for a period determined by a typical collision holding period as shown in FIG. 31(i). When the fall edge detecting means 34 detects a fall edge of the one-shot timer 33, the fall edge detecting means 34 initializes output from an integration processing section 43 and an integration processing section 73 to zero.

Figure 31D:
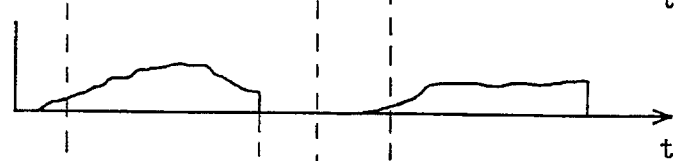
Figure 31E:
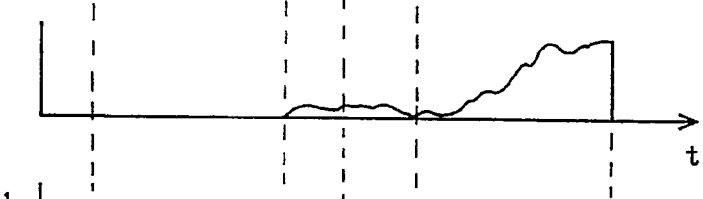
Figure 31J:
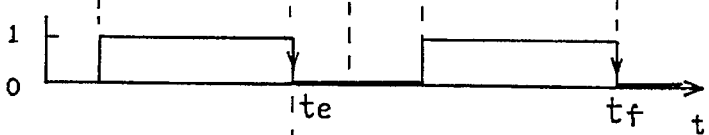
Figure 31F:
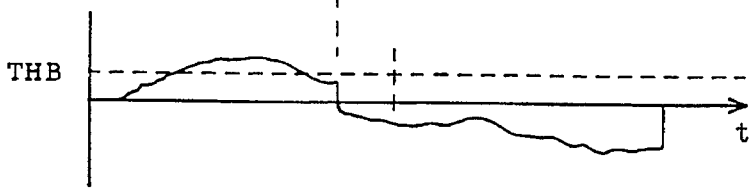
Figure 31G:
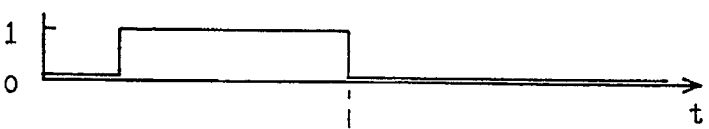
Figure 31H:

In this way, the output waveform FIG. 31(d) of the coefficient means 50 and the output waveform FIG. 31(e) of the coefficient means 8 are reset to zero at fall times $t_e$, $t_f$ of the fall edge detecting means 34. Hence, the output waveform FIG. 31(f) of a subtraction processing section 5 does not exceed the threshold value THB even at the beginning of running on the curbstone. Therefore, the output waveform FIG. 31(g) of the one-shot timer 10 is in the ON state even at a time of low speed collision, thereby outputting no starting signal as shown in FIG. 31(h). However, when the period in which the impact due to running on the curbstone is superimposed on the low speed collision is extended to some extent, the starting signal is outputted as in the case of absence of reset processing of the timer reset means 31. In this case, the impact applied to a passenger corresponds to collision requiring the starting signal so that no problem occurs.

Embodiment 4

Figure 32:
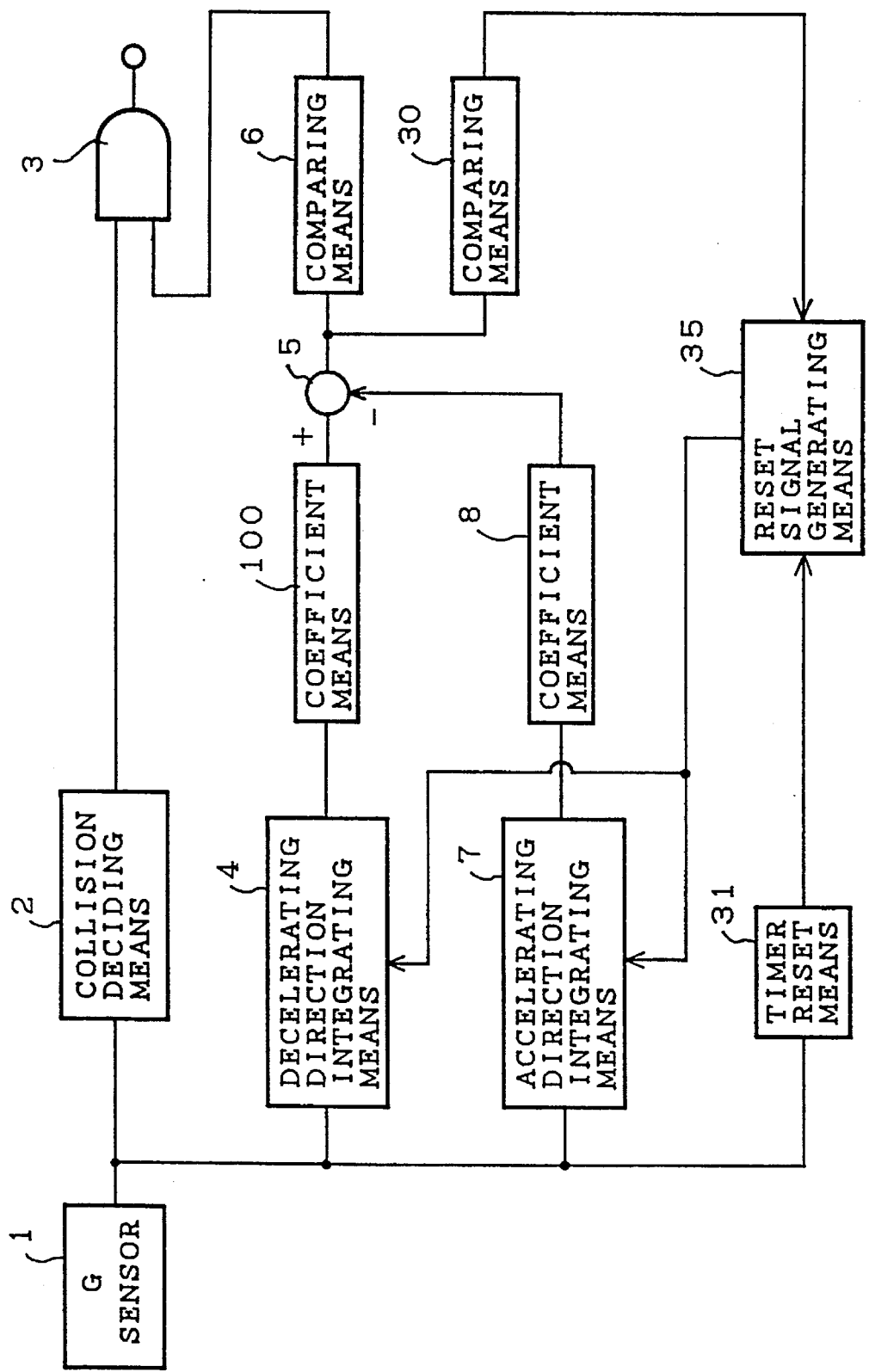
FIG. 32 is a block diagram showing a basic structure according to an embodiment 4 of the present invention.

FIG. 32 is a block diagram showing a basic structure according to the embodiment 4 of the present invention. The same reference numerals are used for component parts identical with those in FIG. 1, and descriptions thereof are omitted. In FIG. 32, reference numeral 30 means the second comparing means for outputting after comparing a difference between output of decelerating direction integrating means 4 and output of accelerating direction integrating means 7 with a reference value, and 31 is the timer reset means, actuated by receiving output from a G sensor 1, for outputting after the elapse of a predetermined period. Reference numeral 35 means a reset signal generating means for initializing the decelerating direction integrating means 4 and the accelerating direction integrating means 7 to a certain value according to output of the second comparing means 30 and output of the timer reset means 31.

Figure 33:
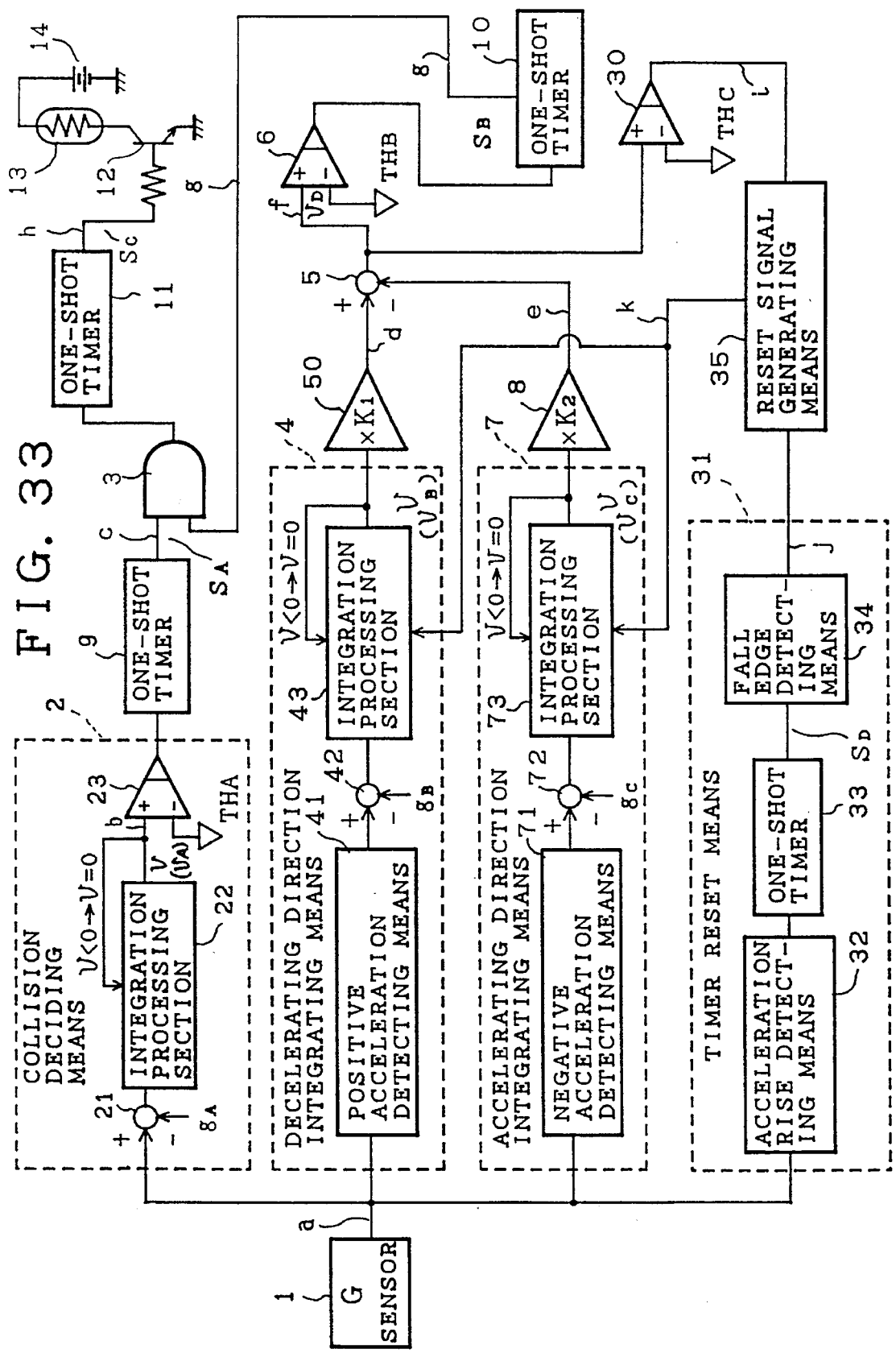
FIG. 33 is a block diagram showing a specific structure according to the embodiment of FIG. 32.

FIG. 33 is a block diagram showing a specific structure according to the embodiment 4. The timer reset means 31 includes acceleration rise detecting means 32, a one-shot timer 33, and fall edge detecting means 34. Since structures other than those discussed above are identical with structures of FIG. 2, the same reference numerals are used for component parts identical with those in FIG. 2 and descriptions thereof are omitted.

Figure 34:
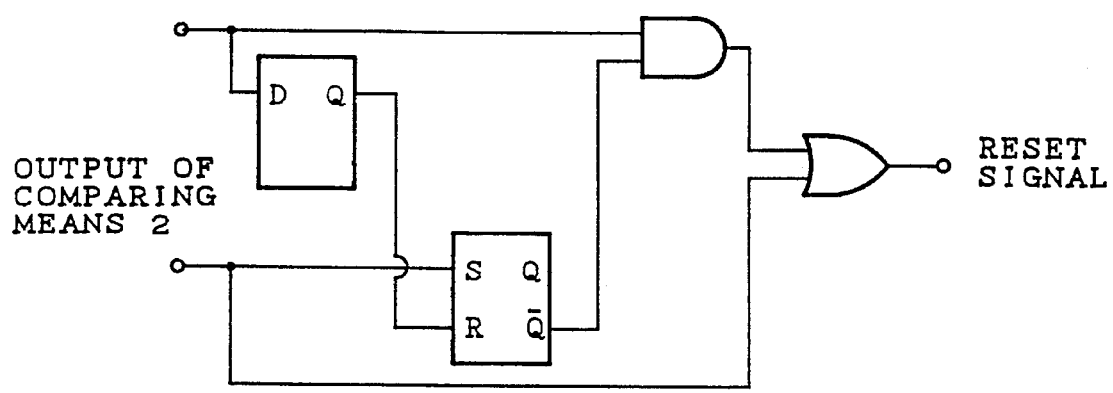
FIG. 34 is a specific circuit diagram of reset signal generating means.

The second comparing means 30 may provide no output within a predetermined period determined by the timer reset means 31 after the acceleration rise detecting means 32 detects any impact depending upon output from the G sensor 1. In this case, the reset signal generating means 35 makes output from the timer reset means 31 valid, and initializes output of the decelerating direction integrating means 4 and the accelerating direction integrating means 7 to zero. FIG. 34 is an illustratively specific circuit of the reset signal generating means 35.

A description will now be given of the operation in the embodiment 4 with reference to a flowchart of FIG. 35. The flow of main control is identical with that in the embodiment 1, and a description thereof is omitted.

Figure 35:
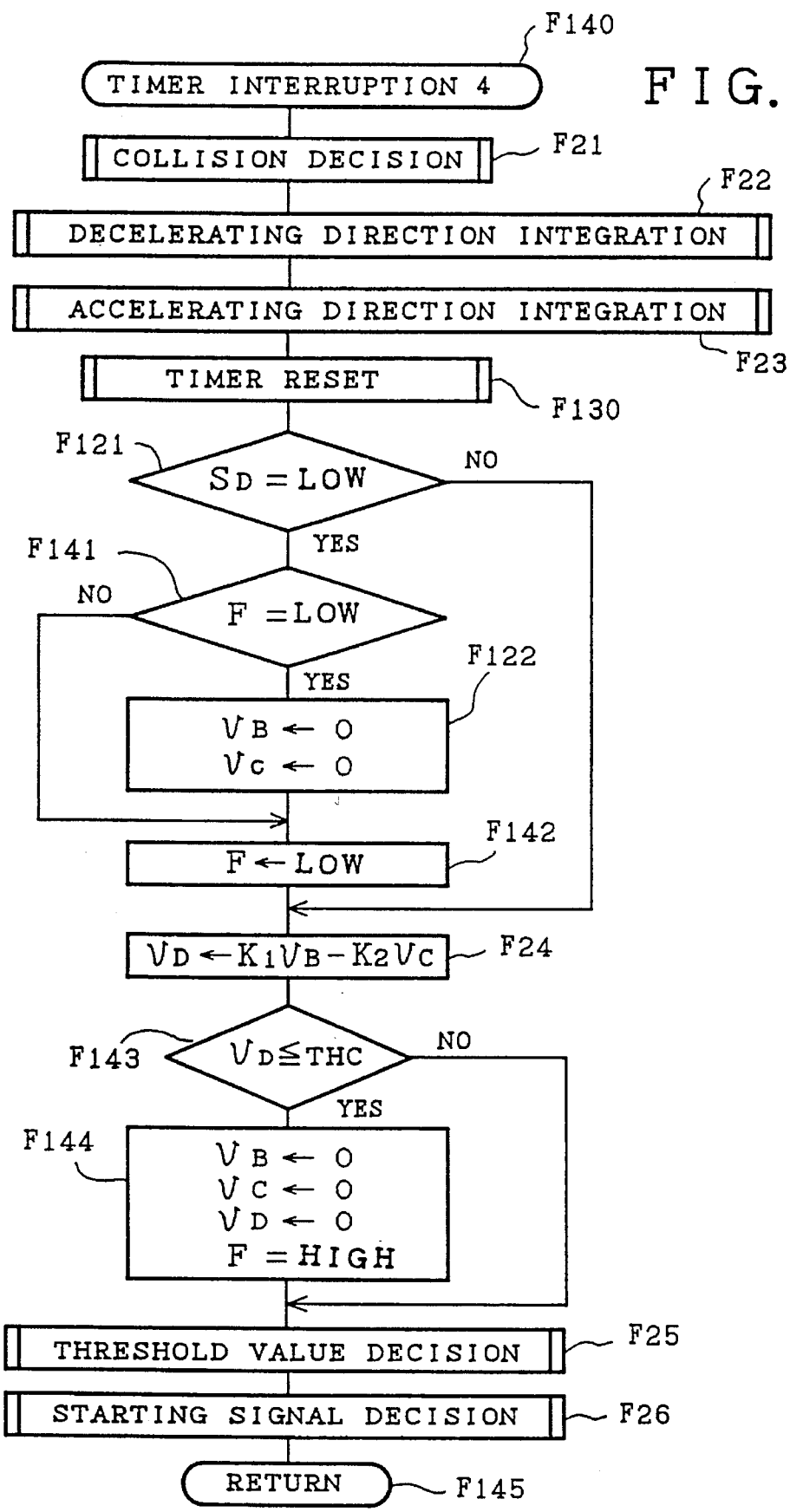
FIG. 35 is a flowchart illustrating an operation in the embodiment of FIG. 29.

Referring to FIG. 35, a timer interruption 4 is started for each constant time in Step F140, a typical collision decision is made in Step F21, and decelerating direction integration is carried out in Step F22. Accelerating direction integration is carried out in Step F23, and a timer is reset in Step F130. Subsequently, if a timer reset signal $S_D$ is Low in Step F121, the operation proceeds in a direction of YES to Step F141. When a reset flag F is Low in Step F141, the operation proceeds in a direction of YES to Step F122 to initialize integral values $v_B$, $v_C$ to zero. Alternatively, when the reset flag F is High in Step F141, it is regarded that the reset signal is outputted to initialize output values from integration processing section 43 and integration processing section 73 to zero within a predetermined time period after the beginning of impact, which is determined by the timer reset means 31. Further, the operation proceeds to Step F142 where the reset flag F is set to Low. If the timer reset signal $S_D$ is High in Step F121, the operation proceeds to Step F24.

In Step F24, a positive acceleration integral value $v_B$ is multiplied by predetermined coefficient $k_1$, and a negative acceleration integral value $v_C$ is multiplied by predetermined coefficient $k_2$. Further, the latter is subtracted from the former, thereby providing an output value $v_D$ of a subtraction processing section 5. Subsequently, when the integral value $v_D$ is less than or equal to a threshold value THC in Step F143, the integral values $v_B$, $v_C$, and $v_D$ are initialized to zero, and the reset flag F is set to High in Step F144. Further, the operation proceeds to Step F25. Alternatively, when the integral value $v_D$ is greater than the threshold value THC in Step F143, the operation proceeds to Step F25 to make a threshold value decision. After output of a starting signal is controlled instep F26, the operation returns to main control in Step F145 to complete the timer interruption 4.

The above timer interruption 4 can control a reset signal from the timer reset means 31 and a reset signal from the comparing means 30, and can initialize the values of the integration processing section 43 and the integration processing section 73 to zero at a time of completion of impact requiring no starting signal. It is thereby possible to immediately deal with a subsequently generating impact.

A description will now be given of an effect of the reset signal generating means 35 in the structure according to the embodiment 4. For this purpose, it is assumed that the reset signal generating means 35 carries out OR processing of the comparing means 30 and the fall means 34. That is, it is assumed that the integrating means 43 and the integrating means 73 are reset by any one of the output from the fall edge detecting means 34 and the output from the comparing means 30. FIGS. 36(a)–(c), (f)–(h) and (j) show output waveforms at each section in an apparatus of FIG. 33 in case of successive occurrence of impact due to running on the curbstone requiring no starting signal, and intermediate speed collision requiring the starting signal.

As shown in an output waveform FIG. 36(a) of the G sensor 1, it is assumed that the impact is caused due to running on the curbstone in the first half, and the impact due to intermediate speed collision is caused in the latter half. In this case, an output waveform FIG. 36(b) of an integrating processing section 22 can be obtained by integrating after subtracting an offset value $g_A$ from the output waveform FIG. 36(a). The waveform FIG. 36(b) exceeds a threshold value THA after a time from the beginning of the intermediate speed collision. At the same time, output of a one-shot timer 9 shown in FIG. 36(c) is in an ON state.

Thus, output of the subtraction processing section 5 shown in FIG. 36(f) becomes negative at a time of completion of running on the curbstone, and reaches a threshold value THD to be reset to zero. Thereafter, the output waveform FIG. 36(f) tends to extend in a positive direction after the intermediate collision begins, but does not exceed the threshold value THB before a time $t_i$ since the output is reset to zero at a time $t_g$ by a reset signal from the fall edge detecting means 34 shown in FIG. 36(j). As a result, output of a one-shot timer 10 is set to High at the time $t_i$, thereby outputting the starting signal as shown in FIG. 36(h).

FIGS. 37(a)–(c), (f)–(h), and (j) show signal waveforms at each section in case the reset signal generating means 35 performs the original operation in the structure according to the embodiment 4. FIGS. 37(a), (b), and (c) are identical with FIGS. 36(a), (b), and (c), respectively, and descriptions thereof are omitted.

Like the waveform in FIG. 36(f), a waveform of the subtraction processing section 5 shown in FIG. 37(f) reaches a threshold value THD at the time of completion of running on the curbstone to be reset to zero. However, even if the intermediate speed collision is started, and the fall edge detecting means 34 outputs the reset signal shown in FIG. 37(j), the waveform is not reset at the time $t_g$ so long as at least one reset signal is outputted from the comparing means 30 for a predetermined period after the acceleration rise detecting means 32 is actuated. Thus, the waveform of the subtraction processing section 5 is not reset to zero. Hence, the waveform of the subtraction processing section 5 rises relatively earlier than the waveform of the subtraction processing section 5 in FIG. 36(f) to reach the threshold value THB at a time $t_j$. Therefore, the output of the one-shot timer 10 as shown in FIG. 37(g) becomes High at the time $t_j$ which is earlier than a time $t_i$ shown in FIG. 36(g), thereby outputting a starting signal as shown in FIG. 37(h). As a result, the reset signal generating means 35 controls the reset signal so as not to cause time-lag in processing before the collision decision.

Embodiment 5

Figure 38:
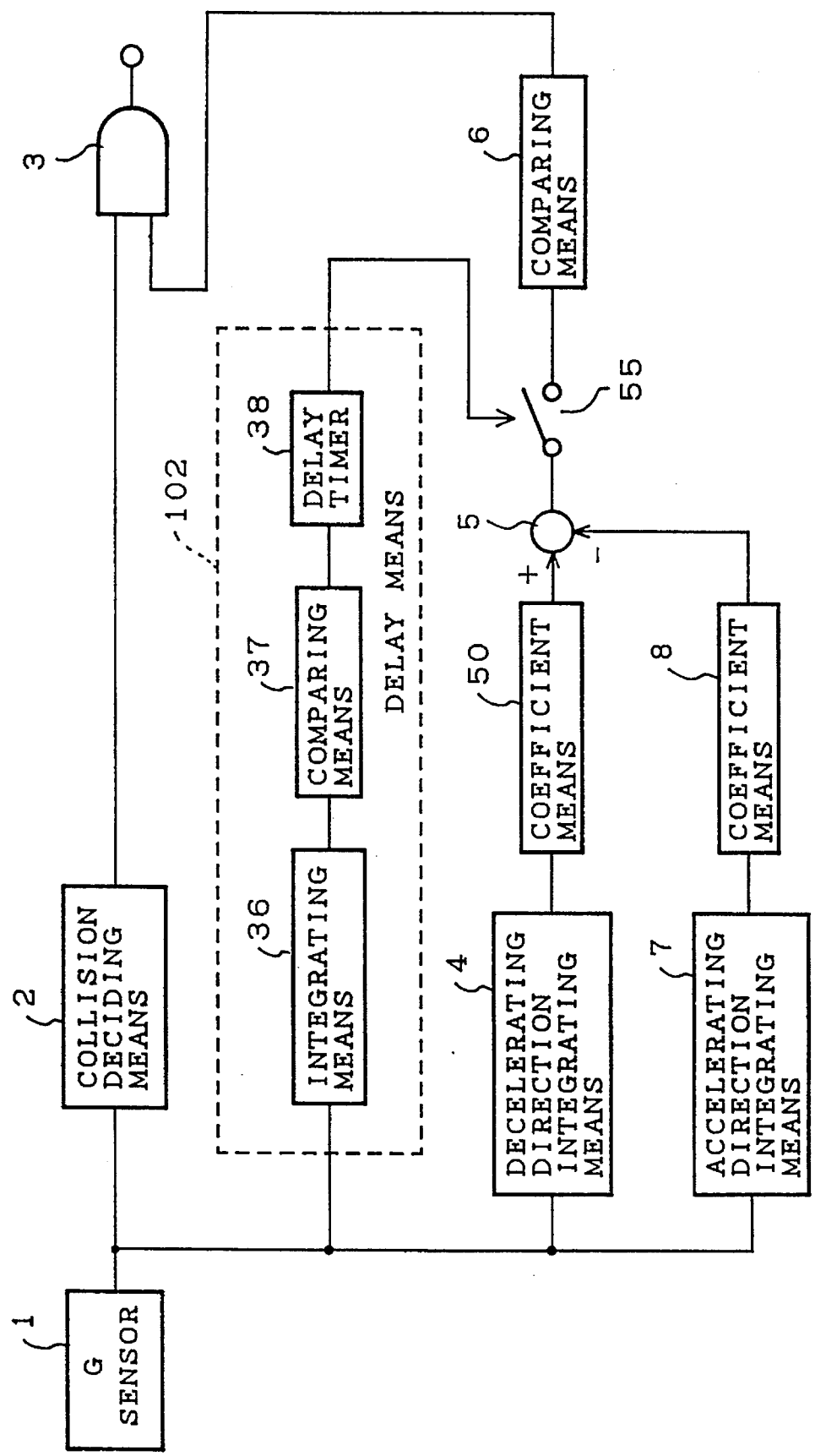
FIG. 38 is a block diagram showing a basic structure according to an embodiment 5 of the present invention.

FIG. 38 is a block diagram showing a basic structure according to the embodiment 5 of the present invention. In FIG. 38, reference numeral 36 means an integrating means for integrating output from a G sensor 1, 37 is a comparing means for comparing output of the integrating means 36 with a threshold value, and 38 is a delay timer to output after delaying output from the comparing means 37. Delay means 102 includes the integrating means 36, the comparing means 37, and the delay timer 38. Reference numeral 55 means a switching means provided for an output path of a subtraction processing section 5 to be closed by receiving output from the delay means 102. Since structures other than those discussed above are identical with that of FIG. 1, a description thereof is omitted.

Figure 39:
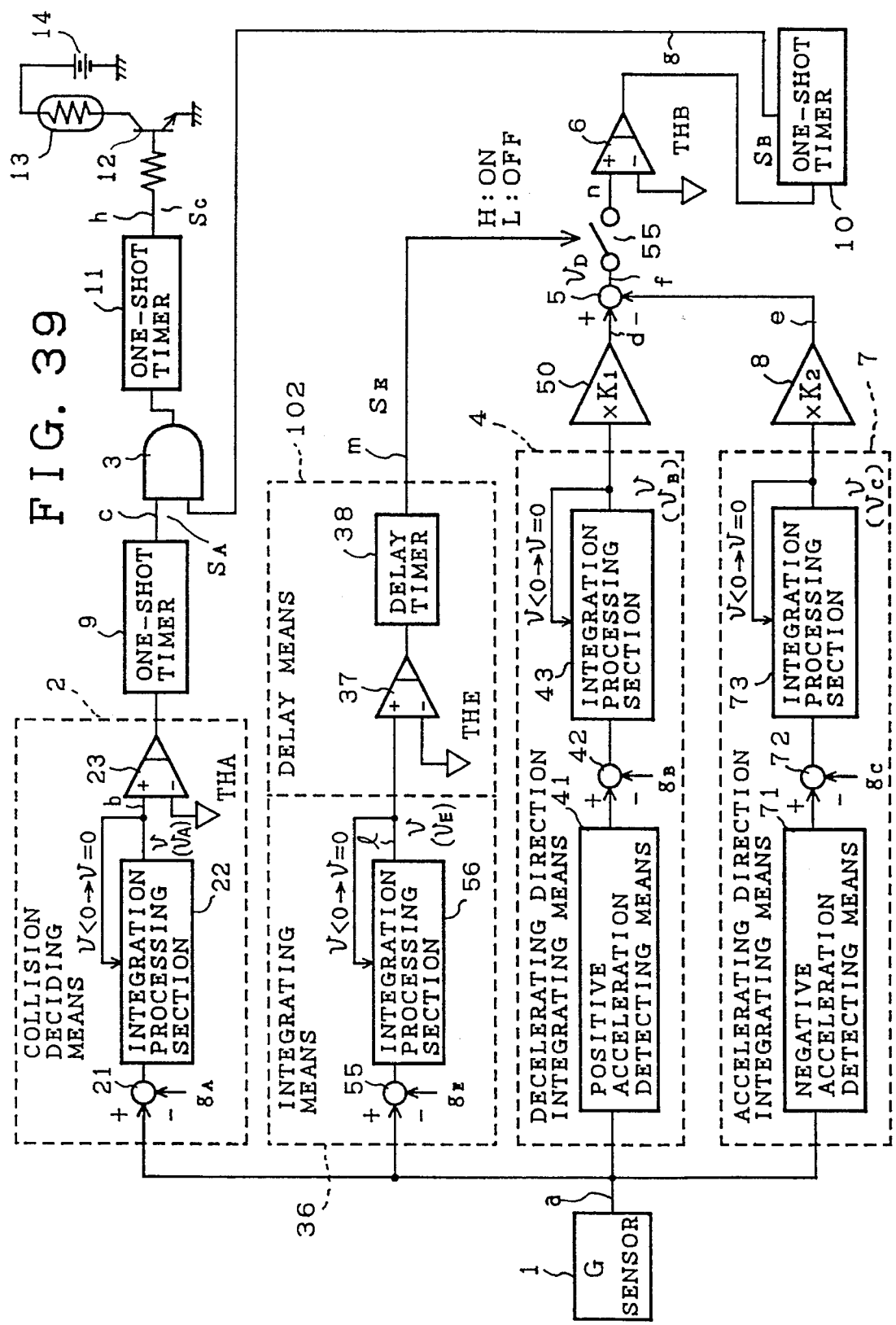
FIG. 39 is a block diagram showing a specific structure according to the embodiment of FIG. 38.

FIG. 39 is a block diagram showing a detailed structure according to the embodiment 5. The integrating means 36 includes a subtraction processing section 55 to subtract an offset value $g_E$ from the output of the G sensor 1, and an integration processing section 56 to integrate output from the subtraction processing section by using a reset function. Since structures other than those discussed above are identical with those in FIG. 2, the same reference numerals are used for component parts and descriptions thereof are omitted.

Figure 40:
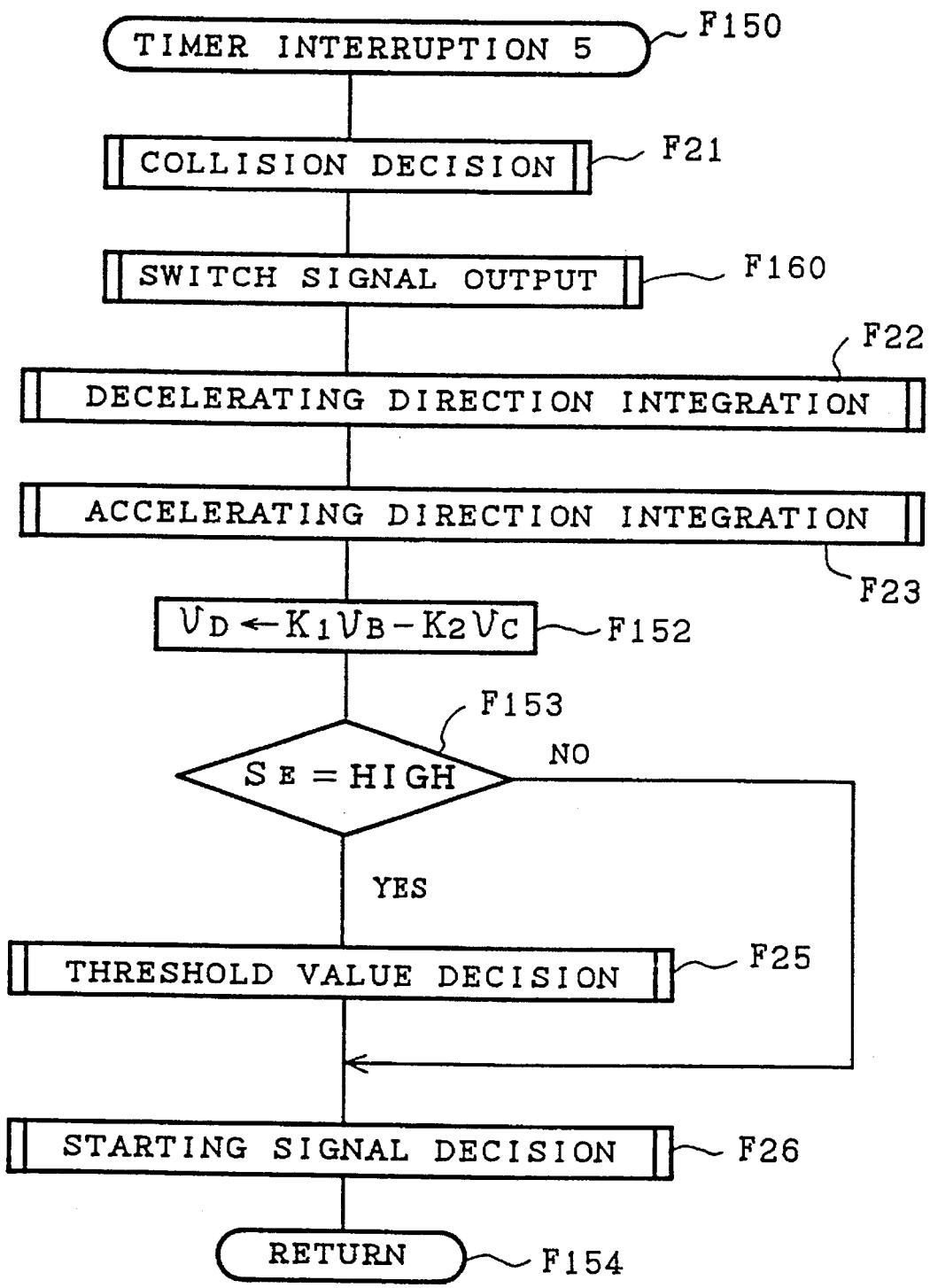
FIG. 40 is a flowchart illustrating an operation in the embodiment of FIG. 38.

A description will now be given of the operation in the embodiment 5 with reference to a flowchart of FIG. 40. The flow of main control is identical with that in the embodiment 1, and a description thereof is omitted.

Figure 41:
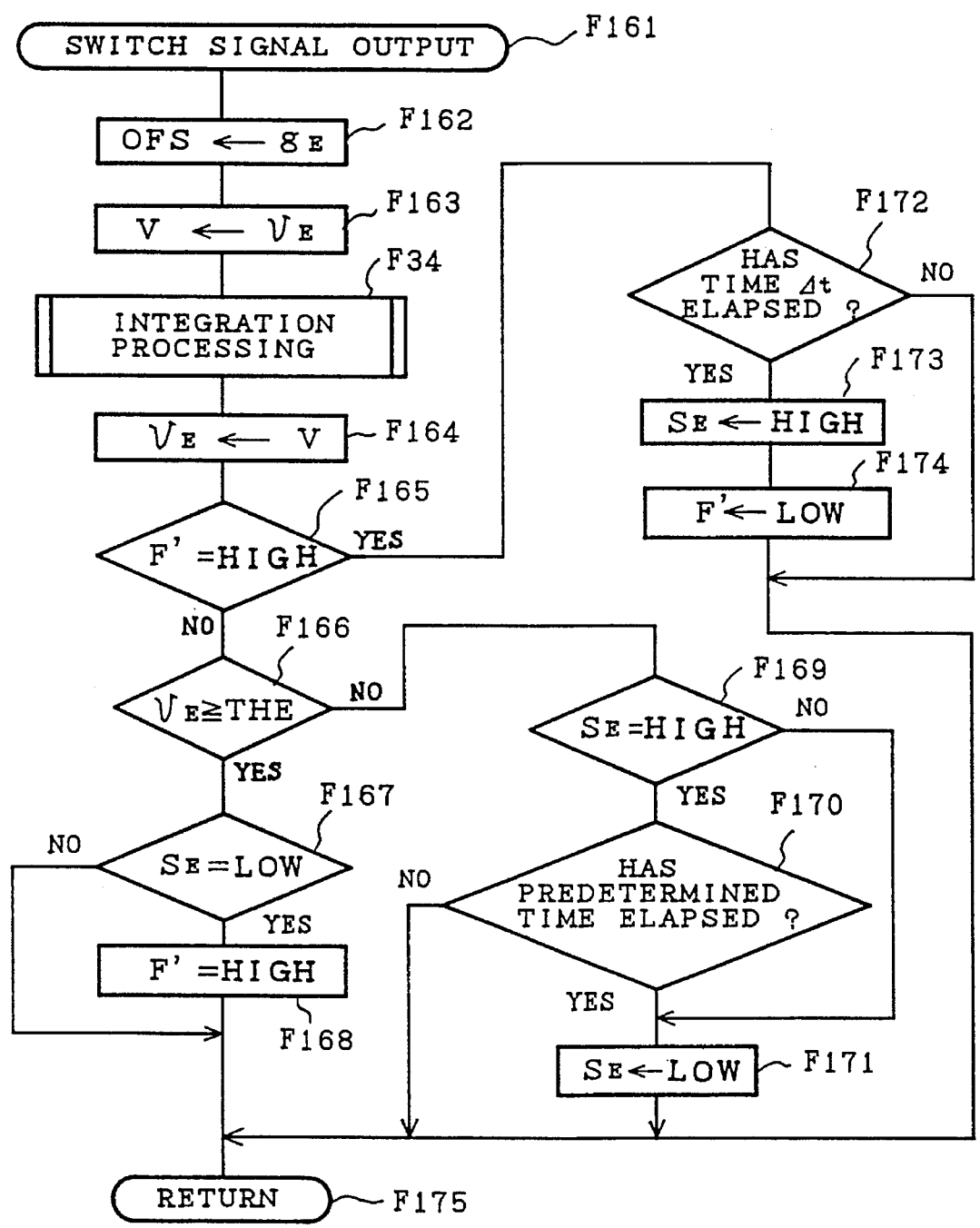
FIG. 41 is a flowchart illustrating the operation in the embodiment of FIG. 38.

A timer interruption 5 is started for each constant time in Step F150, and it is decided whether collision is a low speed collision or an intermediate-high speed collision. In Step F160, switch signal output processing shown in FIG. 41 is carried out to output a signal to open and close the switching means 55 in FIG. 39. In the switch signal output processing, the offset value $g_E$ is set to an offset value OFS in Step F162, and an integral value $v_E$ is set to an integral value V in Step F163. Subsequently, integration processing is carried out on the basis of the offset value OFS and the integral value V in Step F34, and the integral value V is changed to the original integral value $v_E$ in Step F164. When a delay timer flag F' is Low in Step F165, the operation proceeds in a direction of NO to Step F166. When the integral value $v_E$ is greater than or equal to a threshold value THE in Step F166, the operation proceeds to Step F167. Further, when a delay signal $S_E$ is Low in Step F167, the operation proceeds in a direction of YES to Step F168 where the delay timer flag F' is set to High, and proceeds to Step F175. Alternatively, when the delay signal $S_E$ is High in Step F167, the operation similarly proceeds to Step F175.

If the integral value $v_E$ is less than the threshold value THE in Step F166, the operation proceeds in a direction of NO. When the starting signal $S_E$ is High in Step F169, the operation proceeds to Step F170. If a predetermined time has elapsed after the starting signal $S_E$ becomes High in Step F170, the starting signal $S_E$ is set to Low in Step F171, and the operation proceeds to Step F175. Even if the predetermined time has not elapsed in Step F170, the operation similarly proceeds to step F175.

When the delay timer flag F' is High in Step F165, the operation proceeds in a direction of YES to Step F172 to decide whether or not a predetermined time Δt has elapsed after the delay timer flag F' is High. If the time Δt has elapsed, the operation proceeds in a direction of YES. The starting signal $S_E$ is set to High in Step F173, and a delay timer flag F' is set to Low in Step F174. The operation thereafter proceeds to Step F175. When the time Δt has not elapsed after the delay timer flag F' becomes High in Step F172, the operation proceeds in a direction of NO to Step F175. The above switch signal processing is completed in Step F175 to return the operation to the main control. Next, decelerating direction integration is carried out in Step F22, and accelerating direction integration is carried out in Step F23. In Step F152, a positive acceleration integral value $V_B$ is multiplied by predetermined coefficient $k_1$, a negative acceleration integral value $V_C$ is multiplied by predetermined coefficient $k_2$, and the latter is subtracted from the former, thereby providing an output value $V_D$ of the subtraction processing section 5. If the starting signal $S_E$ is High in Step F153, a threshold value decision is made in Step F25, and output of the starting signal is controlled in Step F26. Even if the starting signal $S_E$ is Low in Step F153, the operation proceeds to Step F26. In Step F154, the operation returns to the main control, and the timer interruption 5 is completed.

Figure 42A:
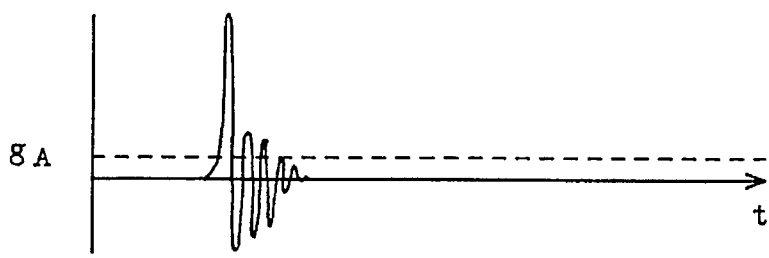
FIGS. 42(a)–(c), (f)–(h) and (l)–(m) show signal waveform diagrams at each section, thus illustrating the operation, in the embodiment of FIG. 38.
Figure 42B:
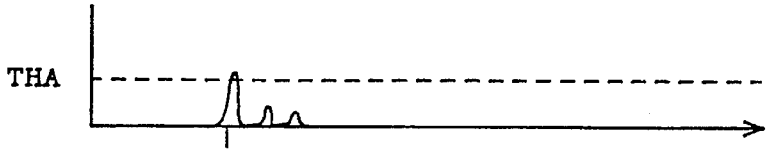
Figure 42C:
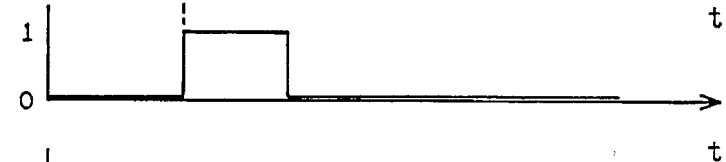

FIGS. 42(a)–(c), (f)–(h), and (l)–(m) show signal waveforms at each section in the structure according to the embodiment 5, illustrating an effect of the switching means 55. FIG. 42(a) shows output from the G sensor 1 at a time of hammerblow, and FIG. 42(b) is an output waveform obtained by integrating in an integration processing section 22 after subtracting an offset $g_A$ from the output of the G sensor 1. The output waveform FIG. 42(b) exceeds a threshold value THA in the range in which large acceleration rapidly increases, thereby setting output of a one-shot timer 9 to High as shown in FIG. 42(c).

Figure 42L:

In an output waveform of the integration processing section 56, a threshold value THE is set to be smaller than the threshold value THA determined depending upon output of the integration processing section 56 at a time of normal travelling. At a time of impact due to the hammerblow, the output waveform exceeds the threshold value THE before the output of the integration processing section 22 exceeds the threshold value THA as shown in FIG. 42(l).

Figure 42M:
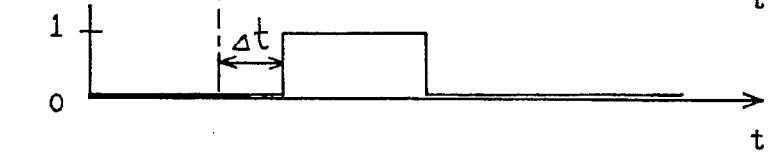
Figure 42F:
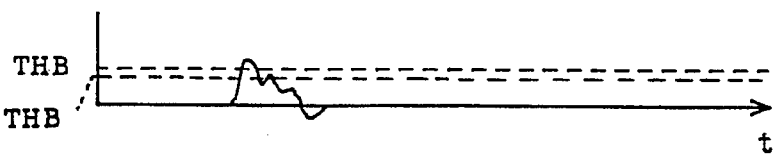
Figure 42N:
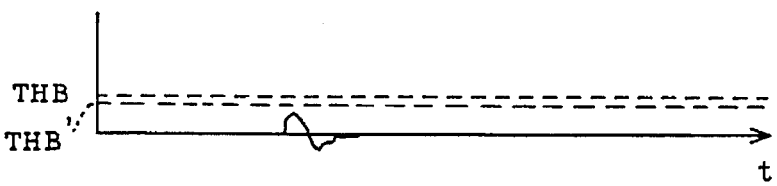
Figure 42G:
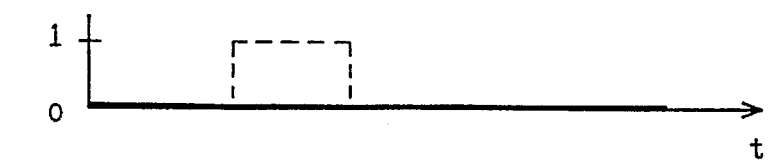
Figure 42H:
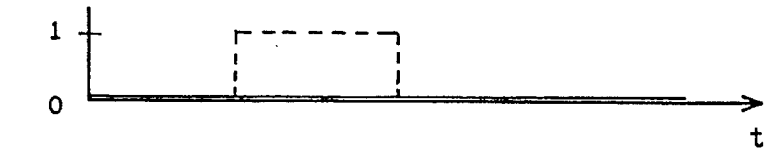

Output of the delay timer 38 as shown in FIG. 42(m) becomes High with a delay of a delay timer period Δt to close the switching means 55. Consequently, an input waveform FIG. 42(n) of a comparison processing section 6 is zero and does not exceed a threshold value THB in the range in which an output waveform FIG. 42(f) of the subtraction processing section 5 exceeds the threshold value THB. Thus, a one-shot timer 10 provides no output as shown in FIG. 42(g), and no starting signal is outputted as shown in FIG. 42(h).

As set forth above, by opening and closing the switching means 55, it is possible to avoid output of the starting signal in the waveform such as hammerblow waveform in which the large acceleration rapidly occurs. As a result, it is possible to set a threshold value THB' to be less than the threshold value THB required to avoid the output of the starting signal in response to the hammerblow. Further, it is possible to rapidly output a starting signal $S_C$ at a time of intermediate-high speed collision requiring the starting signal.

Embodiment 6

Figure 43:
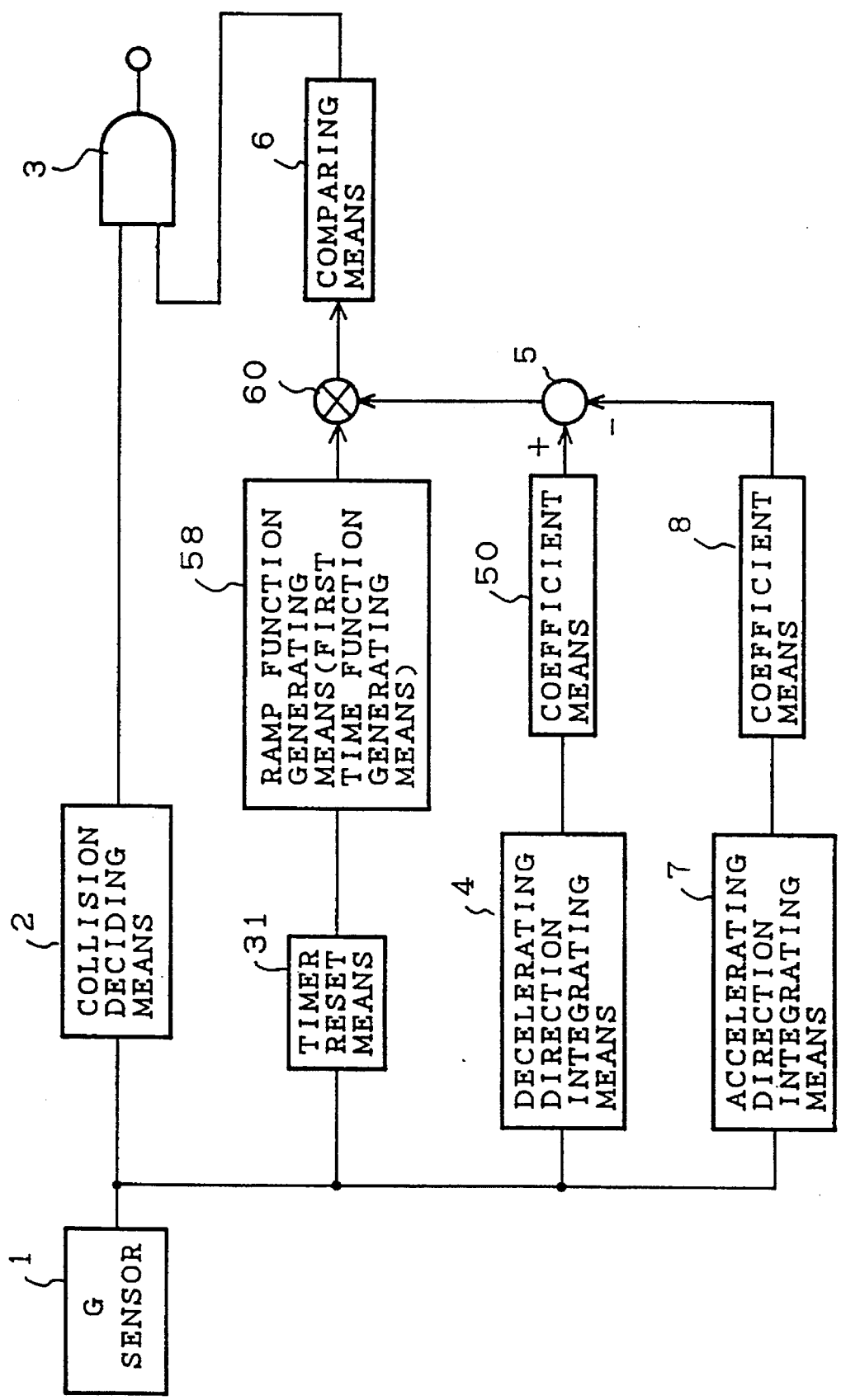
FIG. 43 is a block diagram showing a basic structure according to an embodiment 6 of the present invention.
Figure 44:
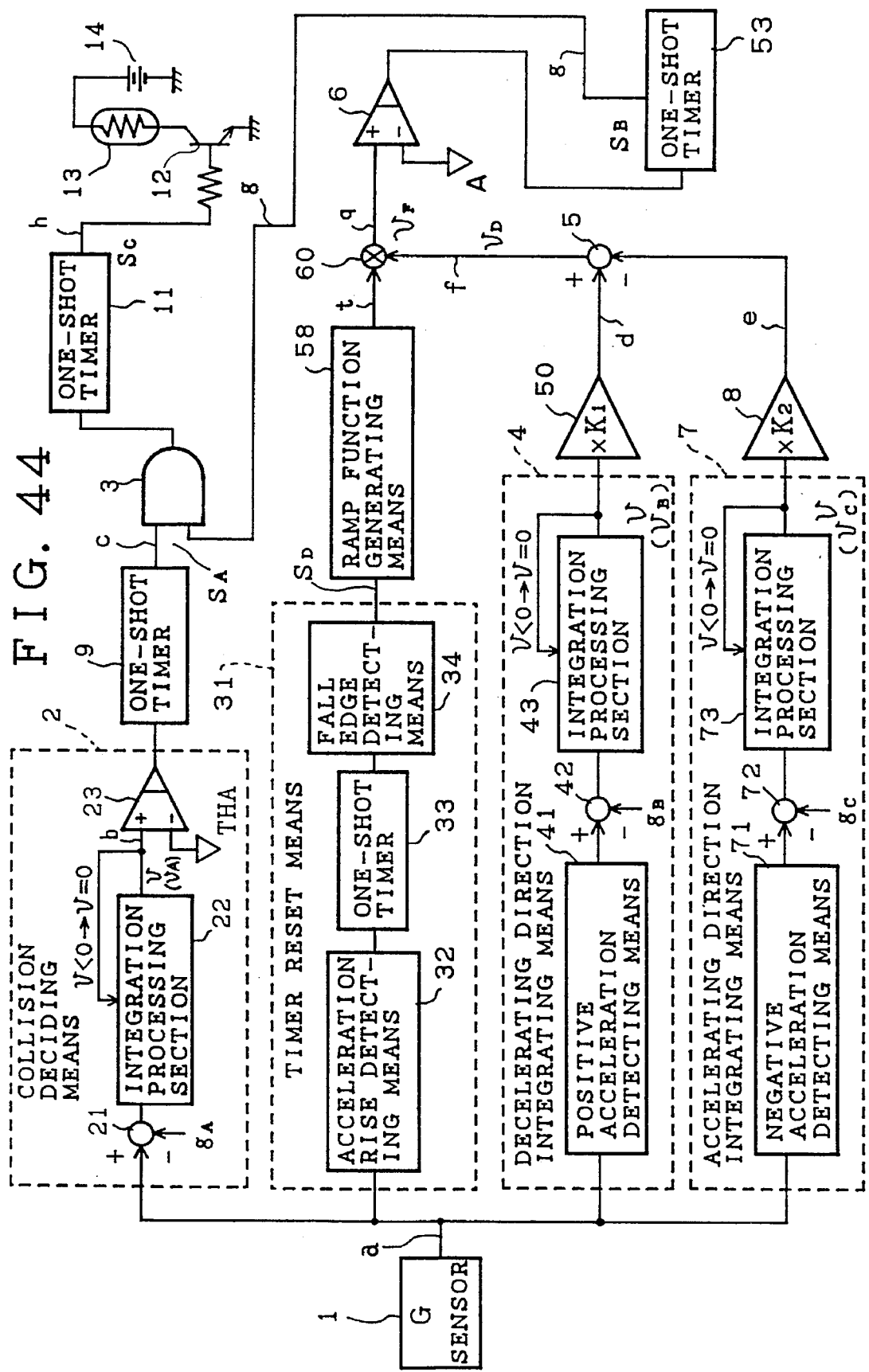
FIG. 44 is a block diagram showing a specific structure according to the embodiment of FIG. 43.

FIG. 43 is a block diagram showing a basic structure according to the embodiment 6 of the present invention, and FIG. 44 is a block diagram showing a detailed structure. In FIGS. 43 and 44, reference numeral 31 means the timer reset means for detecting a rise of output from a G sensor 1 to output a detected signal for a predetermined period, and 58 is a ramp function generating means for generating a ramp function serving as one type of time function by using output from the timer reset means 31 as a trigger. Reference numeral 60 means a multiplication processing section to multiply output of a subtraction processing section 5 by output of the ramp function generating means 58. Since structures other than those discussed above are identical with those structures in FIGS. 1 and 2, the same reference numerals are used for component parts identical with those in FIGS. 1 and 2 and descriptions thereof are omitted. The time function may be an optional function including a quadratic function, a cubic function ... and a function of nth order.

A description will now be given of the operation in the embodiment 6 with reference to a flowchart of FIG. 45. Since the flow of main control is identical with that in the embodiment 1, a description thereof is omitted.

Figure 45:
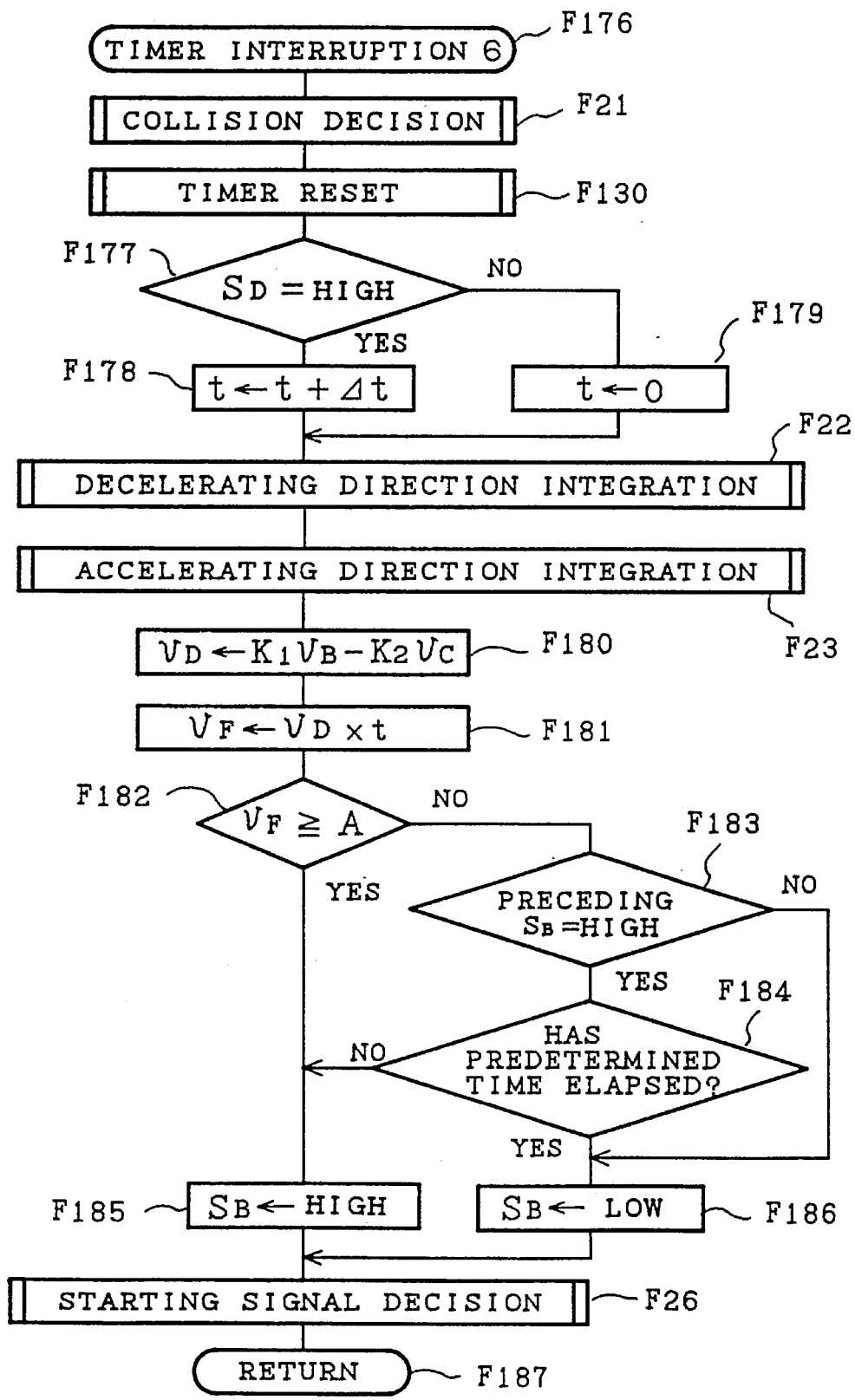
FIG. 45 is a flowchart illustrating an operation in the embodiment of FIG. 44.

Referring to FIG. 45, a timer interruption is started for each constant time in Step F176, and it is decided whether collision is a low speed collision or an intermediate-high speed collision in Step F21. In Step F130, a trigger signal $S_D$ for the ramp function generating means 58 is generated. When the trigger signal $S_D$ is High in Step F177, the operation proceeds in a direction of YES to Step F178 where a sampling time $\Delta t$ is added to a time t elapsing from a rise of the trigger signal $S_D$ (hereinafter abbreviated as rise time). Alternatively, when the starting signal $S_D$ is Low in Step F177, the operation proceeds in a direction of NO to Step F179 where the rise time t is initialized to zero. Decelerating direction acceleration integration is carried out in Step F22, and accelerating direction integration is carried out in step F23. In Step F180, a decelerating direction integral value is multiplied by coefficient $k_1$, an accelerating direction integral value is multiplied by coefficient $k_2$, and the latter is subtracted from the former, thereby providing an integral value $v_D$. In Step F181, the rise time t is multiplied by the integral value $v_D$, thereby providing an integral value $v_F$.

If the integral value $v_F$ is greater than or equal to a predetermined threshold value A in Step F182, the operation proceeds in a direction of YES to Step F185 to set a control signal $S_B$ to High. Alternatively, if the integral value $v_F$ is less than the threshold value A in Step F182, the operation proceeds in a direction of NO to Step F183. When the preceding control signal $S_B$ is High in Step F183, the operation proceeds in a direction of YES to Step F184. In case a predetermined period has elapsed after the control signal $S_B$ becomes High in Step F184, or in case the preceding starting signal $S_B$ is Low in Step F183, the operation proceeds to Step F186 to set the control signal $S_B$ to Low. If the predetermined period has not elapsed after the control signal $S_B$ becomes High in Step F184, the operation proceeds in a direction of NO to Step F185.

Subsequently, the operation proceeds from Step F185 or Step F186 to Step F26 where a starting signal decision is carried out, and proceeds to Step F187 to return to the main control, resulting in completion of the timer interruption 6.

Figure 46:
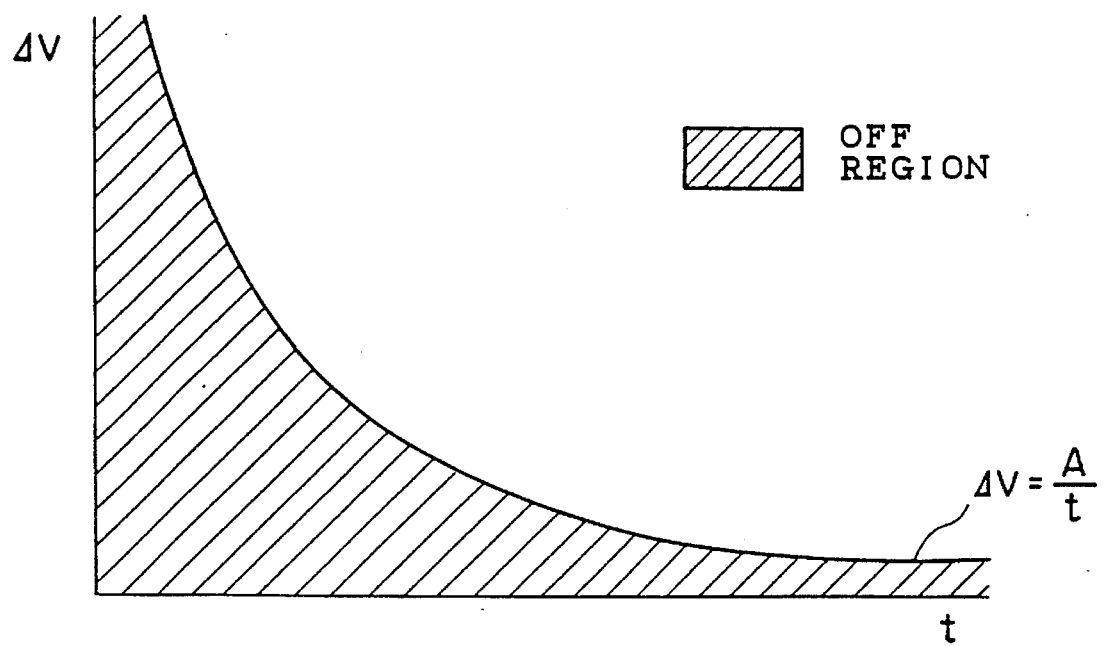
FIG. 46 is a characteristic diagram illustrating the principle in the embodiment of FIG. 44.

FIG. 46 shows a characteristic expressed by Equation (3), and illustrates a threshold value curve in case output of the ramp function generating means 58 is multiplied by output of the subtraction processing section 5. In the drawing, the shaded portion shows an OFF region in which no starting signal is outputted.

$$\Delta V = A/t \quad (3)$$

where $\Delta V = k_1 \Delta V_+ - k_2 \Delta V_-$

It is assumed that A is set so as to prevent $\Delta V$ from exceeding the threshold value curve in the low speed collision requiring no starting signal. Therefore, Equation (3) can provide an extremely high threshold value immediately after the beginning of an impact waveform. It is thereby possible to avoid output of the starting signal by entering the OFF region in the impact waveform, such as hammerblow impact waveform, having a short time width and high acceleration.

Figure 47A:
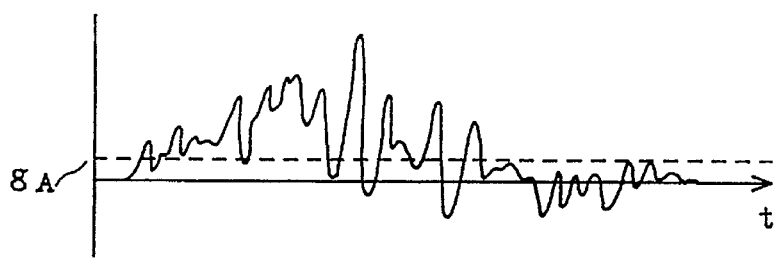
FIGS. 47(a)–(c), (f)–(h) and (p)–(q) show signal waveform diagrams at each section, thus illustrating the operation, in the embodiment of FIG. 44.
Figure 47B:
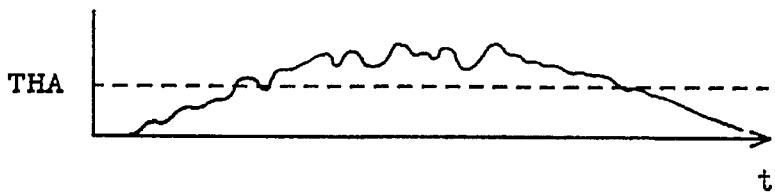
Figure 47C:
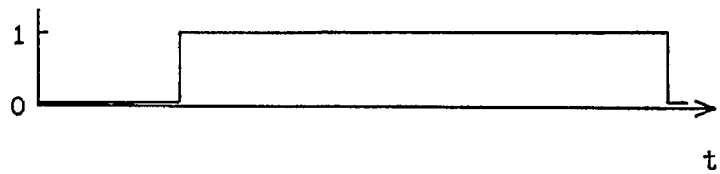

FIGS. 47(a)–(c), (f)–(g), and (p)–(q) show output waveforms at each section of FIG. 44 at a time of intermediate speed collision requiring the starting signal.

FIG. 47(a) shows an output waveform of the G sensor 1, and an output waveform FIG. 47(b) of an integration processing section 22 can be obtained by integrating after subtracting an offset $g_A$ from the output waveform FIG. 47(a). The output waveform FIG. 47(b) exceeds a threshold value THA a time after the collision, and output of a one-shot timer 9 becomes High as shown in FIG. 47(c).

Figure 47P:
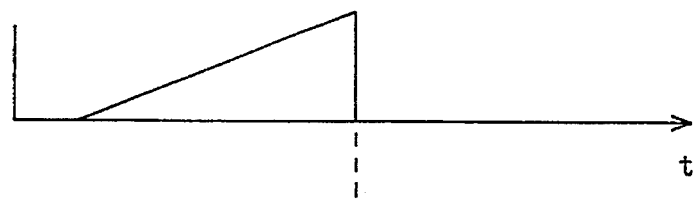
Figure 47F:
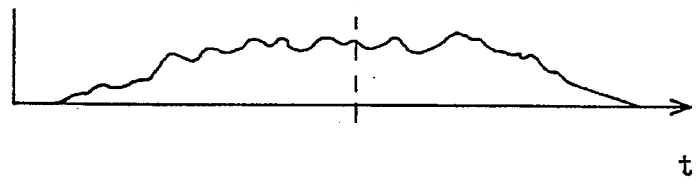
Figure 47Q:
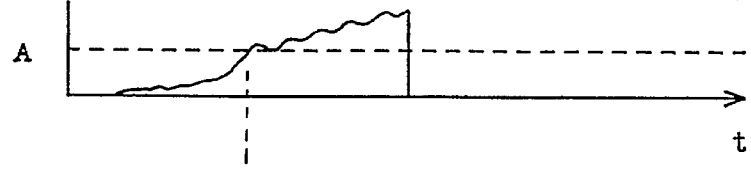
Figure 47G:
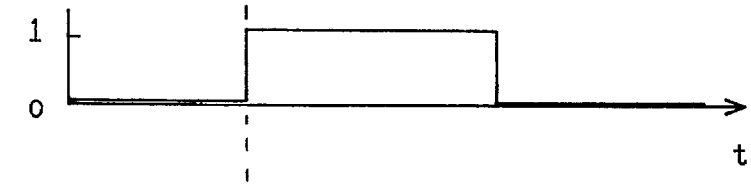
Figure 47H:
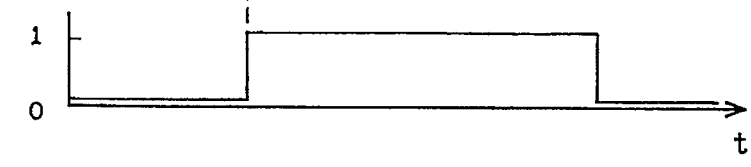

Next, the ramp function generating means 58 uses the output of the timer reset means 31 as the trigger to provide an output waveform FIG. 47(p) to start a ramp function. The output waveform FIG. 47(p) and the output waveform FIG. 47(f) of the subtraction processing section 5 are synthesized to form an output waveform FIG. 47(q) of the multiplication processing section 60. When the output of the multiplication processing section 60 exceeds the threshold value THA, an output waveform of a one-shot timer 53 is in an ON state, thereby outputting a starting signal as shown in FIG. 47(h).

Figure 48A:
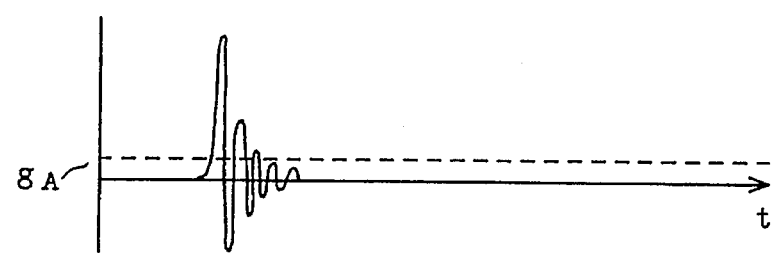
FIGS. 48(a)–(c), (f)–(h) and (p)–(q) show signal waveform diagrams at each section, thus illustrating the operation, in the embodiment of FIG. 44.
Figure 48B:
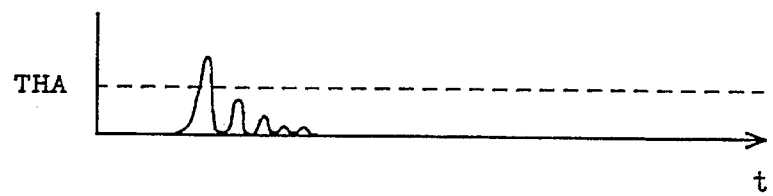
Figure 48C:
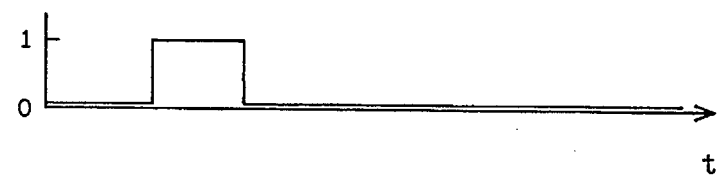

FIGS. 48(a)–(c), (f)–(g), and (p)–(q) show output waveforms at each section of FIG. 44 at a time of hammerblow requiring no starting signal.

An output waveform FIG. 48(b) of the integration processing section 22 can be obtained by integrating after subtracting the offset $g_A$ from an output waveform FIG. 48(a) of the G sensor 1. The output waveform FIG. 48(b) exceeds the threshold value THA immediately after the beginning of impact so that an output waveform FIG. 48(c) of the one-shot timer 9 becomes High.

Figure 48P:
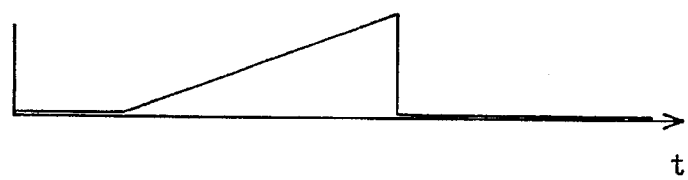
Figure 48F:
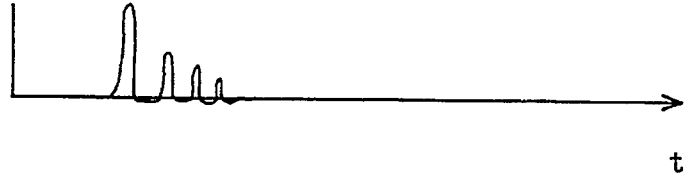
Figure 48Q:
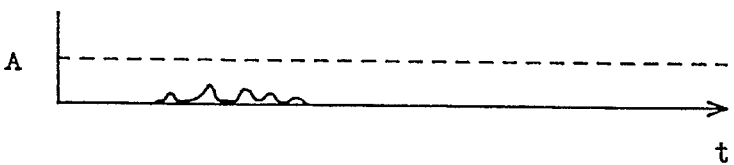
Figure 48G:
Figure 48H:
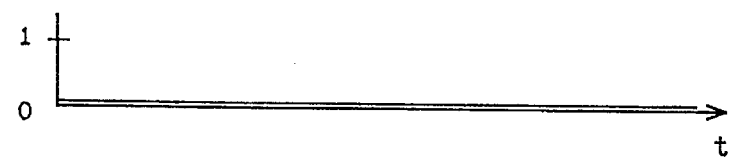

The ramp function generating means 58 uses output of the timer reset means 31 as the trigger to provide the output of FIG. 47(p) so as to start a ramp function. There is a largely extending wave crest of the integral value in the first half of an output waveform FIG. 47(f) of the subtraction processing section 5. However, the output waveform FIG. 47(p) of the ramp function generating means 58 has a small value immediately after the beginning of the impact. The waveform of FIG. 48(f) and the waveform of FIG. 48(p) are synthesized to provide a waveform FIG. 48(q) of the multiplication processing section 60, and the waveform FIG. 48(q) does not exceed a threshold value A in response to momentary and large acceleration immediately after the impact. Consequently, an output waveform of a one-shot timer 53 becomes Low, and no starting signal is outputted as shown in FIG. 48(h).

As a result, it is possible to surely discriminate between the one collision requiring the starting signal and the other impact such as hammering requiring no starting signal, and to control output of the starting signal.

Embodiment 7

Figure 49:
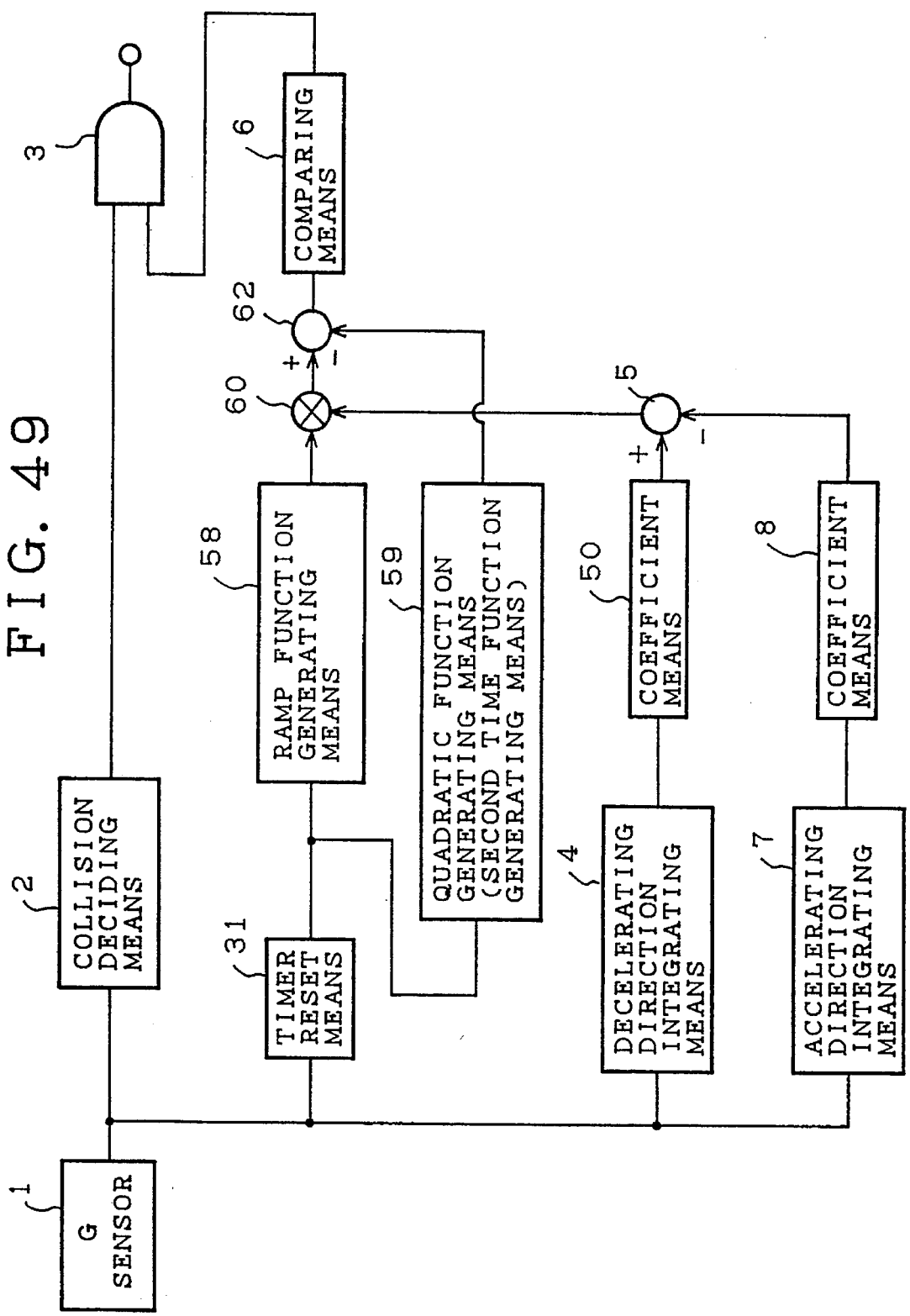
FIG. 49 is a block diagram showing a basic structure according to the embodiment 7 of the present invention.
Figure 50:
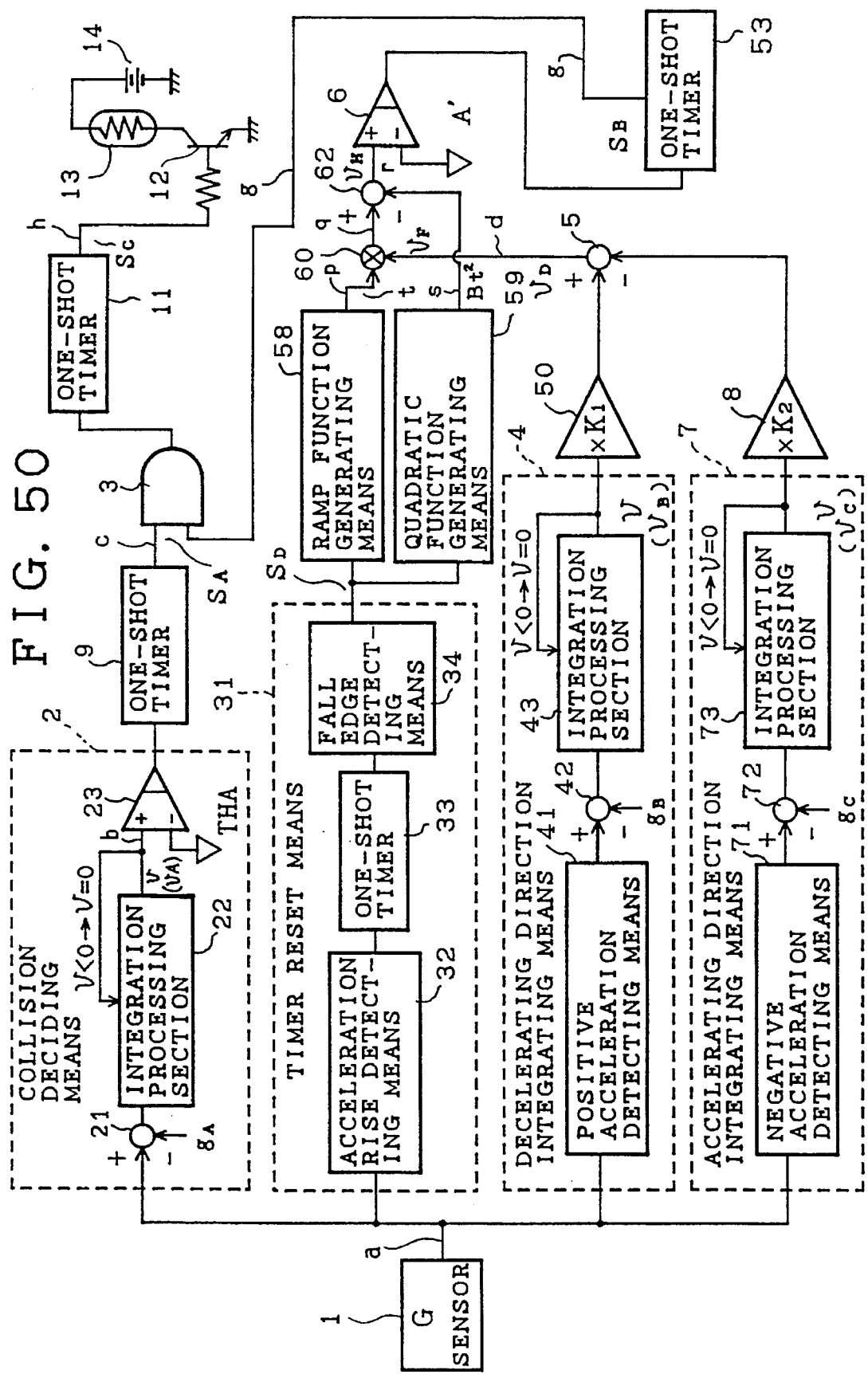
FIG. 50 is a block diagram showing a specific structure according to the embodiment of FIG. 49.

FIG. 49 is a block diagram showing a basic structure according to the embodiment 7 of the present invention, and FIG. 50 shows a detailed structure. In the drawings, reference numeral 59 means a quadratic function generating means for generating a quadratic function by using output of the timer reset means 31 as a trigger, and 62 is a subtraction processing section to subtract output of the quadratic function generating means 59 from output of a multiplication processing section 60. Since structures other than those discussed above are identical with those in FIGS. 43 and 44, the same reference numerals are used for component parts and descriptions thereof are omitted.

A description will now be given of the operation in the embodiment 7 with reference to a flowchart of FIG. 51. Since the flow of main control is identical with that in the embodiment 1, a description thereof is omitted.

Figure 51:
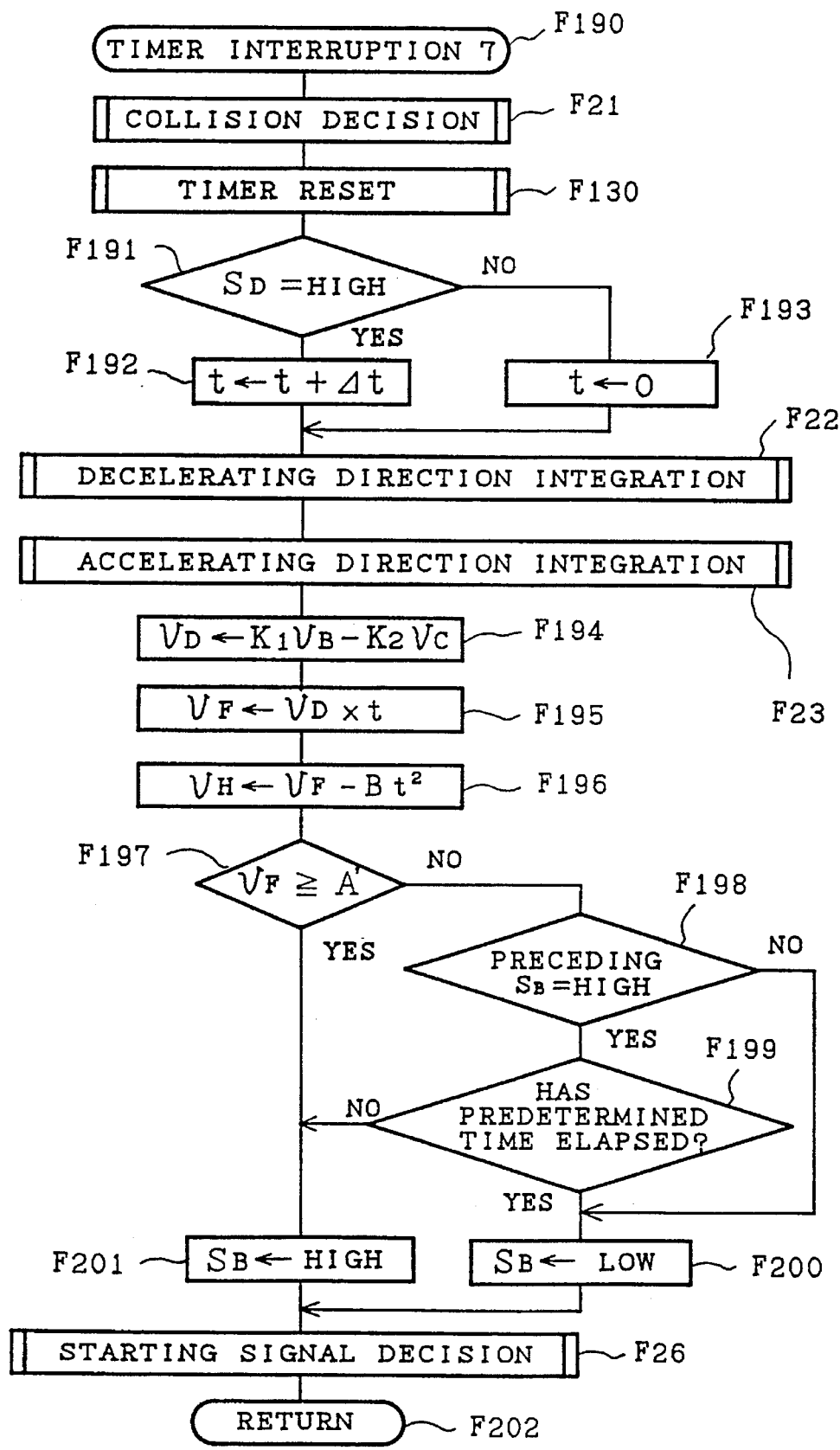
FIG. 51 is a flowchart illustrating an operation in the embodiment of FIG. 49.

Referring to FIG. 51, a timer interruption 7 is started for each constant time in Step F190, a typical collision decision is made in Step F21, and a trigger signal $S_D$ for ramp function generating means 58 is generated in Step F130. When the trigger signal $S_D$ is High in Step F191, the operation proceeds in a direction of YES to Step F192 to add a sampling time $\Delta t$ to a rise time t. Alternatively, when the trigger signal $S_D$ is Low in Step F191, the operation proceeds in a direction of NO to Step F193 to initialize the rise time t to zero.

Decelerating direction integration is carried out in Step F22, and accelerating direction integration is carried out in Step F23. Further, in Step F194, a decelerating direction integral value $v_B$ is multiplied by preset coefficient $k_1$, an accelerating direction integral value $v_C$ is multiplied by preset coefficient $k_2$, and the latter is subtracted from the former, thereby providing an integral value $v_D$. In Step F195, the integral value $v_D$ is multiplied by the rise time t to provide an integral value $v_F$. In Step F196, a quadratic function proportional constant B is multiplied by the square of the rise time t, and the resultant value is subtracted from the integral value $v_F$ to provide an integral value $v_H$.

When the integral value $v_H$ is greater than or equal to a preset threshold value A' (see FIG. 53) in Step F197, the operation proceeds in a direction of YES to Step F201 to set a control signal $S_B$ to High. Alternatively, when the integral value $v_H$ is less than the preset threshold value A' in Step F197, the operation proceeds in a direction of NO to Step F198. If the preceding control signal $S_B$ is High in Step F198, it is regarded that a fall of the control signal $S_B$ is detected. Then, the operation proceeds in a direction of YES to Step F199. If a predetermined period has not elapsed from the fall time of the control signal $S_B$, the operation proceeds in a direction of NO to Step F201. Alternatively, in case the predetermined period has elapsed from the fall time of the control signal $S_B$ or in case the preceding control signal $S_B$ is Low in Step F198, the operation proceeds to Step F200 to set the control signal $S_B$ to Low.

After Step F200 or Step F201, the operation proceeds to Step F26 to make a starting signal decision, and proceeds to Step F202 to return to the main control, resulting in completion of the timer interruption 7.

Figure 52:
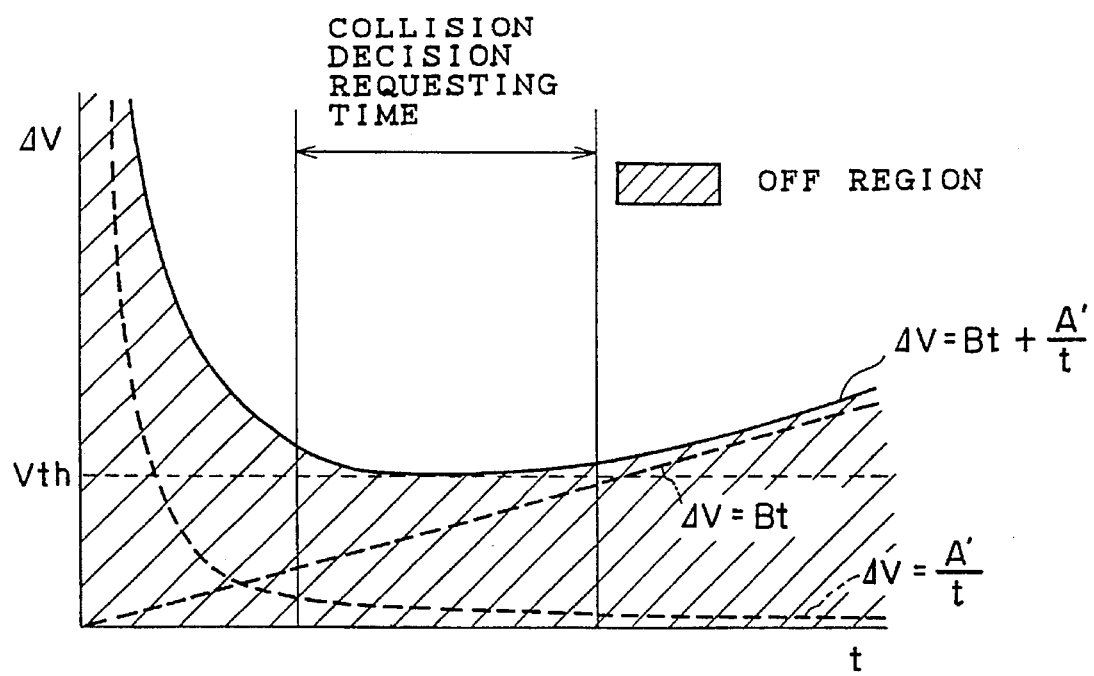
FIG. 52 is a characteristic diagram illustrating the principle in the embodiment of FIG. 49.

FIG. 52 shows a characteristic expressed by Equation (4), illustrating a threshold value curve obtained by subtracting the output of the quadratic function generating means 59 from the output of the multiplication processing section 60. In the drawing, the shaded portion shows an OFF region in which a starting signal $S_C$ is not outputted.

$$\Delta V = Bt + A'/t \tag{4}$$

where A' corresponds to inclination of a ramp function, and B is the proportional constant of the quadratic function generating means 59. Further, it is assumed that A' and B are set so as to prevent $\Delta V$ from exceeding the threshold value curve in the low speed collision requiring no starting signal $S_C$. Equation (4) can provide an extremely high threshold value immediately after the beginning of an impact waveform. It is thereby possible to avoid output of the starting signal $S_C$ by entering the OFF region in the impact waveform, such as hammerblow impact waveform, having a short time width and high acceleration.

As understood from the drawing, the threshold value curve can be set to provide substantially the same value as a conventional threshold value $V_{th}$ during a collision decision requesting time. Further, it is possible to decide for a decision time equivalent to a conventional decision time without a delay of starting decision time with respect to one collision requiring the starting signal $S_C$, and without actuation with respect to the other collision requiring no starting signal.

Figure 53A:
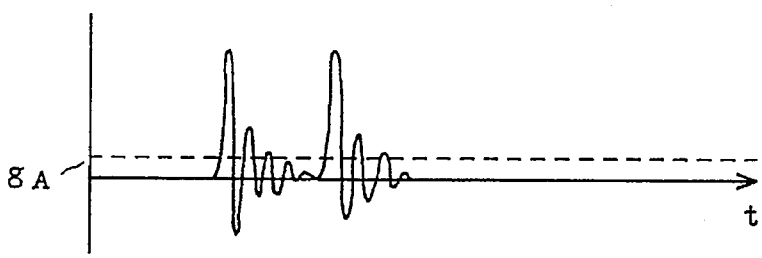
FIGS. 53(a)–(d), (g)–(h) and (p)–(s) show signal waveform diagrams at each section, thus illustrating the operation, in the embodiment of FIG. 49.
Figure 53B:
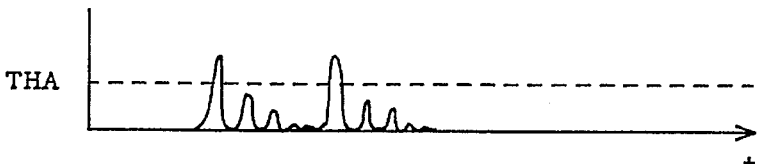
Figure 53C:
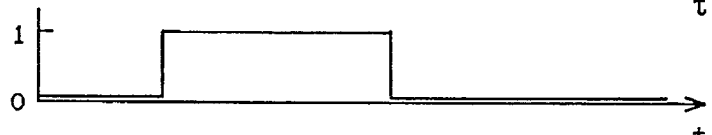

FIGS. 53(a)–(d), (g)–(h), and (p)–(s) show output waveforms at each section of FIG. 50 in case of a successive occurrence of impacts, such as hammerblow, requiring no starting signal in the structure according to the embodiment 7. FIG. 53(a) shows an output waveform of a G sensor 1, and an output waveform FIG. 53(b) of an integration processing section 22 can be obtained by integrating after subtracting offset $g_A$ from the output waveform FIG. 53(a). The output waveform FIG. 53(b) exceeds a threshold value THA immediately after the beginning of the impact. Thus, output of a one-shot timer 9 becomes High as shown in FIG. 53(c).

Figure 53P:
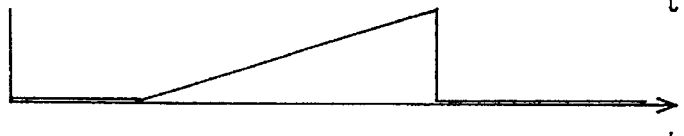
Figure 53D:
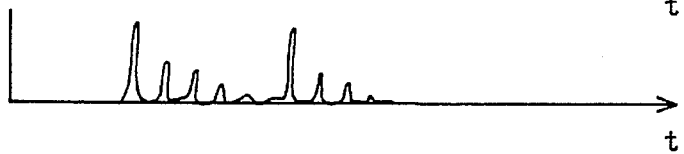
Figure 53Q:
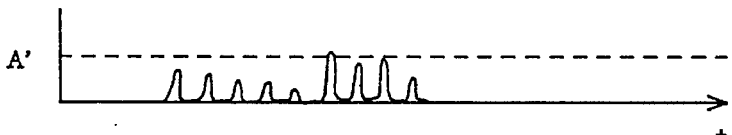
Figure 53S:
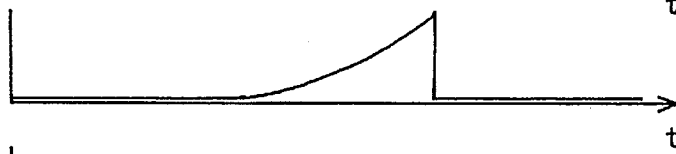
Figure 53R:
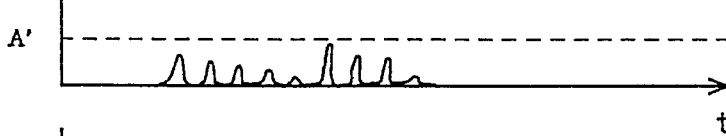
Figure 53G:
Figure 53H:
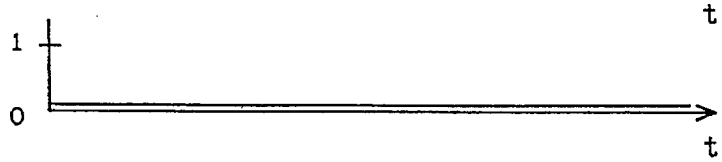

Subsequently, the ramp function generating means 58 uses the output of the timer reset means 31 as the trigger to provide an output waveform FIG. 53(p) so as to start the ramp function. The output of the ramp function generating means 58 shown in FIG. 53(p) and the output of a subtraction processing section 5 shown in FIG. 53(d) are multiplied to provide an output waveform FIG. 53(q) of the multiplication processing section 60. The output waveform FIG. 53(q) of the multiplication processing section 60 includes crests exceeding the threshold value A'. Output of the quadratic function generating means 59 shown in FIG. 53(s) is subtracted from the output waveform FIG. 53(q) to provide an output waveform FIG. 53(r) of the subtraction processing section 62. After the elapse of time after the beginning of impact, the output waveform FIG. 53(r) of the subtraction processing section 62 is increasingly reduced, and does not exceed the threshold value A'. Consequently, output of a one-shot timer 53 becomes Low, and no starting signal is outputted as shown in FIG. 53(h).

FIGS. 54(a)–(d), (g)–(h), and (p)–(s) show output waveforms at each section of FIG. 50 at a time of intermediate-high speed collision requiring the starting signal. FIG. 54(a) shows an output waveform of the G sensor 1, and an output waveform FIG. 54(b) of the integration processing section 22 can be obtained by integrating after subtracting offset $g_A$ from the output waveform FIG. 54(a). The output waveform FIG. 54(b) exceeds a threshold value THA after a time after the collision, and output (c) of the one-shot timer 9 becomes High as shown in FIG. 54(c).

Subsequently, the ramp function generating means 58 uses output of acceleration rise detecting means 32 as a trigger to provide output as shown in FIG. 54(p) so as to start the ramp function. The output of the ramp function generating means 58 and output of the subtraction processing section 5 are multiplied together to provide an output waveform FIG. 54(q) of the multiplication processing section 60. Further, the quadratic function generating means 59 uses the output of the acceleration rise detecting means 32 as the trigger to start a function as shown in FIG. 54(s). The output waveform FIG. 54(s) of the quadratic function generating means 59 is subtracted from the output waveform FIG. 54(q) of the multiplication processing section 60 to provide an output waveform FIG. 54(r) of the subtraction processing section 62. When the output waveform FIG. 54(r) exceeds a threshold value A', output of the one-shot timer 53 becomes High as shown in FIG. 54(g), and the starting signal is outputted as shown in FIG. 54(h).

In this case, the output waveform FIG. 54(r) of the subtraction processing section 62 decreases as the output of the quadratic function generating means 59 increases. However, a time required to exceed the threshold value THA is identical with a time required without the quadratic function generating means 59.

As a result, in case the impact having the sharp acceleration requiring no starting signal $S_C$ is applied continuously or applied for a certain period, or low acceleration is held for a long time, it is possible to prohibit decision of the starting signal $S_C$, and cause no delay of decision time with respect to the impact requiring the starting signal $S_C$.

Figure 55A:
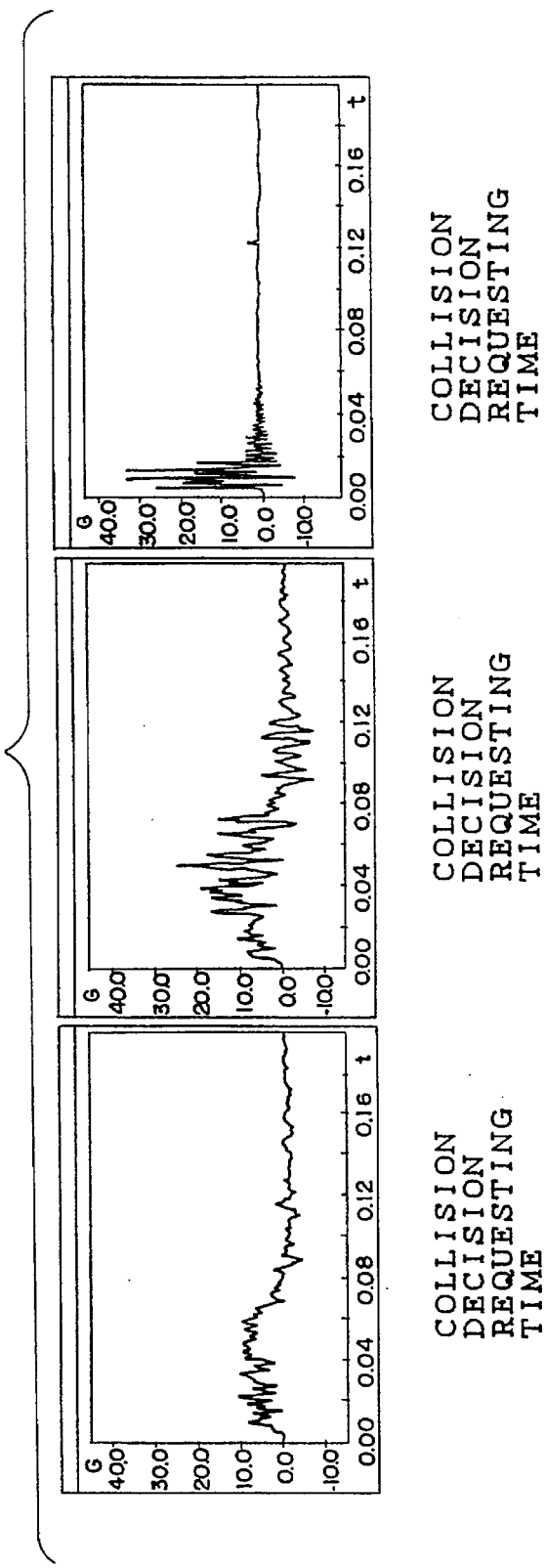
FIGS. 55(a) and (f) show signal waveform diagrams showing an output waveform of a G sensor and an output waveform of a subtraction processing section during various types of collisions.
Figure 55F:
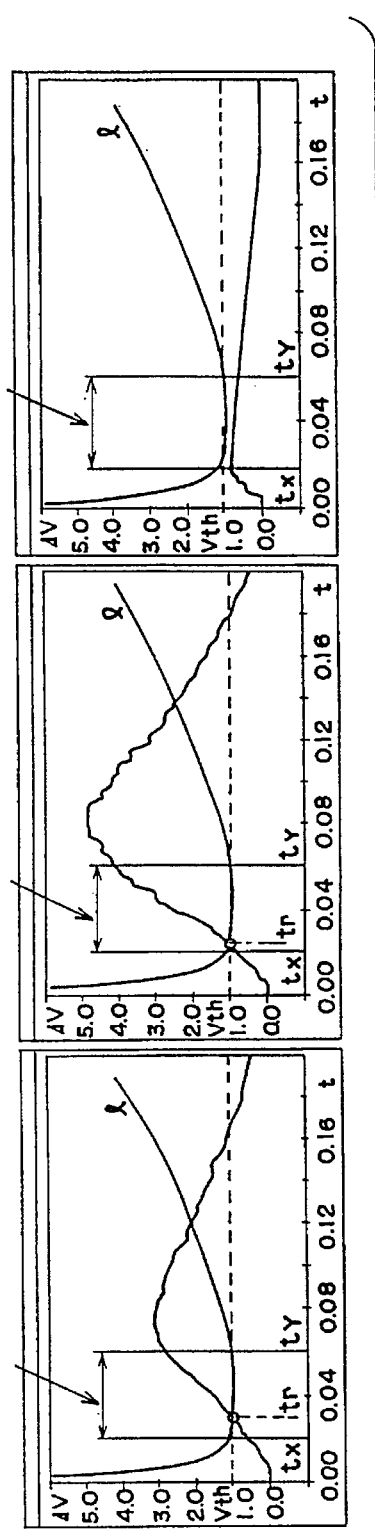
Figure 56:
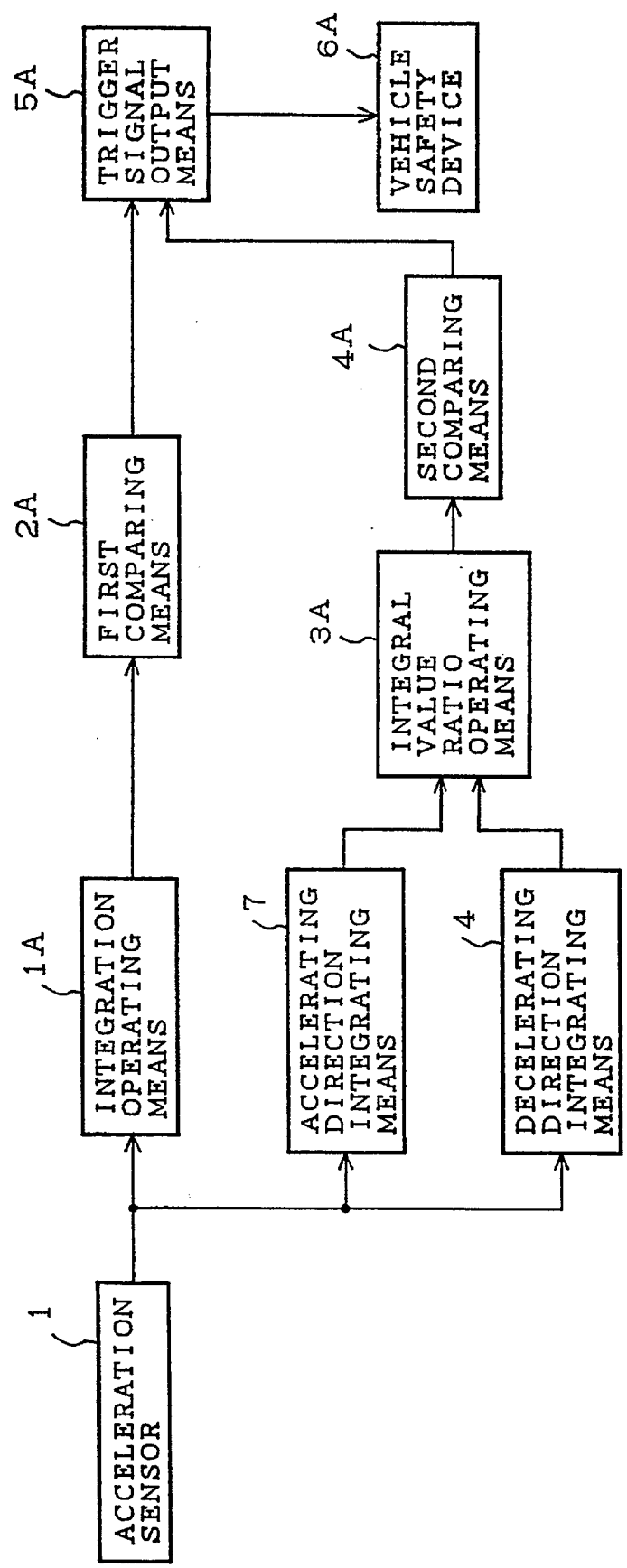
FIG. 56 is a block diagram showing a structure of a conventional starting apparatus.

FIGS. 55(a) and (f) sequentially show output waveforms from left to right of the G sensor 1 and output waveforms of the subtraction processing section 5 in the embodiment 7 at times of low speed collision (left), intermediate-high speed collision (center), and hammering (right). As shown in FIGS. 55(a) and (f), if a threshold value curve 1 is determined depending upon the output waveform of the subtraction processing section 5 at the time of hammering, no starting signal is surely outputted at the time of hammering, and the control signal $S_B$ is outputted during a collision decision requesting time (from a time $t_X$ to a time $t_Y$) at the time of typical collision (i.e., at the times of low speed collision and intermediate-high speed collision).

As set forth above, at the time of low speed collision, though the output waveform of the subtraction processing section 5 exceeds the threshold value curve 1 to output the control signal $S_B$, collision deciding means 2 is prevented from outputting a collision deciding signal $S_A$. As a result, the starting signal $S_C$ is not outputted.

Though the software of the microcomputer serves as the collision deciding means in the embodiments set forth above, it must be noted that the collision deciding means may totally or in part be realized by only a hardware circuit.

Further, though the output of the accelerating direction integrating means 7 is subtracted from the output of the decelerating direction integrating means 4 it is also possible to provide the same effect by subtracting the output of the decelerating direction integrating means 4 from the output of the accelerating direction integrating means 7.

While preferred embodiments of the invention have been described using specific terms, such description is for illustrative purposes only, and it is to be understood that changes and variations may be made without departing from the spirit or scope of the following claims.

What is claimed is:

1. A starting apparatus to start a passenger protecting apparatus for protecting a passenger in a movable body, comprising:

an acceleration sensor to detect and output acceleration of said movable body;

collision deciding means for deciding whether or not collision occurs depending upon the acceleration detected by said acceleration sensor;

decelerating direction integrating means for integrating the output of said acceleration sensor in a decelerating direction;

acceleration direction integrating means for integrating the output of said acceleration sensor in an accelerating direction;

control means for determining a difference between output from said decelerating direction integrating means and output from said accelerating direction integrating means; and trigger means for outputting a starting signal of said passenger protecting apparatus based on output of said collision deciding means and output of said control means.

2. A starting apparatus for a passenger protecting apparatus according to claim 1, further comprising:

reset means for initializing said decelerating direction integrating means and said accelerating direction integrating means to a predetermined value depending upon said difference between said output of said decelerating direction integrating means and said output of said accelerating direction integrating means.

3. A starting apparatus for a passenger protecting apparatus according to claim 1, further comprising:

reset means, actuated by receiving output from said acceleration sensor, for initializing said decelerating direction integrating means and said accelerating direction integrating means to a predetermined value after an elapse of a predetermined time.

4. A starting apparatus for a passenger protecting apparatus according to claim 1, further comprising:

comparing means for comparing a predetermined threshold value with said difference between said output of said decelerating direction integrating means and said output of said accelerating direction integrating means, and outputting the result of comparison;

timer signal generating means, actuated by receiving output of said acceleration sensor, for outputting a timer signal after an elapse of a predetermined time; and reset means for initializing said decelerating direction integrating means and said accelerating direction integrating means to a predetermined value based on the result of comparison outputted from said comparing means and the timer signal from said timer signal generating means.

5. A starting apparatus for a passenger protecting apparatus according to claim 1, further comprising:

delay means, actuated by receiving output of said acceleration sensor, for outputting a control signal after an elapse of a predetermined time; and switching means for switching between an OFF state and an ON state based on said control signal, in said OFF state said switching means prohibits said trigger means from receiving output of said control means, and in said ON state said switching means permits said trigger means to receive output of said control means.

6. A starting apparatus for a passenger protecting apparatus according to claim 1, further comprising:

first time function generating means, actuated by receiving output of said acceleration sensor, for outputting a first time function; and multiplying means for multiplying output of said first time function generating means by said difference between said output of said decelerating direction integrating means and said output of said accelerating direction integrating means; and wherein said trigger means outputs said starting signal based on said output of said collision deciding means and output of said multiplying means.

7. A starting apparatus for a passenger protecting apparatus according to claim 6, further comprising:

second time function generating means, actuated by receiving output of said acceleration sensor, for outputting a second time function; and a subtractor subtracting output of said second time function generating means from said output of said multiplier; and wherein said trigger means outputs said starting signal based on said output of said collision deciding means and output of said subtractor.

8. A starting apparatus for a passenger protecting apparatus according to claim 1, wherein said collision deciding means comprises:

offset means for applying an offset to said detected acceleration;

integrating means for integrating output of said offset means; and determining means for determining a collision based on a comparison of output of said integrating means to a threshold value.

9. A starting apparatus for a passenger protecting apparatus according to claim 1, wherein said deceleration direction integrating means includes,
positive acceleration detecting means for detecting only positive acceleration in said detected acceleration, and
first integrating means for integrating output of said positive acceleration detecting means; and said acceleration direction integrating means includes,
negative acceleration detecting means for detecting negative acceleration in said detected acceleration; and
second integrating means for integrating output of said negative acceleration detecting means.

10. A starting apparatus for a passenger protecting apparatus according to claim 1, wherein said control means comprises:
a first multiplier multiplying said output of said deceleration direction integrating means by a first coefficient;
a second multiplier multiplying said output of said acceleration direction integrating means by a second coefficient; and
a subtractor producing a difference between output of said first multiplier and output of said second multiplier.

11. A starting apparatus for a passenger protecting apparatus according to claim 1, wherein said trigger includes an AND gate which performs a logical AND operation on said output of said collision deciding means and said output of said control means to determine whether to output said starting signal.

12. A starting apparatus for a passenger protecting apparatus according to claim 2, wherein said reset means comprises:
comparing means for comparing said difference between said output of said deceleration direction integrating means and said output of said acceleration direction integrating means to a threshold value; and
integration reset means for initializing said deceleration direction integrating means and said acceleration direction integrating means to said predetermined value based on output of said comparing means.

13. A starting apparatus for a passenger protecting apparatus according to claim 2, wherein said predetermined value is zero.

14. A starting apparatus for a passenger protecting apparatus according to claim 3, wherein said reset means comprises;
acceleration rise detecting means for detecting a certain amount of rise in said detected acceleration; and
integrating reset means for initializing said decelerating direction integrating means and said accelerating direction integrating means to said predetermined value said predetermined time after said acceleration detecting means detects said certain amount of rise in said detected acceleration.

15. A starting apparatus for a passenger protecting apparatus according to claim 4, wherein said timer signal generating means generates said timer signal said predetermined time after detecting a certain amount of rise in said detected acceleration.

16. A starting apparatus for a passenger protecting apparatus according to claim 5, wherein said delay means comprises:
first integrating means for integrating said detected acceleration;
comparing means for comparing output of said first integrating means to a first predetermined threshold; and
delay means for outputting said control signal to cause said switching means to enter said ON state said predetermined period of time after said comparing means indicates that said output of said first integrating means exceeds said first predetermined threshold.

17. A starting apparatus for a passenger protecting apparatus according to claim 16, wherein said collision detecting means comprises:
second integrating means for integrating said detected acceleration;
determining means for determining collision when output of said second integrating means exceeds a second predetermined threshold which is greater than said first predetermined threshold.

18. A starting apparatus for a passenger protecting apparatus according to claim 6, wherein said first time function generating means comprises:
delay means for outputting a ramp control signal a predetermined period after said detected acceleration rises above a certain level; and
ramp function generating means for generating a ramp signal as said first time function in response to said ramp control signal.

19. A starting apparatus for a passenger protecting apparatus according to claim 18, wherein said delay means initializes said ramp function generating means when said detected acceleration is less than said certain level.

20. A starting apparatus for a passenger protecting apparatus according to claim 7, wherein
said first time function generating means includes,
delay means for outputting a ramp control signal a predetermined period after said detected acceleration rises above a certain level, and
ramp function generating means for generating a ramp signal as said first time function in response to said ramp control signal; and
said second time function generating means generates a quadratic signal as said second time function which is a quadratic function of said ramp signal.

21. A starting apparatus for a passenger protecting apparatus according to claim 20, wherein said delay means initializes said ramp function generating means when said detected acceleration is less than said certain level.

* * * * *